United States Patent
Yu et al.

(10) Patent No.: US 11,930,360 B2
(45) Date of Patent: Mar. 12, 2024

(54) METHOD AND SYSTEM FOR UPDATING CERTIFICATE ISSUER PUBLIC KEY, AND RELATED DEVICE

(71) Applicant: Huawei Technologies Co., Ltd., Shenzhen (CN)

(72) Inventors: Xiaobo Yu, Shenzhen (CN); Linyi Gao, Beijing (CN); Shuiping Long, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/158,809

(22) Filed: Jan. 24, 2023

(65) Prior Publication Data

US 2023/0232227 A1    Jul. 20, 2023

Related U.S. Application Data

(63) Continuation of application No. 17/540,874, filed on Dec. 2, 2021, now Pat. No. 11,601,809, which is a (Continued)

(30) Foreign Application Priority Data

Feb. 10, 2017  (WO) ................ PCT/CN2017/073252

(51) Int. Cl.
*H04W 12/069* (2021.01)
*H04W 12/041* (2021.01)
(Continued)

(52) U.S. Cl.
CPC ....... *H04W 12/069* (2021.01); *H04W 12/041* (2021.01); *H04W 12/35* (2021.01);
(Continued)

(58) Field of Classification Search
CPC .................................................. H04W 12/069
See application file for complete search history.

(56) References Cited

U.S. PATENT DOCUMENTS

| 2013/0339305 A1 | 12/2013 | Kim et al. |
| 2015/0105080 A1 | 4/2015 | Jin |

(Continued)

FOREIGN PATENT DOCUMENTS

| CN | 103634791 A | 3/2014 |
| CN | 103974250 A | 8/2014 |

(Continued)

OTHER PUBLICATIONS

"RSP Architecture Version 2.0," XP55404424, GSM Association, Aug. 23, 2016, 94 pages.

(Continued)

*Primary Examiner* — Bradley W Holder
(74) *Attorney, Agent, or Firm* — Conley Rose, P.C.

(57) ABSTRACT

A method includes receiving, by an embedded universal integrated circuit card (eUICC), first information from a local profile assistant (LPA), where the first information includes a first certificate issuer (CI) public key identifier, and the first CI public key identifier is a CI public key identifier that the eUICC does not have. The method further includes sending, by the eUICC, second information to an OPS, where the second information includes the first CI public key identifier. The method further includes receiving, by the eUICC, a patch package from the OPS, where the patch package includes at least a first CI public key corresponding to the first CI public key identifier. The method further includes updating, by the eUICC, a CI public key of the eUICC by using the first CI public key.

20 Claims, 49 Drawing Sheets

Related U.S. Application Data continuation of application No. 16/485,261, filed as application No. PCT/CN2018/071667 on Jan. 5, 2018, now Pat. No. 11,223,950.

(51) Int. Cl.
*H04W 12/30* (2021.01)
*H04W 12/72* (2021.01)
*H04L 9/30* (2006.01)
*H04L 9/32* (2006.01)

(52) U.S. Cl.
CPC ............... *H04W 12/72* (2021.01); *H04L 9/30* (2013.01); *H04L 9/3268* (2013.01)

(56) References Cited

U.S. PATENT DOCUMENTS

| | | |
|---|---|---|
| 2015/0304113 A1 | 10/2015 | Nix |
| 2016/0021529 A1* | 1/2016 | Park ..................... H04W 8/205 455/410 |
| 2016/0302061 A1* | 10/2016 | Park ..................... H04L 9/0866 |
| 2016/0344705 A1 | 11/2016 | Stumpf et al. |
| 2018/0070224 A1 | 3/2018 | Park et al. |
| 2018/0123803 A1 | 5/2018 | Park et al. |
| 2019/0294426 A1 | 9/2019 | Gao |

FOREIGN PATENT DOCUMENTS

| | | | |
|---|---|---|---|
| CN | 104703170 A | 6/2015 | |
| CN | 105282732 A | 1/2016 | |
| CN | 106168899 A | 11/2016 | |
| CN | 106304034 A | 1/2017 | |
| CN | 106888447 A | 6/2017 | |
| EP | 03297309 A1 | 3/2018 | |
| WO | 2016153281 A1 | 9/2016 | |
| WO | 2016167551 A1 | 10/2016 | |
| WO | WO-2016167551 A1 * | 10/2016 | ........... H04L 63/067 |
| WO | 2016178548 A1 | 11/2016 | |
| WO | WO-2016178548 A1 * | 11/2016 | ......... H04L 63/0281 |
| WO | 2017220154 A1 | 12/2017 | |

OTHER PUBLICATIONS

Cooper, D., et al.,"Internet X.509 Public Key Infrastructure Certificate and Certificate Revocation List (CRL) Profile," RFC 5280, May 2008, 151 pages.

Nokia, "Network access for remote credential provisioning of a UE—security considerations," S3-161353, 3GPP TSG SA WG3 (Security) Meeting SA3-NextGen, Sep. 27-29, 2016, 3 pages.

GSMA, "RSP Architecture Version 2.2", Official Document SGP. 21-RSP Architecture, Sep. 1, 2017, total 95 pages.

\* cited by examiner

US 11,930,360 B2

METHOD AND SYSTEM FOR UPDATING CERTIFICATE ISSUER PUBLIC KEY, AND RELATED DEVICE

CROSS-REFERENCE TO RELATED APPLICATIONS

This is a continuation of U.S. patent application Ser. No. 17/540,874 filed on Dec. 2, 2021, which is a continuation of U.S. patent application Ser. No. 16/485,261 filed on Aug. 12, 2019, now U.S. Pat. No. 11,223,950, which is a National Stage of International Application No. PCT/CN2018/071667 filed on Jan. 5, 2018, which claims priority to International Patent Application No. PCT/CN2017/073252 filed on Feb. 10, 2017. All of the aforementioned patent applications are hereby incorporated by reference in their entireties.

TECHNICAL FIELD

The present invention relates to the field of terminal technologies, and in particular, to a method and system for updating a certificate issuer public key, and a related device.

BACKGROUND

An embedded universal integrated circuit card (embedded Universal Integrated Circuit Card, eUICC) may also be referred to as an embedded subscriber identity module (embedded Subscriber Identity Module, eSIM). The eUICC may be placed into a user terminal (such as a mobile phone or a tablet computer) through insertion and removal or welding.

In actual application, after downloading and installing a profile (profile) provided by a communications operator, the eUICC can access a communications operator network (such as a 2G/3G/4G network). FIG. 1 is a schematic diagram of an existing profile downloading process. As shown in FIG. 1, the following processes 101 to 104 usually need to be performed when the eUICC downloads a profile: 101. an agreement signing process between a user terminal and a mobile network operator (Mobile Network Operator, MNO); 102. a downloading preparation process between the MNO and a subscription manager-data preparation (Subscription Manager-Data Preparation, SM-DP+) server; 103. an agreement termination process between the user terminal and the MNO; and 104. a profile downloading process between the SM-DP+ server and an eUICC of the user terminal.

As shown in FIG. 1, the part 104 includes a part 1041 to a part 1044.

1041. A local profile assistant (Local Profile Assistant, LPA) in the user terminal obtains an address of the SM-DP+ server.

1042. The LPA establishes a connection to the SM-DP+ server based on the address of the SM-DP+ server.

1043. After the LPA establishes the connection to the SM-DP+ server, the SM-DP+ server and the eUICC perform bidirectional authentication by using the LPA.

1044. After the bidirectional authentication performed between the SM-DP+ server and the eUICC by using the LPA succeeds, the SM-DP+ server sends a profile to the eUICC by using the LPA.

However, it is found in practice that when the eUICC needs to download a profile from the SM-DP+ server, if the eUICC does not have a certificate issuer public key (namely, a CI public key), the eUICC cannot successfully download the profile from the SM-DP+ server. Therefore, how to update, in time, the CI public key that the eUICC does not have is a problem to be urgently resolved currently.

SUMMARY

Embodiments of the present invention disclose a method and system for updating a certificate issuer public key, and a related device, so that an eUICC can be updated in time with a CI public key that the eUICC does not have, thereby facilitating in successfully downloading a profile.

According to a first aspect, a method for updating a certificate issuer public key is provided, where the method includes: an embedded universal integrated circuit card eUICC receives first information sent by a local profile assistant LPA, where the first information includes a first certificate issuer CI public key identifier, and the first CI public key identifier cannot match any CI public key identifier in a verification CI public key identifier list of the eUICC; the eUICC sends second information to an operating system patch server OPS by using the LPA, where the second information includes the first CI public key identifier; receiving, by the eUICC, a patch package sent by the OPS by using the LPA, where the patch package includes at least a first CI public key corresponding to the first CI public key identifier; and the eUICC updates a CI public key of the eUICC by using the first CI public key.

It may be learned that in the method provided in the first aspect, an SM-DP+ server may send the first CI public key identifier that the eUICC does not have to the eUICC in time, so that the eUICC updates an operating system of the eUICC with the first CI public key identifier in time, thereby ensuring that bidirectional authentication between the SM-DP+ server and the eUICC is successfully performed. Therefore, after the eUICC and the SM-DP+ server start a new profile downloading procedure, the eUICC can successfully download a profile from the SM-DP+ server.

In an optional implementation, an SM-DP+ server side may detect whether the first CI public key identifier cannot match any CI public key identifier in the CI public key identifier list; and if the SM-DP+ server detects that the first CI public key identifier cannot match any CI public key identifier in the verification CI public key identifier list, the SM-DP+ server sends the first information that includes the first CI public key identifier to the eUICC. In other words, in this implementation, the SM-DP+ server detects a CI public key identifier that the eUICC does not have.

In this implementation, after the eUICC receives the first information sent by the LPA, and before the eUICC sends the second information to the OPS by using the LPA, the eUICC may further perform the following parts: the eUICC verifies whether the first CI public key identifier cannot match any CI public key identifier in the verification CI public key identifier list; and after verifying that the first CI public key identifier cannot match any CI public key identifier in the signature verification CI public key identifier list, the eUICC performs the step that the eUICC sends second information to an OPS by using the LPA. In this way, the eUICC detects again whether the first CI public key identifier cannot match any CI public key identifier in the verification CI public key identifier list, so that a detection result can be more accurate.

In an optional implementation, the first information includes a first certificate, and the first CI public key identifier is included in the first certificate. Optionally, the first certificate may be CERT.DPauth.ECDSA.

In this implementation, if the first information includes the first certificate, after the eUICC receives the first certificate, the eUICC may verify whether the first CI public key identifier cannot match any CI public key identifier in the verification CI public key identifier list, in other words, the eUICC detects whether the eUICC does not have the first CI public key identifier. If verifying that the first CI public key identifier cannot match any CI public key identifier in the verification CI public key identifier list, the eUICC sends the second information to the OPS by using the LPA. To be specific, the first CI public key identifier in the first certificate may match a CI public key identifier in the verification CI public key identifier list, or the first CI public key identifier in the first certificate may not match a CI public key identifier in the verification CI public key identifier list. After the eUICC receives the first certificate, the eUICC verifies whether the first CI public key identifier cannot match any CI public key identifier in the verification CI public key identifier list, and if the first CI public key identifier matches a CI public key identifier in the verification CI public key identifier list, sends the second information to the OPS by using the LPA. In other words, in this implementation, the eUICC detects whether the eUICC does not have the first CI public key identifier.

In an optional implementation, after the eUICC receives the first information sent by the LPA, the eUICC may further discard a session state that is used to download a profile and that is maintained with the SM-DP+ server.

The session state that is used to download a profile and that is maintained with the SM-DP+ server is discarded, so that a session resource can be released, to enable a new session state used to download a patch package.

In an optional implementation, the second information further includes eUICC information, the eUICC information includes a signature CI public key identifier list, and after the eUICC sends the second information to the OPS by using the LPA, and before the eUICC receives the patch package sent by the OPS by using the LPA, the eUICC may further perform the following parts: the eUICC receives third information sent by the LPA, where the third information includes a second CI public key identifier, a digital certificate of the OPS, and a digital signature of the OPS, and the second CI public key identifier is an identifier in the signature CI public key identifier list of the eUICC information; after verification performed by the eUICC on the digital certificate of the OPS and the digital signature of the OPS succeeds, the eUICC generates a digital signature of the eUICC based on the second CI public key identifier; and the eUICC sends fourth information to the LPA, where the fourth information includes the digital signature of the eUICC, a digital certificate of the eUICC, and a digital certificate of an eUICC manufacturer EUM.

In this implementation, bidirectional authentication may be performed between the eUICC and the OPS, to ensure validity of the entities on both sides.

In an optional implementation, an initial secure channel message in the patch package includes a remote operation type identifier whose value indicates a binding patch package installation type, and the binding patch package installation type is used by the LPA to download the patch package for the eUICC and is used by the eUICC to install the patch package.

In an optional implementation, the patch package further includes the first CI public key identifier, the eUICC may further update the eUICC with the first CI public key identifier in the patch package.

In this implementation, a CI public key identifier list can be updated with the first CI public key identifier that the eUICC does not have.

In an optional implementation, the first CI public key identifier is included in a storage metadata message of the patch package.

In an optional implementation, the second information further includes an identifier of an encryption algorithm supported by the eUICC, the patch package further includes a first encryption algorithm identifier corresponding to the first CI public key and a first encryption algorithm corresponding to the first encryption algorithm identifier, the first encryption algorithm identifier does not match an identifier of any encryption algorithm supported by the eUICC, and the eUICC may further update an encryption algorithm library of the eUICC with the first encryption algorithm identifier and the first encryption algorithm.

In this implementation, the encryption algorithm library can be updated with the first encryption algorithm identifier and the first encryption algorithm that the eUICC does not have. In this implementation, all patches can be placed into one patch package and the patch package is sent to the eUICC.

In an optional implementation, the first encryption algorithm identifier is included in the storage metadata message of the patch package.

In an optional implementation, the second information further includes an identifier of an encryption algorithm supported by the eUICC, and the eUICC may further receive an encryption algorithm patch package sent by the OPS by using the LPA, where the encryption algorithm patch package includes a first encryption algorithm identifier corresponding to the first CI public key and a first encryption algorithm corresponding to the first encryption algorithm identifier, and the first encryption algorithm identifier does not match an identifier of any encryption algorithm supported by the eUICC; correspondingly, a specific implementation in which the eUICC receives the patch package sent by the OPS by using the LPA may be as follows: the eUICC receives an input key command sent by the OPS by using the LPA, where the input key command includes the first CI public key identifier and the first CI public key; and correspondingly, the eUICC may further update an encryption algorithm library of the eUICC with the first encryption algorithm identifier and the first encryption algorithm; and the eUICC may further update the eUICC with the first CI public key identifier.

In this implementation, the eUICC may separately receive the encryption algorithm patch package and the input key command, to separately update the eUICC with the first encryption algorithm identifier and the first encryption algorithm that are in the encryption algorithm patch package and the first CI public key identifier and the first CI public key that are in the input key command.

In an optional implementation, the second information further includes an identifier of an encryption algorithm supported by the eUICC, and the eUICC may further receive an encryption algorithm patch package sent by the OPS by using the LPA, where the encryption algorithm patch package includes a first encryption algorithm identifier corresponding to the first CI public key and a first encryption algorithm corresponding to the first encryption algorithm identifier, and the first encryption algorithm identifier does not match an identifier of any encryption algorithm supported by the eUICC; correspondingly, a specific implementation in which the eUICC receives the patch package sent by the OPS by using the LPA may be as follows: the eUICC receives a CI public key patch package sent by the OPS by using the LPA, where the CI public key patch package includes the first CI public key identifier and the first CI public key; and correspondingly, the eUICC may further update an encryption algorithm library of the eUICC with the first encryption algorithm identifier and the first encryption algorithm; and the eUICC may further update the eUICC with the first CI public key identifier.

In this implementation, the eUICC may separately receive the encryption algorithm patch package and the CI public key patch package, to separately update the eUICC with the first encryption algorithm identifier and the first encryption algorithm that are in the encryption algorithm patch package and the first CI public key identifier and the first CI public key that are in the CI public key patch package.

According to a second aspect, a method for updating a certificate issuer public key is further provided, where the method includes: an SM-DP+ server receives eUICC information sent by an LPA, where the eUICC information includes a verification certificate issuer CI public key identifier list; and if a first CI public key identifier exists on the SM-DP+ server, the SM-DP+ server sends first information to an eUICC by using the LPA, where the first information includes the first CI public key identifier, and the first CI public key identifier does not match any CI public key identifier in the verification CI public key identifier list.

It may be learned that in the method provided in the second aspect, the SM-DP+ server may send the first CI public key identifier that the eUICC does not have to the eUICC in time, so that the eUICC downloads the first CI public key in time, and updates an operating system of the eUICC with the first CI public key in time, thereby ensuring that bidirectional authentication between the SM-DP+ server and the eUICC is successfully performed. Therefore, after the eUICC and the SM-DP+ server start a new profile downloading procedure, the eUICC can successfully download a profile from the SM-DP+ server.

In an optional implementation, after sending the first information to the eUICC by using the LPA, the SM-DP+ server may further discard a session state that is used to download a profile and that is maintained with the eUICC.

The session state that is used to download a profile and that is maintained with the eUICC is discarded, so that a session resource can be released, to enable a new session state.

According to a third aspect, a method for updating a certificate issuer public key is further provided, where the method includes: an OPS receives second information sent by an LPA, where the second information includes a first certificate issuer CI public key identifier; the OPS generates a patch package, where the patch package includes at least a first CI public key corresponding to the first CI public key identifier; and the OPS sends the patch package to an eUICC by using the LPA.

It may be learned that in the method provided in the first aspect, the first CI public key that the eUICC does not have is downloaded for the eUICC in time, so that the eUICC can update an operating system of the eUICC with the first CI public key in time, thereby ensuring that bidirectional authentication between an SM-DP+ server and the eUICC is successfully performed. Therefore, after the eUICC and the SM-DP+ server start a new profile downloading procedure, the eUICC can successfully download a profile from the SM-DP+ server.

In an optional implementation, the second information further includes eUICC information, the eUICC information includes a signature CI public key identifier list, and before generating the patch package, the OPS may further perform the following parts: the OPS generates a digital signature of the OPS by using the first CI public key identifier; the OPS obtains a second CI public key identifier from the signature CI public key identifier list, where the second CI public key identifier is any identifier in the signature CI public key identifier list; the OPS sends third information to the eUICC by using the LPA, where the third information includes the second CI public key identifier, a digital certificate of the OPS, and the digital signature of the OPS; the OPS receives fourth information sent by the LPA, where the fourth information includes a digital signature of the eUICC, a digital certificate of the eUICC, and a digital certificate of an eUICC manufacturer EUM; the OPS performs verification on the digital certificate of the EUM by using a second CI public key corresponding to the second CI public key identifier; if the verification performed on the digital certificate of the EUM succeeds, the OPS performs verification on the digital certificate of the eUICC and the digital signature of the eUICC; and if the verification performed on both the digital certificate of the eUICC and the digital signature of the eUICC succeeds, the OPS performs the step that the OPS generates a patch package.

In this implementation, bidirectional authentication may be performed between the eUICC and the OPS, to ensure validity of the entities on both sides.

In an optional implementation, an initial secure channel message in the patch package includes a remote operation type identifier whose value indicates a binding patch package installation type, and the binding patch package installation type is used by the LPA to download the patch package for the eUICC and is used by the eUICC to install the patch package.

In an optional implementation, the patch package further includes the first CI public key identifier.

In an optional implementation, the first CI public key identifier is included in a storage metadata message of the patch package.

In an optional implementation, the second information further includes an identifier of an encryption algorithm supported by the eUICC, the patch package further includes a first encryption algorithm identifier corresponding to the first CI public key and a first encryption algorithm corresponding to the first encryption algorithm identifier, and the OPS may further perform the following parts: the OPS determines that the first encryption algorithm identifier does not match an identifier of any encryption algorithm supported by the eUICC.

In this implementation, the eUICC can be updated with the first CI public key identifier, the first CI public key, the first encryption algorithm identifier, and the first encryption algorithm that the eUICC does not have. In this implementation, all patches can be placed into one patch package and the patch package is sent to the eUICC.

In an optional implementation, the first encryption algorithm identifier is included in the storage metadata message of the patch package.

In an optional implementation, the second information further includes an identifier of an encryption algorithm supported by the eUICC, and the OPS may further perform the following parts: the OPS determines that a first encryption algorithm identifier corresponding to the first CI public key does not match an identifier of any encryption algorithm supported by the eUICC; the OPS generates an encryption algorithm patch package, where the encryption algorithm patch package includes the first encryption algorithm identifier and a first encryption algorithm corresponding to the first encryption algorithm identifier; and the OPS sends the encryption algorithm patch package to the eUICC; correspondingly, a specific implementation in which the OPS generates the patch package may be as follows: the OPS generates an input key command, where the input key command includes the first CI public key identifier and the first CI public key; and correspondingly, a specific implementation in which the OPS sends the patch package to the embedded universal integrated circuit card eUICC by using the LPA may be as follows: the OPS sends the input key command to the eUICC.

In this implementation, the OPS may separately send the encryption algorithm patch package and the input key command, so that the eUICC can further separately update the eUICC with the first encryption algorithm identifier and the first encryption algorithm that are in the encryption algorithm patch package and the first CI public key identifier and the first CI public key that are in the input key command.

In an optional implementation, the second information further includes an identifier of an encryption algorithm supported by the eUICC, and the OPS may further perform the following parts: the OPS determines that a first encryption algorithm identifier corresponding to the first CI public key does not match an identifier of any encryption algorithm supported by the eUICC; the OPS generates an encryption algorithm patch package, where the encryption algorithm patch package includes the first encryption algorithm identifier and a first encryption algorithm corresponding to the first encryption algorithm identifier; and the OPS sends the encryption algorithm patch package to the eUICC; correspondingly, a specific implementation in which the OPS generates the patch package may be as follows: the OPS generates a CI public key patch package, where the CI public key patch package includes the first CI public key identifier and the first CI public key; and correspondingly, a specific implementation in which the OPS sends the patch package to the embedded universal integrated circuit card eUICC by using the LPA may be as follows: the OPS sends the CI public key patch package to the eUICC.

In this implementation, the OPS may separately send the encryption algorithm patch package and the CI public key patch package, so that the eUICC can further separately update the eUICC with the first encryption algorithm identifier and the first encryption algorithm that are in the encryption algorithm patch package and the first CI public key identifier and the first CI public key that are in the CI public key patch package.

According to a fourth aspect, an eUICC is provided. The eUICC has a function of implementing behavior of the eUICC in the first aspect or the possible implementations of the first aspect. The function may be implemented by hardware, or may be implemented by hardware by executing corresponding software. The hardware or the software includes one or more units corresponding to the foregoing function. The unit may be software and/or hardware. Based on a same inventive concept, for a problem-resolving principle and beneficial effects of the eUICC, refer to the first aspect, the possible method implementations of the first aspect, and the brought beneficial effects. Therefore, for implementation of the eUICC, refer to the first aspect and the possible method implementations of the first aspect. No repeated description is provided.

According to a fifth aspect, an SM-DP+ server is provided. The SM-DP+ server has a function of implementing behavior of the SM-DP+ server in the second aspect or the possible implementations of the second aspect. The function may be implemented by hardware, or may be implemented by hardware by executing corresponding software. The hardware or the software includes one or more units corresponding to the foregoing function. The unit may be software and/or hardware. Based on a same inventive concept, for a problem-resolving principle and beneficial effects of the SM-DP+ server, refer to the second aspect, the possible method implementations of the second aspect, and the brought beneficial effects. Therefore, for implementation of the SM-DP+ server, refer to the second aspect and the possible method implementations of the second aspect. No repeated description is provided.

According to a sixth aspect, an OPS is provided. The OPS has a function of implementing behavior of the OPS in the third aspect or the possible implementations of the third aspect. The function may be implemented by hardware, or may be implemented by hardware by executing corresponding software. The hardware or the software includes one or more units corresponding to the foregoing function. The unit may be software and/or hardware. Based on a same inventive concept, for a problem-resolving principle and beneficial effects of the OPS, refer to the third aspect, the possible method implementations of the third aspect, and the brought beneficial effects. Therefore, for implementation of the OPS, refer to the third aspect and the possible method implementations of the third aspect. No repeated description is provided.

According to a seventh aspect, an eUICC is provided, where the eUICC includes a processor, a memory, a communications interface, and one or more programs. The processor is connected to the communications interface and the memory, the one or more programs are stored in the memory, and the processor invokes the programs stored in the memory to implement the solution in the method design of the first aspect. For a problem-resolving implementation and beneficial effects of the eUICC, refer to the first aspect, the possible method implementations of the first aspect, and the beneficial effects. No repeated description is provided.

According to an eighth aspect, an SM-DP+ server is provided, where the SM-DP+ server includes a processor, a memory, a communications interface, and one or more programs. The processor is connected to the communications interface and the memory, the one or more programs are stored in the memory, and the processor invokes the programs stored in the memory to implement the solution in the method design of the second aspect. For a problem-resolving implementation and beneficial effects of the SM-DP+ server, refer to the second aspect, the possible method implementations of the second aspect, and the beneficial effects. No repeated description is provided.

According to a ninth aspect, an OPS is provided, where the OPS includes a processor, a memory, a communications interface, and one or more programs. The processor is connected to the communications interface and the memory, the one or more programs are stored in the memory, and the processor invokes the programs stored in the memory to implement the solution in the method design of the third aspect. For a problem-resolving implementation and beneficial effects of the OPS, refer to the third aspect, the possible method implementations of the third aspect, and the beneficial effects. No repeated description is provided.

According to a tenth aspect, a system for updating a certificate issuer public key is provided, where the system includes the eUICC in the fourth aspect, the SM-DP+ server in the fifth aspect, and the OPS in the sixth aspect.

According to an eleventh aspect, a method for updating a certificate issuer public key is provided, where the method includes: an embedded universal integrated circuit card eUICC receives first information sent by a local profile assistant LPA, where the first information includes a first certificate issuer CI public key identifier, and the first CI public key identifier cannot match any CI public key identifier in a verification CI public key identifier list of the eUICC; the eUICC sends second information to an operating system patch server OPS, where the second information includes the first CI public key identifier; the eUICC receives a patch package sent by the OPS, where the patch package includes at least a first CI public key corresponding to the first CI public key identifier; and the eUICC updates a CI public key of the eUICC by using the first CI public key.

It may be learned that in the method described in the eleventh aspect, a CI public key identifier that the eUICC does not have can be updated in time, to ensure that the eUICC updates the first public key after the LPA obtains a CI public key identifier that is of an SM DP+ server and that is required for bidirectional authentication between the SM-DP+ server and the eUICC, so that subsequent bidirectional authentication is successfully performed. Therefore, after the bidirectional authentication between the SM-DP+ server and the eUICC succeeds, a profile can be successfully downloaded.

Optionally, the first CI public key identifier is obtained by the LPA by parsing an activation code or a command code, or the first CI public key identifier is information received by the LPA from the server.

Optionally, before the embedded universal integrated circuit card eUICC receives the first information sent by the local profile assistant LPA, the eUICC sends the verification CI public key identifier list of the eUICC to the LPA, where the verification CI public key identifier list is used by the LPA to verify, after obtaining the first CI public key identifier, whether the first CI public key identifier matches any CI public key identifier in the verification CI public key identifier list, and is used by the LPA to send the first information to the eUICC after verifying that the first CI public key identifier cannot match any CI public key identifier in the verification CI public key identifier list.

In this implementation, the LPA may detect whether the eUICC does not have the first CI public key identifier.

Optionally, after the embedded universal integrated circuit card eUICC receives the first information sent by the local profile assistant LPA, and before the eUICC sends the second information to the OPS, the eUICC verifies whether the first CI public key identifier matches any CI public key identifier in the verification CI public key identifier list; and after verifying that the first CI public key identifier cannot match any CI public key identifier in the signature verification CI public key identifier list, the eUICC performs the step that the eUICC sends second information to an OPS.

In this implementation, the eUICC may detect whether the eUICC does not have the first CI public key identifier.

According to a twelfth aspect, a method for updating a certificate issuer public key is provided, where the method includes: a local profile assistant LPA obtains a first certificate issuer CI public key identifier, where the first CI public key identifier cannot match any CI public key identifier in a verification CI public key identifier list of an embedded universal integrated circuit card eUICC; and the LPA sends first information to the eUICC, where the first information includes the first CI public key identifier.

It may be learned that in the method described in the twelfth aspect, a CI public key identifier that the eUICC does not have can be updated in time, to ensure that the eUICC updates the first public key after the LPA obtains a CI public key identifier that is of an SM DP+ server and that is required for bidirectional authentication between the SM-DP+ server and the eUICC, so that subsequent bidirectional authentication is successfully performed. Therefore, after the bidirectional authentication between the SM-DP+ server and the eUICC succeeds, a profile can be successfully downloaded.

Optionally, the first CI public key identifier is obtained by the LPA by parsing an activation code or a command code, or the first CI public key identifier is information received by the LPA from a server.

Optionally, the LPA may further receive the verification CI public key identifier list of the eUICC from the eUICC; after the LPA obtains the first CI public key identifier, the LPA verifies whether the first CI public key identifier matches any CI public key identifier in the verification CI public key identifier list; and after verifying that the first CI public key identifier cannot match any CI public key identifier in the verification CI public key identifier list, the LPA performs the step that the LPA sends first information to the embedded universal integrated circuit card eUICC.

In this implementation, the LPA may detect whether the eUICC does not have the first CI public key identifier.

Optionally, after the LPA sends the first information to the eUICC, the LPA sends a session termination message to the eUICC, to discard a session state that is used to download a profile and that is maintained with the eUICC. In this way, a session resource can be released, to enable a new session state used to download a patch package.

According to a thirteenth aspect, a method for updating a certificate issuer public key is provided, where the method includes: an operating system patch server OPS receives second information sent by an embedded universal integrated circuit card eUICC, where the second information includes a first certificate issuer CI public key identifier, and the first CI public key identifier cannot match any CI public key identifier in a verification CI public key identifier list of the eUICC; the OPS generates a patch package, where the patch package includes at least a first CI public key corresponding to the first CI public key identifier; and the OPS sends the patch package to the eUICC, where the patch package is used by the eUICC to update a CI public key of the eUICC by using the first CI public key in the patch package.

It may be learned that in the method described in the thirteenth aspect, a CI public key identifier that the eUICC does not have can be updated in time, to ensure that the eUICC updates the first public key after the LPA obtains a CI public key identifier that is of an SM DP+ server and that is required for bidirectional authentication between the SM-DP+ server and the eUICC, so that subsequent bidirectional authentication is successfully performed. Therefore, after the bidirectional authentication between the SM-DP+ server and the eUICC succeeds, a profile can be successfully downloaded.

According to a fourteenth aspect, a method for updating a certificate issuer public key is provided, where the method includes: a subscription manager-data preparation SM-DP+ server receives embedded universal integrated circuit card eUICC information sent by a local profile assistant LPA, where the eUICC information includes a verification certificate issuer CI public key identifier list of an eUICC; the SM-DP+ server matches a CI public key identifier stored on the SM-DP+ server against a CI public key identifier in the verification CI public key identifier list; and if a first CI public key identifier exists on the SM-DP+ server, and the first CI public key identifier does not match any CI public key identifier in the verification CI public key identifier list, the SM-DP+ server sends first information to an operating system patch server OPS, where the first information includes the first CI public key identifier.

It may be learned that in the method described in the fourteenth aspect, a CI public key identifier that the eUICC does not have can be updated in time, to ensure that the eUICC updates the first public key after the LPA obtains a CI public key identifier that is of the SM DP+ server and that is required for bidirectional authentication between the SM-DP+ server and the eUICC, so that subsequent bidirectional authentication is successfully performed. Therefore, after the bidirectional authentication between the SM-DP+ server and the eUICC succeeds, a profile can be successfully downloaded.

Optionally, after the subscription manager-data preparation SM-DP+ server receives the embedded universal integrated circuit card eUICC information sent by the local profile assistant LPA, the SM-DP+ server sends a session termination message to the LPA, to discard a session state that is used to download a profile and that is maintained with the eUICC.

The session state that is used to download a profile and that is maintained with the eUICC is discarded, so that a session resource can be released, to enable a new session state used to download a patch package.

According to a fifteenth aspect, a method for updating a certificate issuer public key is provided, where the method includes: an operating system patch server OPS receives first information sent by a subscription manager-data preparation SM-DP+ server, where the first information includes a first certificate issuer CI public key identifier, and the first CI public key identifier does not match any CI public key identifier in a verification CI public key identifier list of a universal integrated circuit card eUICC; the OPS generates a patch package, where the patch package includes at least a first CI public key corresponding to the first CI public key identifier; and the OPS sends the patch package to the eUICC, where the patch package is used by the eUICC to update a CI public key of the eUICC by using the first CI public key in the patch package.

It may be learned that in the method described in the fifteenth aspect, a CI public key identifier that the eUICC does not have can be updated in time, to ensure that the eUICC updates the first public key after the LPA obtains a CI public key identifier that is of the SM DP+ server and that is required for bidirectional authentication between the SM-DP+ server and the eUICC, so that subsequent bidirectional authentication is successfully performed. Therefore, after the bidirectional authentication between the SM-DP+ server and the eUICC succeeds, a profile can be successfully downloaded.

According to a sixteenth aspect, a method for updating a certificate issuer public key is provided, where the method includes: a local profile assistant LPA obtains a first certificate issuer CI public key identifier, where the first CI public key identifier cannot match any CI public key identifier in a verification CI public key identifier list of an embedded universal integrated circuit card eUICC; and the LPA sends first information to an operating system patch server OPS, where the first information includes the first CI public key identifier.

It may be learned that in the method described in the sixteenth aspect, a CI public key identifier that the eUICC does not have can be updated in time, to ensure that the eUICC updates the first public key after the LPA obtains a CI public key identifier that is of an SM DP+ server and that is required for bidirectional authentication between the SM-DP+ server and the eUICC, so that subsequent bidirectional authentication is successfully performed. Therefore, after the bidirectional authentication between the SM-DP+ server and the eUICC succeeds, a profile can be successfully downloaded.

Optionally, the first CI public key identifier is obtained by the LPA by parsing an activation code or a command code, or the first CI public key identifier is information received by the LPA from the server.

Optionally, the LPA receives the verification CI public key identifier list of the eUICC from the eUICC; after the LPA obtains the first CI public key identifier, the LPA verifies whether the first CI public key identifier matches any CI public key identifier in the verification CI public key identifier list; and after verifying that the first CI public key identifier cannot match any CI public key identifier in the verification CI public key identifier list, the LPA performs the step that the LPA sends first information to an operating system patch server OPS.

According to a seventeenth aspect, a method for updating a certificate issuer public key is provided, where the method includes: an operating system patch server OPS receives first information sent by a local profile assistant LPA, where the first information includes a first certificate issuer CI public key identifier, and the first CI public key identifier does not match any CI public key identifier in a verification CI public key identifier list of a universal integrated circuit card eUICC; the OPS generates a patch package, where the patch package includes at least a first CI public key corresponding to the first CI public key identifier; and the OPS sends the patch package to the eUICC, where the patch package is used by the eUICC to update a CI public key of the eUICC by using the first CI public key in the patch package.

It may be learned that in the method described in the seventeenth aspect, a CI public key identifier that the eUICC does not have can be updated in time, to ensure that the eUICC updates the first public key after the LPA obtains a CI public key identifier that is of an SM DP+ server and that is required for bidirectional authentication between the SM-DP+ server and the eUICC, so that subsequent bidirectional authentication is successfully performed. Therefore, after the bidirectional authentication between the SM-DP+ server and the eUICC succeeds, a profile can be successfully downloaded.

According to an eighteenth aspect, an embedded universal integrated circuit card eUICC is provided, where the eUICC includes: a communications module, configured to receive first information sent by a local profile assistant LPA, where the first information includes a first certificate issuer CI public key identifier, and the first CI public key identifier cannot match any CI public key identifier in a verification CI public key identifier list of the eUICC; where the communications module is further configured to send second information to an operating system patch server OPS, where the second information includes the first CI public key identifier; and the communications module is further configured to receive a patch package sent by the OPS, where the patch package includes at least a first CI public key corresponding to the first CI public key identifier; and a processing module, configured to update, by the eUICC, a CI public key of the eUICC by using the first CI public key.

Optionally, the first CI public key identifier is obtained by the LPA by parsing an activation code or a command code, or the first CI public key identifier is information received by the LPA from the server.

Optionally, the communications module is further configured to: before receiving the first information sent by the local profile assistant LPA, send the verification CI public key identifier list of the eUICC to the LPA, where the verification CI public key identifier list is used by the LPA to verify, after obtaining the first CI public key identifier, whether the first CI public key identifier matches any CI public key identifier in the verification CI public key identifier list, and is used by the LPA to send the first information to the eUICC after verifying that the first CI public key identifier cannot match any CI public key identifier in the verification CI public key identifier list.

According to a nineteenth aspect, a local profile assistant LPA is provided, where the LPA includes: a processing module, configured to obtain a first certificate issuer CI public key identifier, where the first CI public key identifier cannot match any CI public key identifier in a verification CI public key identifier list of an embedded universal integrated circuit card eUICC; and a communications module, configured to send first information to the eUICC, where the first information includes the first CI public key identifier.

Optionally, the first CI public key identifier is obtained by the LPA by parsing an activation code or a command code, or the first CI public key identifier is information received by the LPA from a server.

Optionally, the communications module is further configured to receive the verification CI public key identifier list of the eUICC from the eUICC; the processing module is further configured to: verify, after obtaining the first CI public key identifier, whether the first CI public key identifier matches any CI public key identifier in the verification CI public key identifier list; and after verifying that the first CI public key identifier cannot match any CI public key identifier in the verification CI public key identifier list, the processing module triggers the communications module to send the first information to the embedded universal integrated circuit card eUICC.

Optionally, the communications module is further configured to: after sending the first information to the eUICC, send a session termination message to the eUICC, to discard a session state that is used to download a profile and that is maintained with the eUICC. In this way, a session resource can be released, to enable a new session state used to download a patch package.

According to a twentieth aspect, an operating system patch server OPS is provided, where the OPS includes: a communications module, configured to receive second information sent by an embedded universal integrated circuit card eUICC, where the second information includes a first certificate issuer CI public key identifier, and the first CI public key identifier cannot match any CI public key identifier in a verification CI public key identifier list of the eUICC; and a processing module, configured to generate a patch package, where the patch package includes at least a first CI public key corresponding to the first CI public key identifier. The communications module is further configured to send the patch package to the eUICC, where the patch package is used by the eUICC to update a CI public key of the eUICC by using the first CI public key in the patch package.

According to a twenty-first aspect, a subscription manager-data preparation SM-DP+ server is provided, where the SM-DP+ server includes: a communications module, configured to receive embedded universal integrated circuit card eUICC information sent by a local profile assistant LPA, where the eUICC information includes a verification certificate issuer CI public key identifier list of an eUICC; and a processing module, configured to match a CI public key identifier stored on the SM-DP+ server against a CI public key identifier in the verification CI public key identifier list. The communications module is further configured to: when the processing module determines that a first CI public key identifier exists on the SM-DP+ server, and the first CI public key identifier does not match any CI public key identifier in the verification CI public key identifier list, send first information to an operating system patch server OPS, where the first information includes the first CI public key identifier.

Optionally, the communications module is further configured to: after receiving the embedded universal integrated circuit card eUICC information sent by the local profile assistant LPA, send a session termination message to the LPA, to discard a session state that is used to download a profile and that is maintained with the eUICC.

According to a twenty-second aspect, an operating system patch server OPS is provided, where the OPS includes: a communications module, configured to receive first information sent by a subscription manager-data preparation SM-DP+ server, where the first information includes a first certificate issuer CI public key identifier, and the first CI public key identifier does not match any CI public key identifier in a verification CI public key identifier list of a universal integrated circuit card eUICC; and a processing module, configured to generate a patch package, where the patch package includes at least a first CI public key corresponding to the first CI public key identifier. The communications module is further configured to send the patch package to the eUICC, where the patch package is used by the eUICC to update a CI public key of the eUICC by using the first CI public key in the patch package.

According to a twenty-third aspect, a local profile assistant LPA is provided, where the LPA includes: a processing module, configured to obtain a first certificate issuer CI public key identifier, where the first CI public key identifier cannot match any CI public key identifier in a verification CI public key identifier list of an embedded universal integrated circuit card eUICC; and a communications module, configured to send first information to an operating system patch server OPS, where the first information includes the first CI public key identifier.

Optionally, the first CI public key identifier is obtained by the LPA by parsing an activation code or a command code, or the first CI public key identifier is information received by the LPA from the server.

Optionally, the communications module is further configured to receive the verification CI public key identifier list of the eUICC from the eUICC; the processing module is further configured to: verify, after obtaining the first CI public key identifier, whether the first CI public key identifier matches any CI public key identifier in the verification CI public key identifier list; and after verifying that the first CI public key identifier cannot match any CI public key identifier in the verification CI public key identifier list, the processing module triggers the communications module to send the first information to the operating system patch server OPS.

According to a twenty-third aspect, an operating system patch server OPS is provided, where the OPS includes: a communications module, configured to receive first information sent by a local profile assistant LPA, where the first information includes a first certificate issuer CI public key identifier, and the first CI public key identifier does not match any CI public key identifier in a verification CI public key identifier list of a universal integrated circuit card eUICC; and a processing module, configured to generate a patch package, where the patch package includes at least a first CI public key corresponding to the first CI public key identifier. The communications module is further configured to send the patch package to the eUICC, where the patch package is used by the eUICC to update a CI public key of the eUICC by using the first CI public key in the patch package.

According to a twenty-fourth aspect, an eUICC is provided, where the eUICC includes a processor, a memory, a communications interface, and one or more programs. The processor is connected to the communications interface and the memory, the one or more programs are stored in the memory, and the processor invokes the programs stored in the memory to implement the solution in the method design of the eleventh aspect. For a problem-resolving implementation and beneficial effects of the eUICC, refer to the eleventh aspect, the possible method implementations of the eleventh aspect, and the beneficial effects. No repeated description is provided.

According to a twenty-fifth aspect, an LPA is provided, where the LPA includes a processor, a memory, a communications interface, and one or more programs. The processor is connected to the communications interface and the memory, the one or more programs are stored in the memory, and the processor invokes the programs stored in the memory to implement the solution in the method design of the twelfth aspect or the sixteenth aspect. For a problem-resolving implementation and beneficial effects of the LPA, refer to the twelfth aspect or the sixteenth aspect, the possible method implementations of the twelfth aspect or the sixteenth aspect, and the beneficial effects. No repeated description is provided.

According to a twenty-sixth aspect, an OPS is provided, where the OPS includes a processor, a memory, a communications interface, and one or more programs. The processor is connected to the communications interface and the memory, the one or more programs are stored in the memory, and the processor invokes the programs stored in the memory to implement the solution in the method design of the thirteenth aspect, the fifteenth aspect, or the seventeenth aspect. For a problem-resolving implementation and beneficial effects of the LPA, refer to the thirteenth aspect, the fifteenth aspect, or the seventeenth aspect, and the beneficial effects. No repeated description is provided.

According to a twenty-seventh aspect, an SM-DP+ server is provided, where the SM-DP+ server includes a processor, a memory, a communications interface, and one or more programs. The processor is connected to the communications interface and the memory, the one or more programs are stored in the memory, and the processor invokes the programs stored in the memory to implement the solution in the method design of the fourteenth aspect. For a problem-resolving implementation and beneficial effects of the SM-DP+ server, refer to the fourteenth aspect, the possible method implementations of the fourteenth aspect, and the beneficial effects. No repeated description is provided.

According to a twenty-eighth aspect, a computer storage medium is provided, where the computer storage medium stores a program, and when being executed, the program implements the eleventh aspect and the possible method implementations of the eleventh aspect.

According to a twenty-ninth aspect, a computer storage medium is provided, where the computer storage medium stores a program, and when being executed, the program implements the twelfth aspect and the possible method implementations of the twelfth aspect, or the sixteenth aspect and the possible method implementations of the sixteenth aspect.

According to a thirtieth aspect, a computer storage medium is provided, where the computer storage medium stores a program, and when being executed, the program implements the method in the thirteenth aspect, the method in the fifteenth aspect, or the method in the seventeenth aspect.

According to a thirty-first aspect, a computer storage medium is provided, where the computer storage medium stores a program, and when being executed, the program implements the fourteenth aspect or the possible method implementations of the fourteenth aspect.

According to a thirty-second aspect, a computer program product that includes an instruction is provided, where when the computer program product is run on a computer, the computer implements the eleventh aspect and the possible method implementations of the eleventh aspect.

According to a thirty-third aspect, a computer program product including an instruction is provided, where when being run on a computer, the computer program product enables the computer to implement the twelfth aspect and the possible method implementations of the twelfth aspect, or the sixteenth aspect and the possible method implementations of the sixteenth aspect.

According to a thirty-fourth aspect, a computer program product including an instruction is provided, where when being run on a computer, the computer program product enables the computer to implement the method in the thirteenth aspect, the method in the fifteenth aspect, or the method in the seventeenth aspect.

According to a thirty-fifth aspect, a computer program product including an instruction is provided, where when being run on a computer, the computer program product enables the computer to implement the fourteenth aspect and the possible method implementations of the fourteenth aspect.

BRIEF DESCRIPTION OF DRAWINGS

FIG. 6 to FIG. 8A, FIG. 8B, and FIG. 8C are schematic flowcharts of a method for updating a certificate issuer public key according to embodiments of the present invention;

FIG. 14A, FIG. 14B, and FIG. 14C to FIG. 26 are schematic flowcharts of a method for updating a certificate issuer public key according to embodiments of the present invention;

DESCRIPTION OF EMBODIMENTS

To make the objectives, technical solutions, and advantages of the present invention clearer, the following describes the technical solutions in the embodiments of the present invention with reference to the accompanying drawings.

Figure 1:
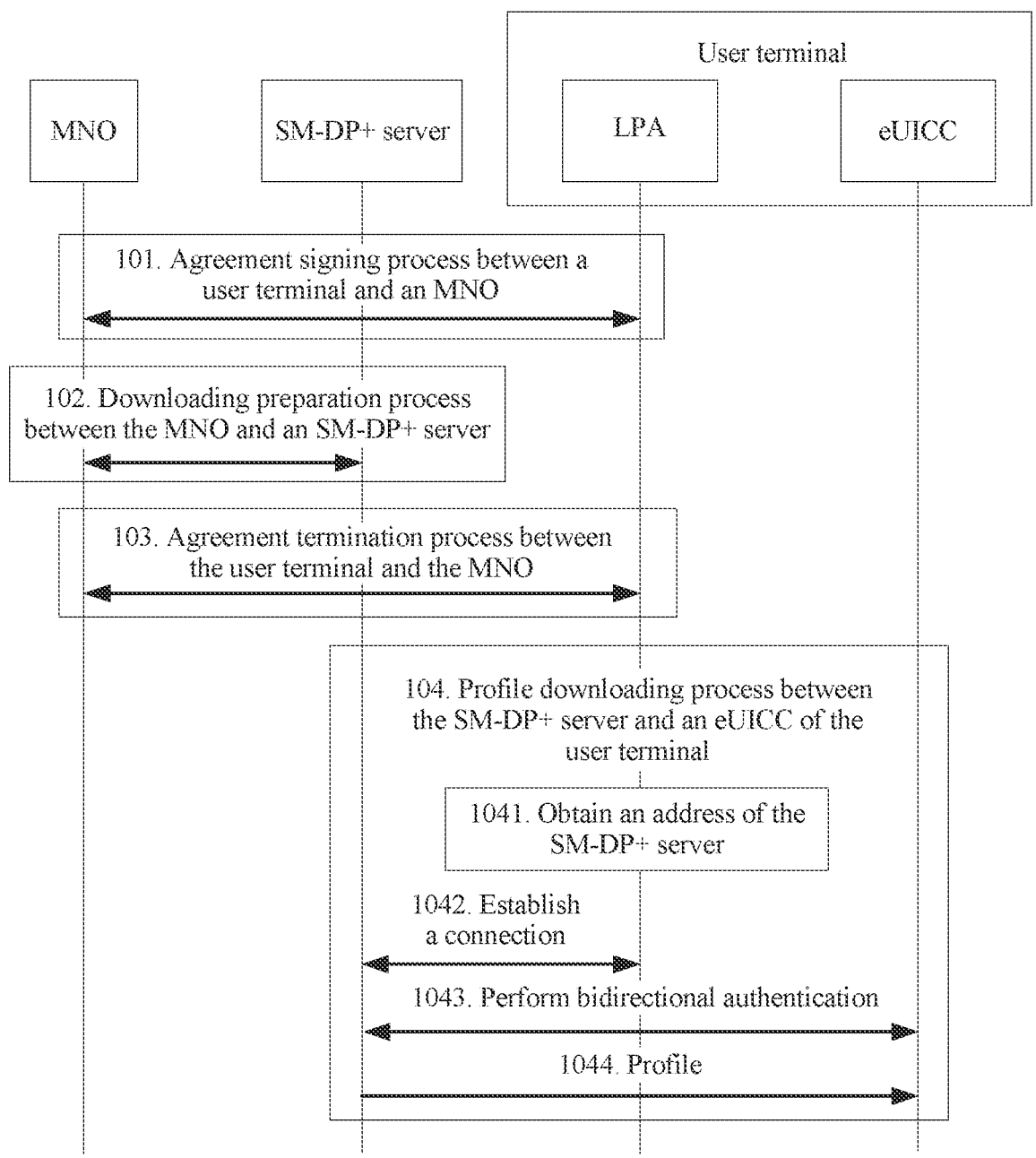
FIG. 1 is a schematic diagram of an existing profile downloading process according to an embodiment of the present invention.

To facilitate understanding of the embodiments of the present invention, the following first describes a system architecture, an eUICC software architecture, and a specific process of existing bidirectional authentication (namely, a part 1043 in FIG. 1) between an SM-DP+ server and an eUICC according to the embodiments of the present invention.

Figure 2:
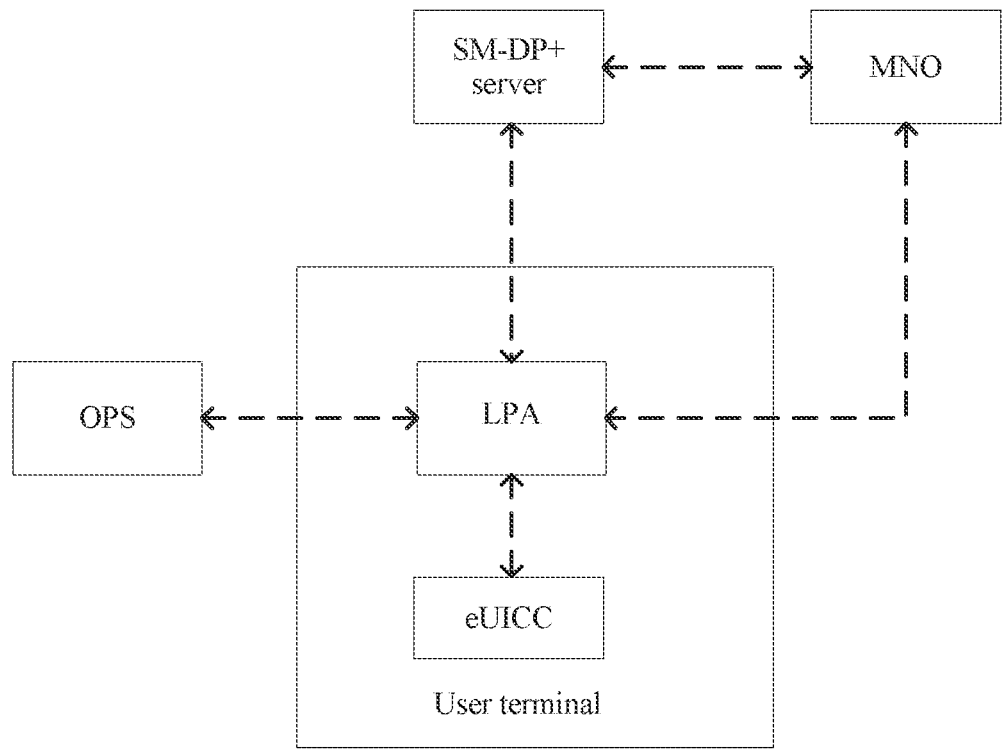
FIG. 2 is a schematic diagram of a system architecture according to an embodiment of the present invention.

FIG. 2 is a diagram of a system architecture according to an embodiment of the present invention. As shown in FIG. 2, the system architecture includes a user terminal, an SM-DP+ server, an MNO, and an operating system patch server (OS patch server, OPS).

The user terminal may include various electronic devices, such as a mobile phone, a tablet computer, a personal digital assistant (Personal Digital Assistant, PDA), a television, an in-vehicle device, a machine-to-machine (Machine to Machine, M2M) device, a mobile Internet device (Mobile Internet Device, MID), and an intelligent wearable device (such as a smartwatch or a smart band). An eUICC and an LPA are disposed in the user terminal. The LPA may be deployed in the eUICC, or the LPA and the eUICC may be deployed independently. In FIG. 2, an example in which the LPA and the eUICC are deployed independently is used.

Optionally, the LPA may include a local profile download (Local Profile Download, LPD) module, a local user interface (Local User Interface, LUI) module, and a local discovery service (Local Discovery Service, LDS) module. Usually, the LPA in the user terminal is responsible for interaction between the user terminal and the eUICC, the LPD module is mainly responsible for profile downloading, the LDS module is mainly responsible for service discovery, and the LUI module provides a user with a UI interface. The user may manage, by using the LPA, a profile downloaded to the eUICC, for example, perform an operation such as profile activation, deactivation, or deletion.

The SM-DP+ server may generate a profile, associate the profile with a specified eUICC, and download the profile to the eUICC.

The OPS is responsible for generating a patch for a chip operating system (Chip OS), or the OPS is responsible for generation and downloading of an entire operating system. The OPS has a logical interface for communicating with the LPA and the eUICC, to complete downloading and installation of the patch or the entire operating system. The OPS may be operated by a chip manufacturer or a terminal manufacturer.

Figure 3:
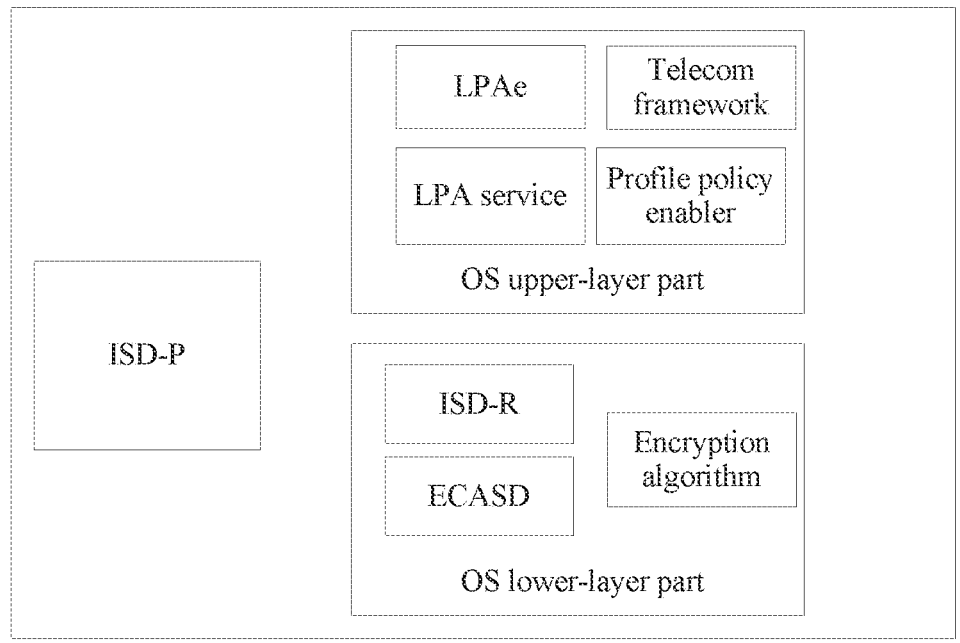
FIG. 3 is an architectural diagram of an eUICC software layer according to an embodiment of the present invention.

FIG. 3 is an architectural diagram of an eUICC software layer according to an embodiment of the present invention. As shown in FIG. 3, an eUICC includes an issuer security domain profile (Issuer Security Domain Profile, ISD-P) part and an operating system (Operating System, OS) part. The OS part includes an OS upper-layer part and an OS lower-layer part. As shown in FIG. 3, the OS upper-layer part mainly includes an LPAe (LPA in eUICC), an LPA service (LPA services), a telecom framework (Telecom Framework), a profile policy enabler (profile policy enabler), and the like. The OS lower-layer part mainly includes an issuer security domain root (Issuer Security Domain Root, ISD-R), an eUICC controlling authority security domain (eUICC Controlling Authority Security Domain, ECASD), an encryption algorithm, and the like. Optionally, the encryption algorithm may be inside or outside the ECASD. In FIG. 3, an example in which the encryption algorithm is outside the ECASD is used.

The ISD-R is mainly used to create a new ISD-P, and is responsible for life cycle management of all ISD-Ps. Each eUICC has only one ISD-R. The ISD-R is installed and customized by an EUM (eUICC manufacturer) during eUICC production. The ISD-R cannot be deleted or deactivated.

The ECASD is mainly used to securely store a certificate, to support a security domain of the eUICC. Each eUICC has only one ECASD. The ECASD needs to be installed and customized by the EUM during eUICC production. The ECASD may include the following five pieces of information:

1. an eUICC private key (SK.EUICC.ECDSA), where the eUICC private key is used to create a signature of the ECDSA;
2. an eUICC certificate (CERT.EUICC.ECDSA), where the eUICC certificate is used for eUICC authentication, and the eUICC certificate includes an eUICC public key (PK.EUICC.ECDSA);
3. a public key (PK.CI.ECDSA) of a Global System for Mobile Communications Alliance (Global System for Mobile Communications Alliance, GSMA) certificate issuer (Certificate Issuer, CI), where the public key is a certificate used to perform verification on a network element (such as an SM-DP+ server) other than the eUICC; the ECASD may include a plurality of public keys of a same GSMA CI or different GSMA CIs; and each PK.CI.ECDSA needs to be stored in a root certificate (CERT.CI.ECDSA);
4. an EUM certificate (CERT.EUM.ECDSA); and
5. an EUM key set, where the key set is used for key and certificate update.

The ECASD needs to provide the following services for the ISD-R:

1. generating an eUICC signature based on information provided by the ISD-R; and 2. performing verification on a network element (such as the SM-DP+ server) other than the eUICC by using a CI public key (PK.CI.ECDSA).

It may be learned that the OS lower-layer part of the eUICC includes a CI public key set (in the ECASD) and an encryption algorithm library.

Figure 4A:
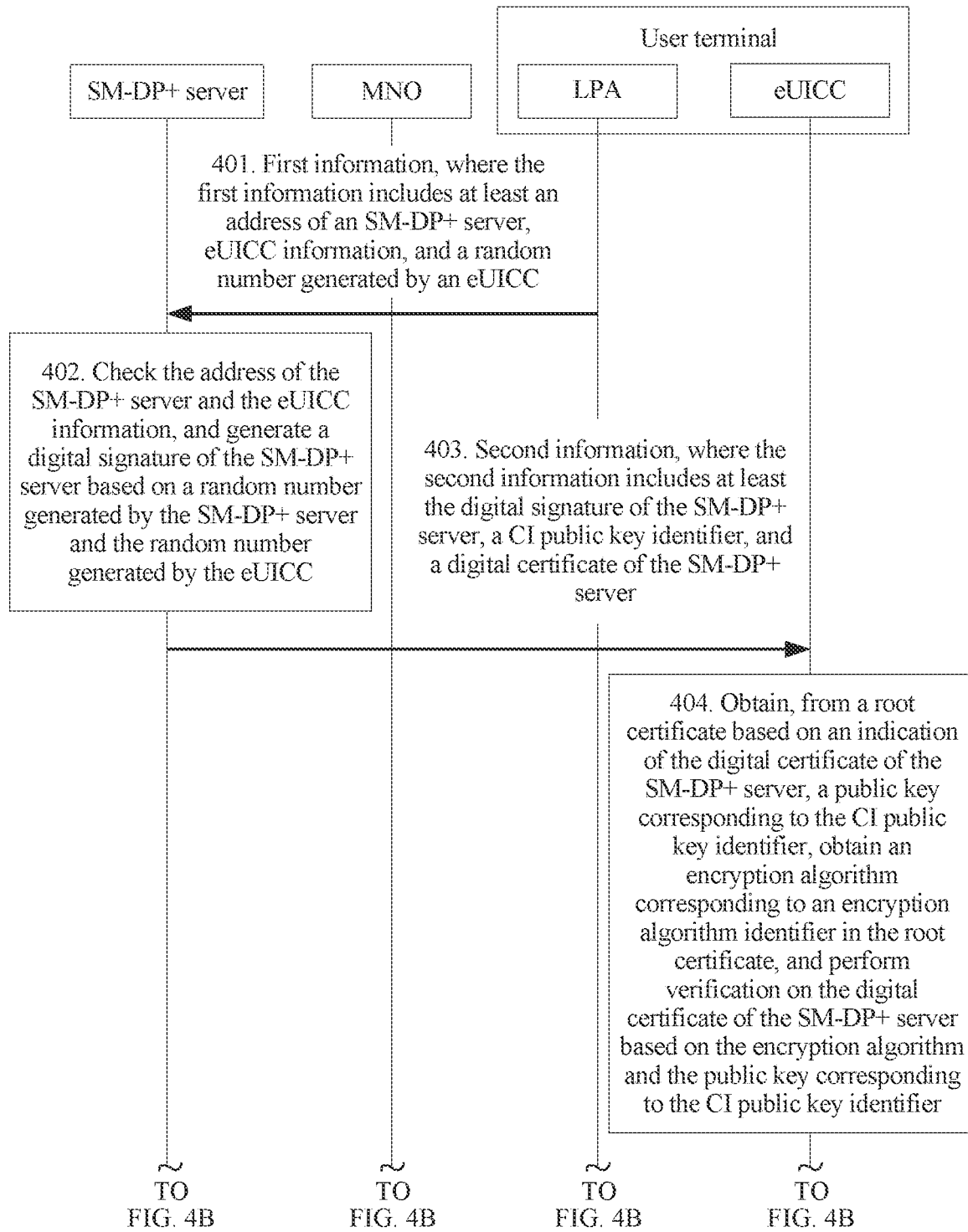
FIG. 4A and FIG. 4B are schematic flowcharts of existing bidirectional authentication performed between an SM-DP+ server and an eUICC by using an LPA according to an embodiment of the present invention.
Figure 4B:
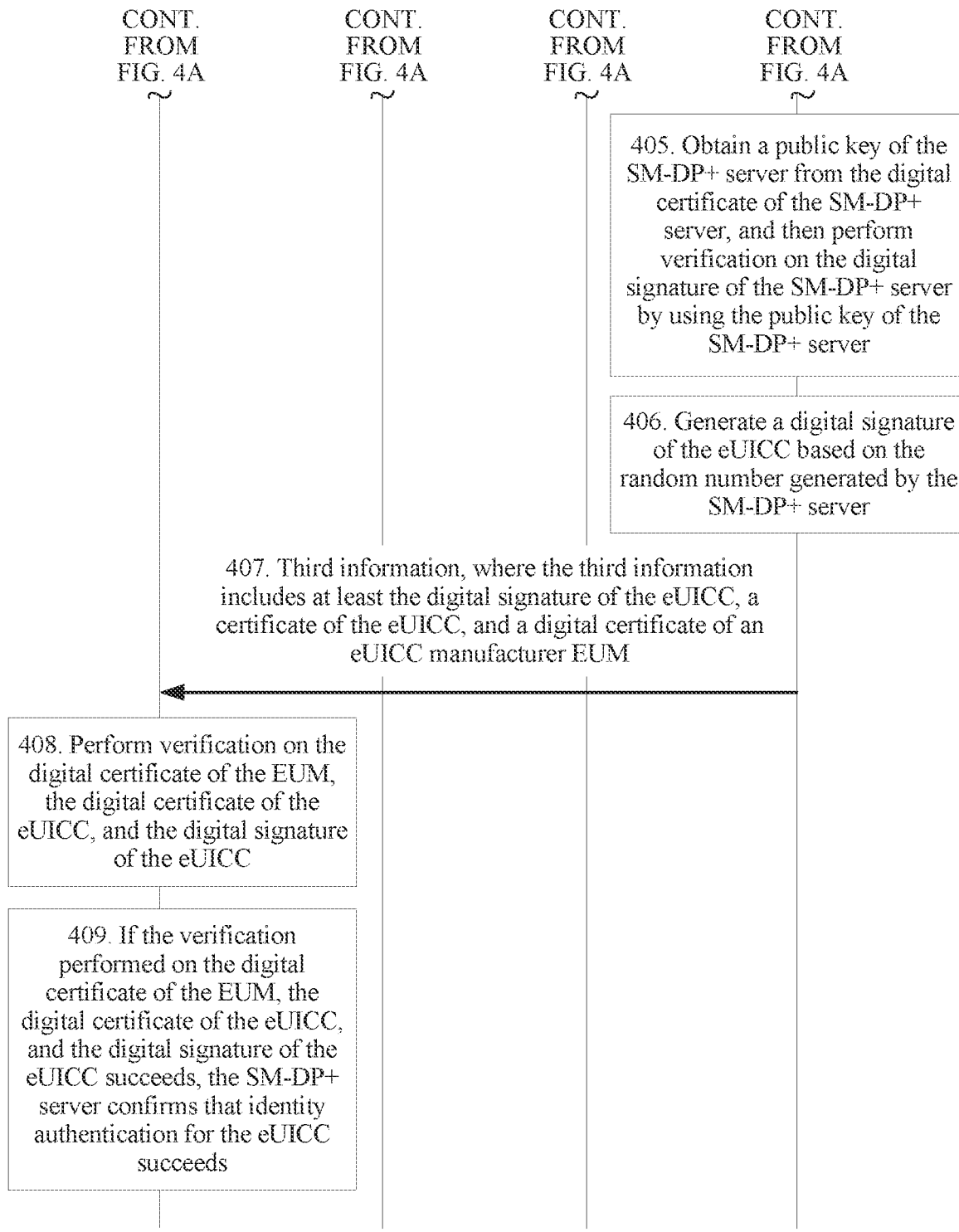

FIG. 4A and FIG. 4B are schematic flowcharts of existing bidirectional authentication performed between an SM-DP+ server and an eUICC by using an LPA. As shown in FIG. 4A and FIG. 4B, the bidirectional authentication performed between the SM-DP+ server and the eUICC by using LPA may include parts 401 to 408.

401. The LPA sends first information to the SM-DP+ server, where the first information includes at least an address of the SM-DP+ server, eUICC information (namely, eUICCInfo), and a random number generated by the eUICC.

402. The SM-DP+ server checks the address of the SM-DP+ server and the eUICC information, and generates a digital signature of the SM-DP+ server by using a random number generated by the SM-DP+ server and the random number generated by the eUICC.

403. The SM-DP+ server sends second information to the eUICC by using the LPA, where the second information includes at least the digital signature of the SM-DP+ server, a CI public key identifier, and a digital certificate (namely, CERT.DPauth.ECDSA) of the SM-DP+ server.

404. After receiving the second information, the eUICC obtains, from a root certificate (CERT.CI.ECDSA) based on an indication of the digital certificate of the SM-DP+ server, a public key corresponding to the CI public key identifier, obtains an encryption algorithm corresponding to an encryption algorithm identifier in the root certificate, and performs verification on the digital certificate of the SM-DP+ server based on the encryption algorithm and the public key corresponding to the CI public key identifier.

405. After the verification performed on the digital certificate of the SM-DP+ server succeeds, the eUICC obtains a public key of the SM-DP+ server from the digital certificate of the SM-DP+ server, and then performs verification on the digital signature of the SM-DP+ server by using the public key of the SM-DP+ server.

406. After the verification performed on the digital signature of the SM-DP+ server succeeds, the eUICC confirms that identity authentication for the SM-DP+ server succeeds, and generates a digital signature of the eUICC based on the random number generated by the SM-DP+ server.

407. The eUICC sends third information to the SM-DP+ server by using the LPA, where the third information includes at least the digital signature of the eUICC, a certificate of the eUICC, and a digital certificate of an eUICC manufacturer EUM.

408. The SM-DP+ server performs verification on the digital certificate of the EUM, the digital certificate of the eUICC, and the digital signature of the eUICC.

409. If the verification performed on the digital certificate of the EUM, the digital certificate of the eUICC, and the digital signature of the eUICC succeeds, the SM-DP+ server confirms that identity authentication for the eUICC succeeds.

Figure 5A:
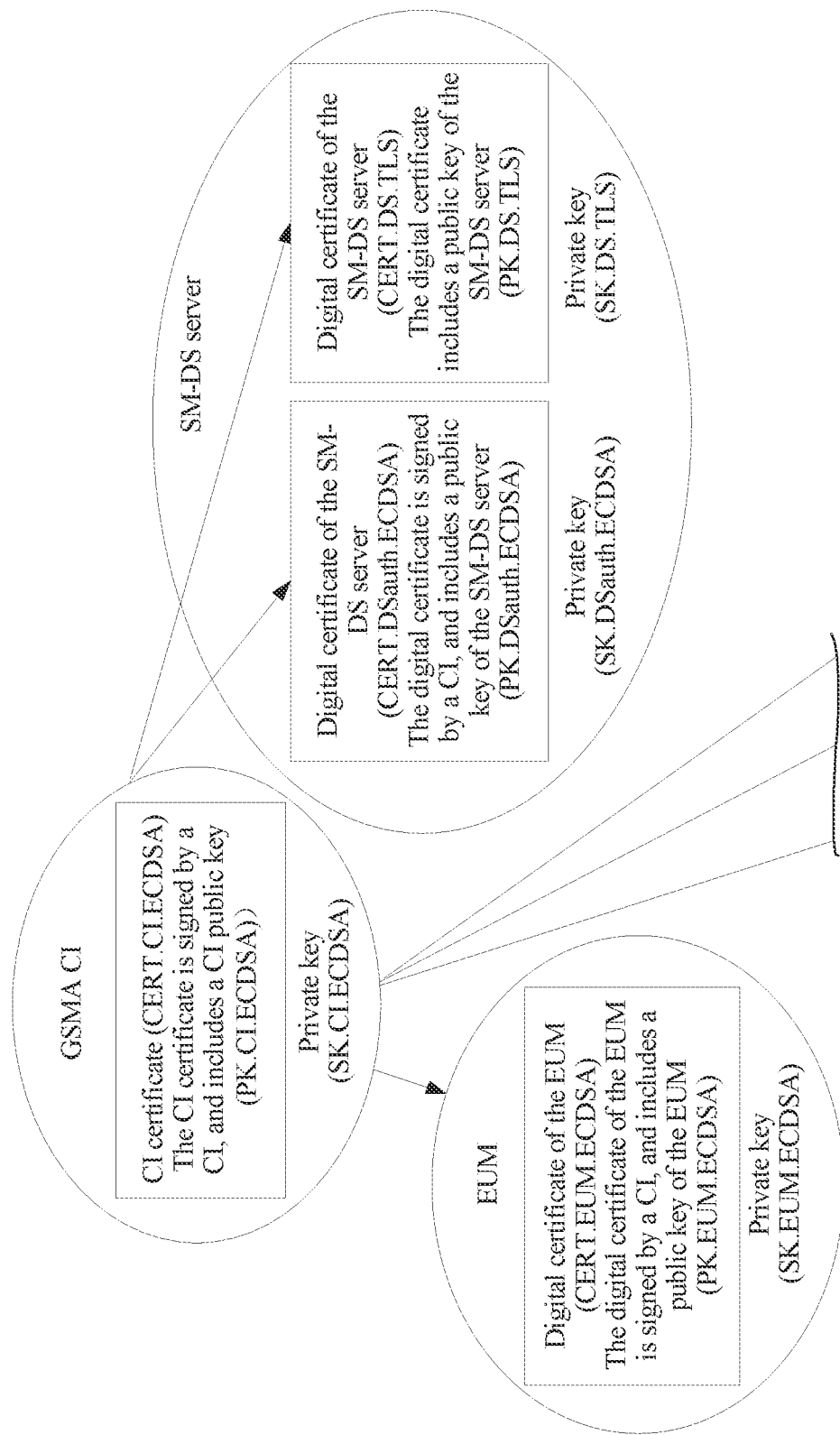
FIG. 5A and FIG. 5B are schematic diagrams of a certificate chain according to an embodiment of the present invention.
Figure 5B:
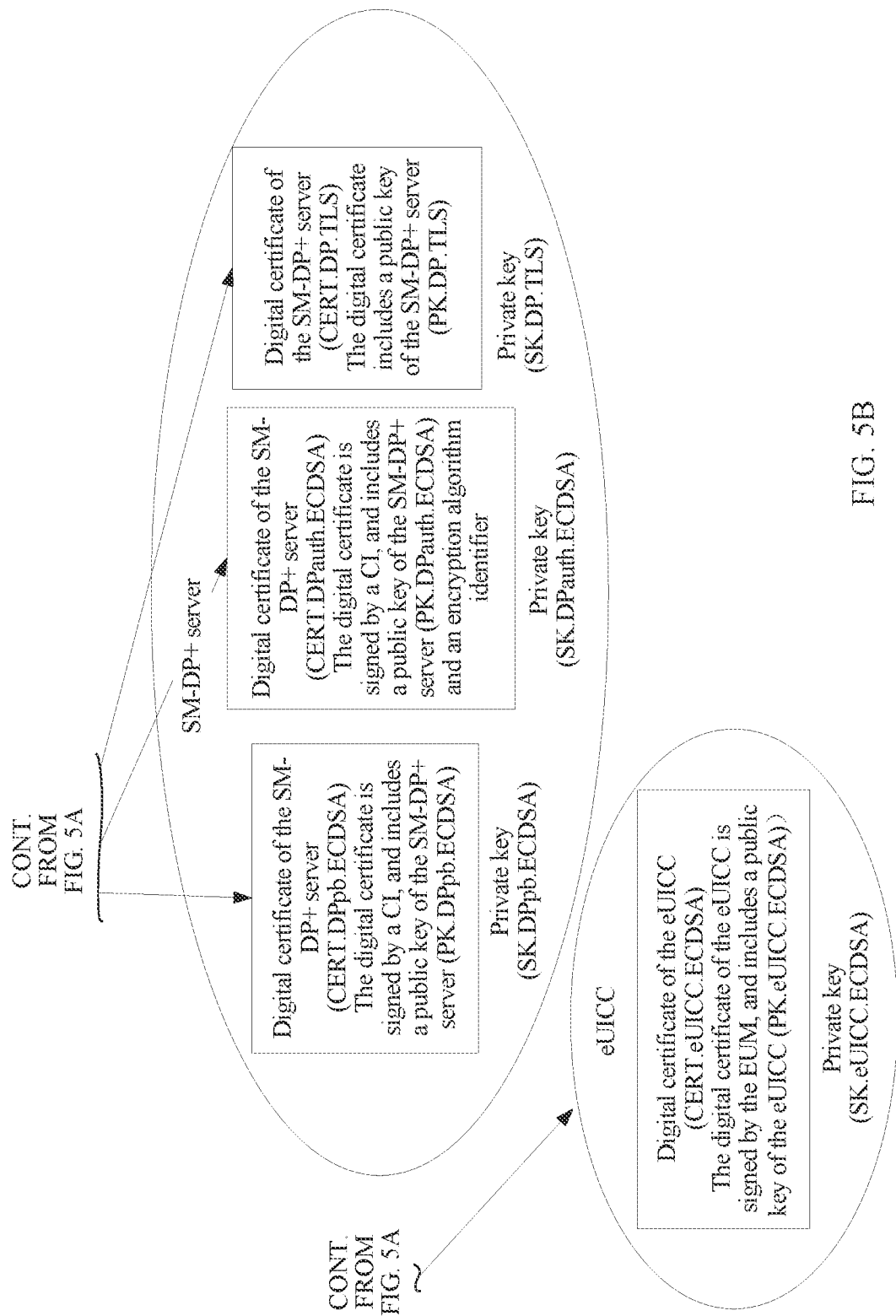

FIG. 5A and FIG. 5B are schematic diagrams of a certificate chain according to an embodiment of the present invention. As shown in FIG. 5A and FIG. 5B, a Global System for Mobile Communications Alliance certificate issuer (Global System for Mobile Communications Alliance Certificate Issuer, GSMA CI) has a private key (SK.CI.ECDSA), a public key (PK.CI.ECDSA), and a root certificate (CERT.CI.ECDSA, also referred to as a CI certificate). The public key of the CI is included in a digital certificate of the CI, and the digital certificate of the CI further includes an encryption algorithm identifier. As shown in FIG. 5A and FIG. 5B, an SM-DP+ server may have three digital certificates: CERT.DP pb.ECDSA, CERT.DP auth.ECDSA, and CERT.DP.TLS. The CERT.DP auth-.ECDSA may include three parts that are respectively a public key (PK. DP auth.ECDSA), plaintext content, and signature content of the SM-DP+ server. The signature content is content obtained after the plaintext content is signed. The signature content is obtained by the CI by signing the plaintext content in the CERT.DP auth.ECDSA by using the private key of the CI and an encryption algorithm corresponding to the encryption algorithm identifier in the root certificate. Therefore, in the part 404 shown in FIG. 4A and FIG. 4B, the signature content in the CERT.DP auth.ECDSA needs to be decrypted by using the public key of the CI and the encryption algorithm corresponding to the encryption algorithm identifier in the root certificate. If content obtained after the decryption is the same as content obtained after a hash algorithm is performed on the plaintext content, it is determined that verification performed on the digital certificate of the SM-DP+ server succeeds. Therefore, during bidirectional authentication between the SM-DP+ server and an eUICC, a corresponding CI public key and a corresponding encryption algorithm need to be stored in an operating system of the eUICC.

To ensure profile downloading security, the bidirectional authentication between the SM-DP+ server and the eUICC is necessary. The eUICC can successfully download a profile from the SM-DP+ server only after the bidirectional authentication between the SM-DP+ server and the eUICC succeeds. However, it is found in practice that after a user goes abroad, an eUICC in a user terminal (a mobile terminal such as a mobile phone or a tablet computer) does not have a CI public key that is required by a local operator and that is used to perform bidirectional authentication between an SM-DP+ server and the eUICC. If the eUICC does not have the required CI public key, the part 404 cannot be performed. Therefore, the bidirectional authentication between the SM-DP+ server and the eUICC cannot be completed, and a profile cannot be downloaded accordingly.

To resolve the foregoing problem that the eUICC cannot successfully download the profile from the SM-DP+ server, the embodiments of the present invention provide a method and system for updating a certificate issuer public key, and a related device, so that the CI public key of the eUICC can be updated in time, the bidirectional authentication between the SM-DP+ server and the eUICC can be successfully performed, and the profile can be successfully downloaded.

Figure 6:
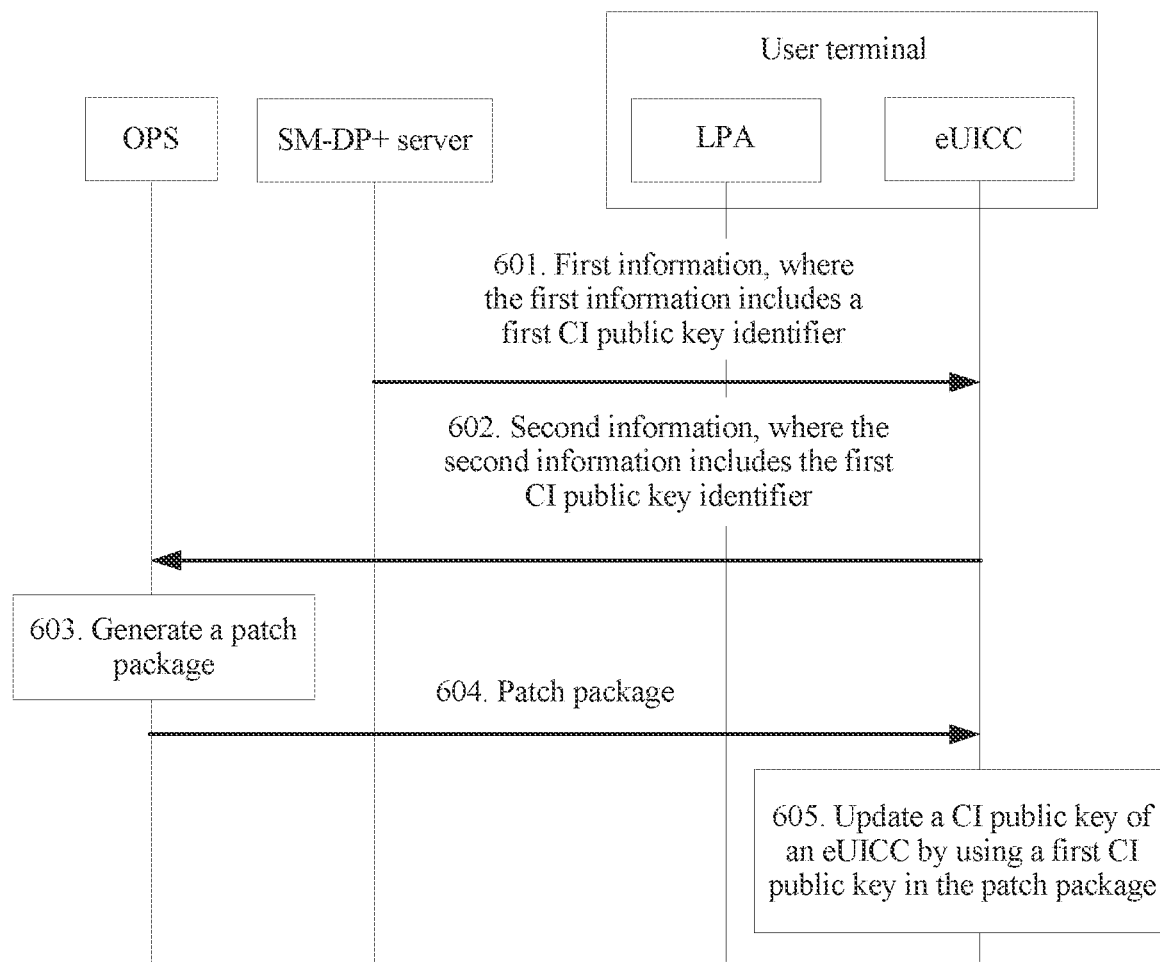

Based on the system architecture shown in FIG. 2, FIG. 6 is a schematic flowchart of a method for updating a certificate issuer public key according to an embodiment of the present invention. As shown in FIG. 6, the method for updating a certificate issuer public key may include parts 601 to 605.

601. An SM-DP+ server sends first information to an eUICC by using an LPA.

In this embodiment of the present invention, the first information includes a first CI public key identifier, and the first CI public key identifier cannot match any CI public key identifier in a verification CI public key identifier list of the eUICC. In other words, the first CI public key identifier does not exist in the verification CI public key identifier list of the eUICC, in other words, a CI public key corresponding to the first CI public key identifier does not exist in the eUICC.

The verification CI public key identifier list of the eUICC stores, in a sequence of priorities, CI public key identifiers used to perform verification on CERT.DPauth.ECDSA. After receiving, by using the LPA, the CERT.DPauth-.ECDSA sent by the SM-DP+ server, the eUICC extracts a CI public key identifier from the CERT.DPauth.ECDSA. For example, if the extracted CI public key identifier is a CI public key identifier 1, the verification CI public key identifier list is searched for the extracted CI public key identifier. If the extracted CI public key identifier 1 exists in the verification CI public key identifier list, a CI public key corresponding to the CI public key identifier 1 is used to perform verification on the CERT.DPauth.ECDSA. If the extracted CI public key identifier 1 does not exist in the verification CI public key identifier list, the eUICC does not have a CI public key corresponding to the CI public key identifier 1.

Optionally, the eUICC further includes a signature CI public key identifier list. The signature CI public key identifier list stores, in a sequence of priorities, CI public key identifiers used for signature calculation. For example, if the CI public key identifier obtained from the SM-DP+ server is a public key identifier 1, after the eUICC creates eUICC-Signed1, the eUICC searches the signature CI public key identifier list for the public key identifier 1. If the public key identifier 1 exists in the signature CI public key identifier list, SK.EUICC.ECDSA (an eUICC private key) corresponding to the public key identifier 1 is used to sign eUICCSigned1, to obtain a signature of the eUICC.

Optionally, the first information further includes an OPS address, and the eUICC establishes an association with an OPS based on the OPS address received from the SM-DP+ server.

602. The eUICC sends second information to an OPS by using the LPA.

In this embodiment of the present invention, after the eUICC receives the first information sent by the LPA, the eUICC sends the second information to the OPS by using the LPA. The second information includes the first CI public key identifier.

Optionally, the eUICC may directly send the second information to the OPS. In other words, the eUICC sends the second information to the OPS without using the LPA.

Optionally, the eUICC may send the second information to the SM DP+ server by using the LPA, so that after receiving the second information, the SM DP+ server sends the second information to the OPS.

603. The OPS generates a patch package.

In this embodiment of the present invention, after the OPS receives the second information sent by the LPA, the OPS generates the patch package. The patch package includes at least a first CI public key corresponding to the first CI public key identifier.

604. The OPS sends the patch package to the eUICC by using the LPA.

In this embodiment of the present invention, after generating the patch package, the OPS sends the patch package to the eUICC by using the LPA.

605. The eUICC updates a CI public key of the eUICC by using a first CI public key in the patch package.

In this embodiment of the present invention, after the eUICC receives the patch package sent by the OPS by using the LPA, the eUICC updates the CI public key of the eUICC by using the first CI public key in the patch package.

Specifically, the eUICC updates a CI public key set of the eUICC with the first CI public key in the patch package.

It may be learned that in the method described in FIG. 6, a CI public key that the eUICC does not have can be updated in time, to ensure that bidirectional authentication between the SM-DP+ server and the eUICC is successfully performed. Therefore, after the bidirectional authentication between the SM-DP+ server and the eUICC succeeds, a profile can be successfully downloaded.

Figure 7A:
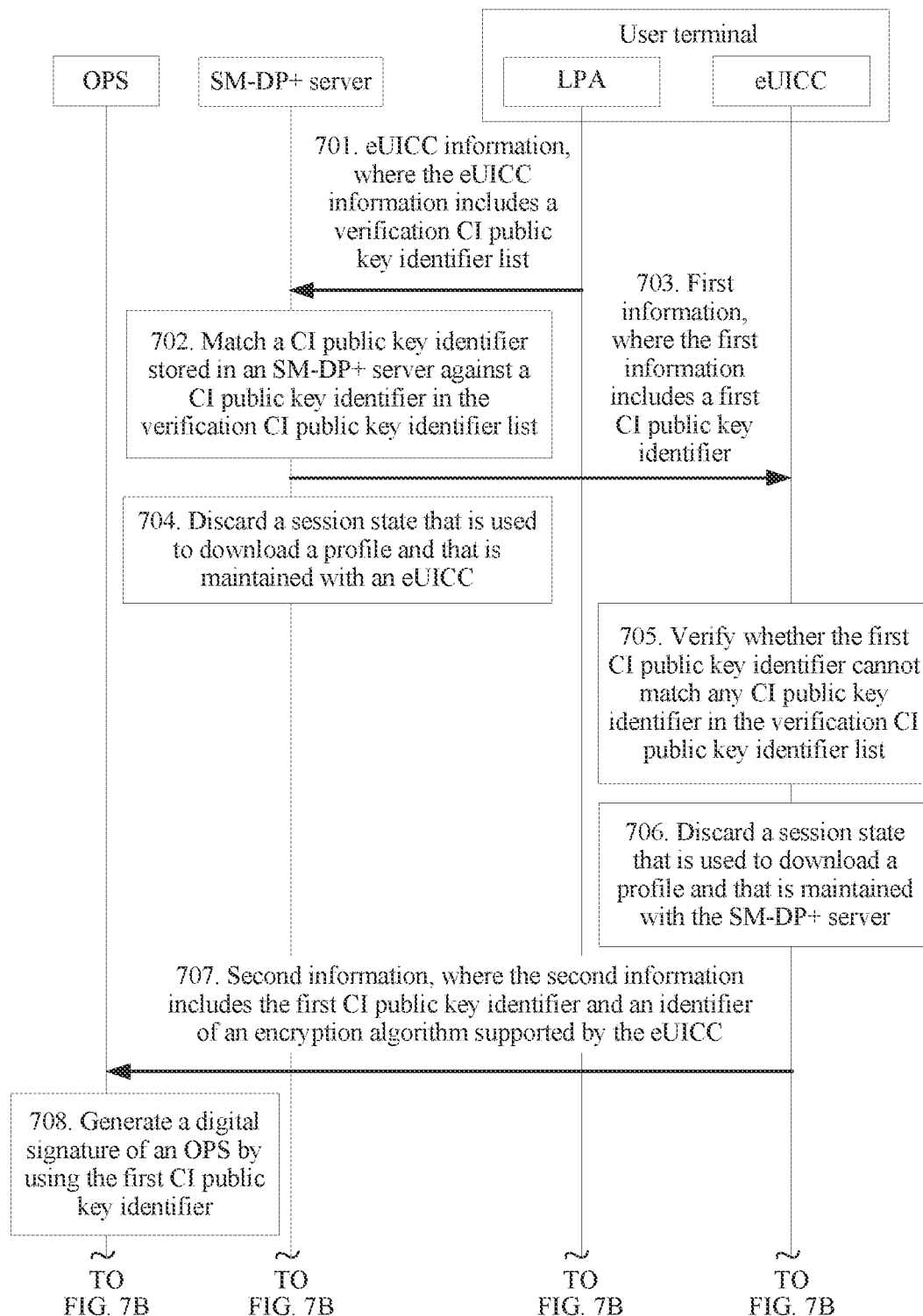
Figure 7B:
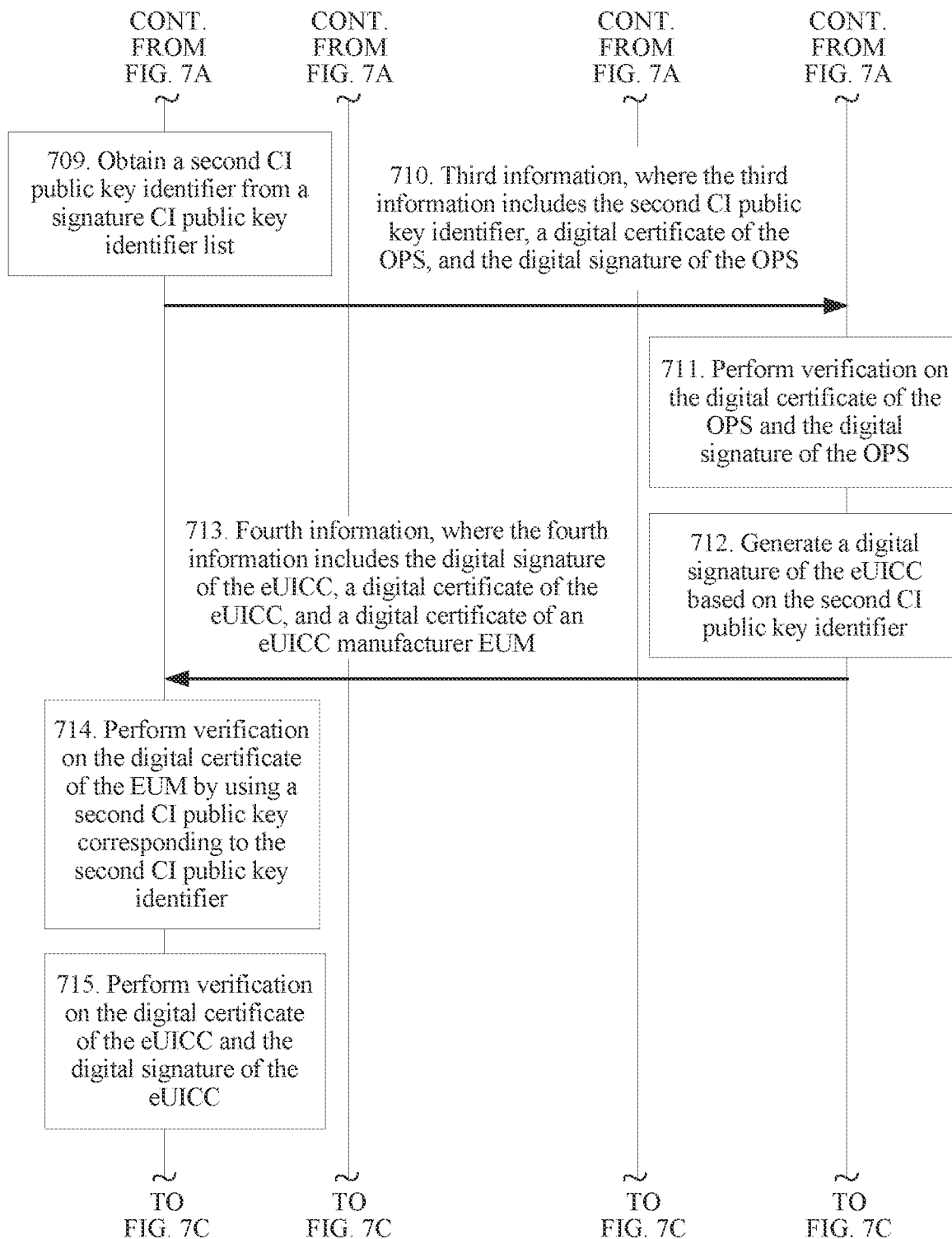
Figure 7C:
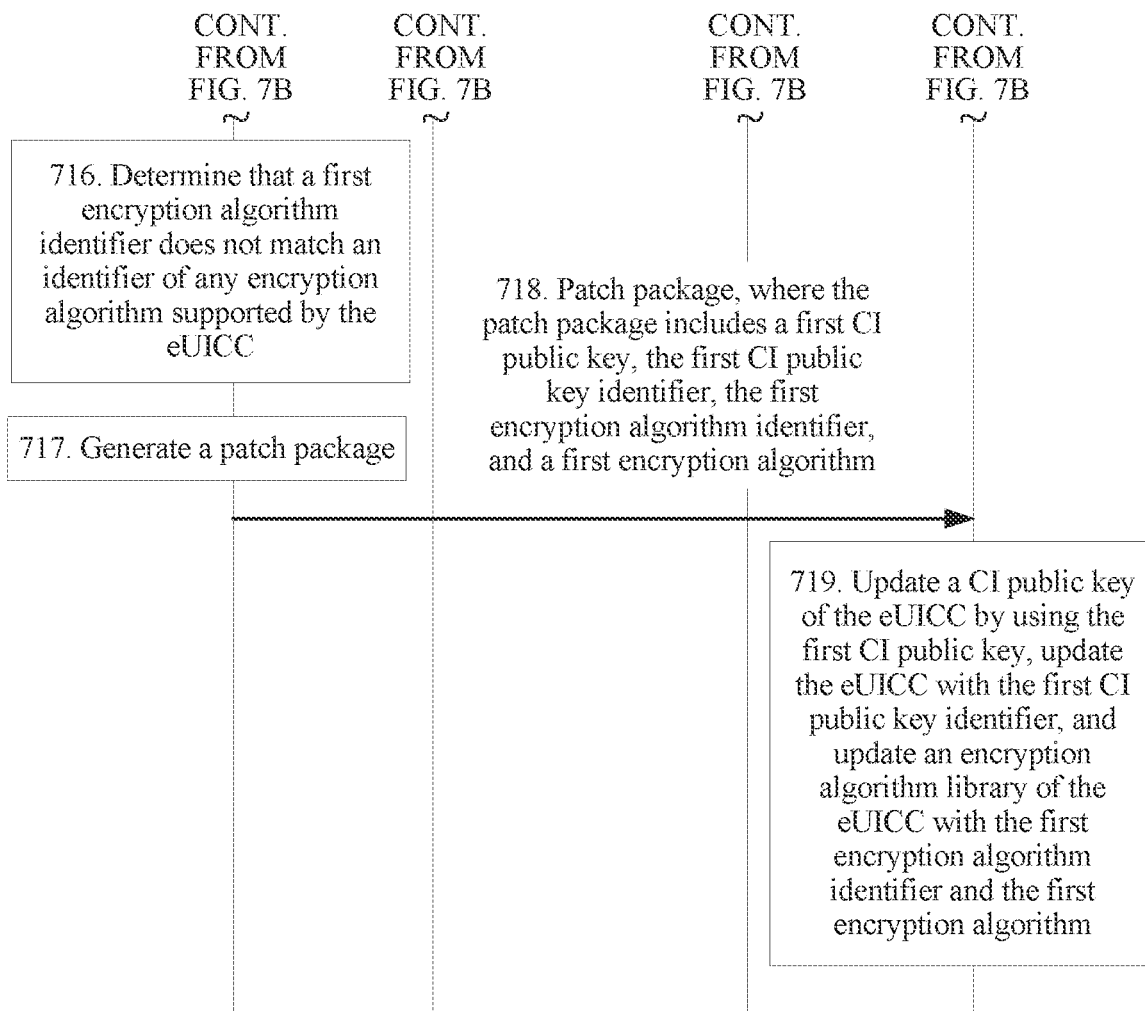

In an optional implementation, as shown in FIG. 7A, FIG. 7B, and FIG. 7C, before the SM-DP+ server sends the first information to the eUICC by using the LPA, the SM-DP+ server may further perform the following parts: the SM-DP+ server receives eUICC information sent by the LPA, where the eUICC information includes the verification CI public key identifier list; the SM-DP+ server matches a CI public key identifier stored on the SM-DP+ server against a CI public key identifier in the verification CI public key identifier list; and if the first CI public key identifier (the first CI public key identifier is a CI public key identifier that is stored on the SM-DP+ server and that cannot match any CI public key identifier in the verification CI public key identifier list) exists on the SM-DP+ server, the SM-DP+ server sends the first information to the eUICC by using the LPA.

In this implementation, if the first CI public key identifier exists on the SM-DP+ server, the eUICC does not have the first CI public key corresponding to the first CI public key identifier. Therefore, in this implementation, the SM-DP+ server may detect whether the eUICC does not have a CI public key.

In an optional implementation, as shown in FIG. 7A, FIG. 7B, and FIG. 7C, after the SM-DP+ server sends the first information to the eUICC by using the LPA, the SM-DP+ server discards a session state that is used to download a profile and that is maintained with the eUICC.

The session state that is used to download a profile and that is maintained with the eUICC is discarded, so that a session resource can be released, to enable a new session state used to download a patch package.

Figure 8A:
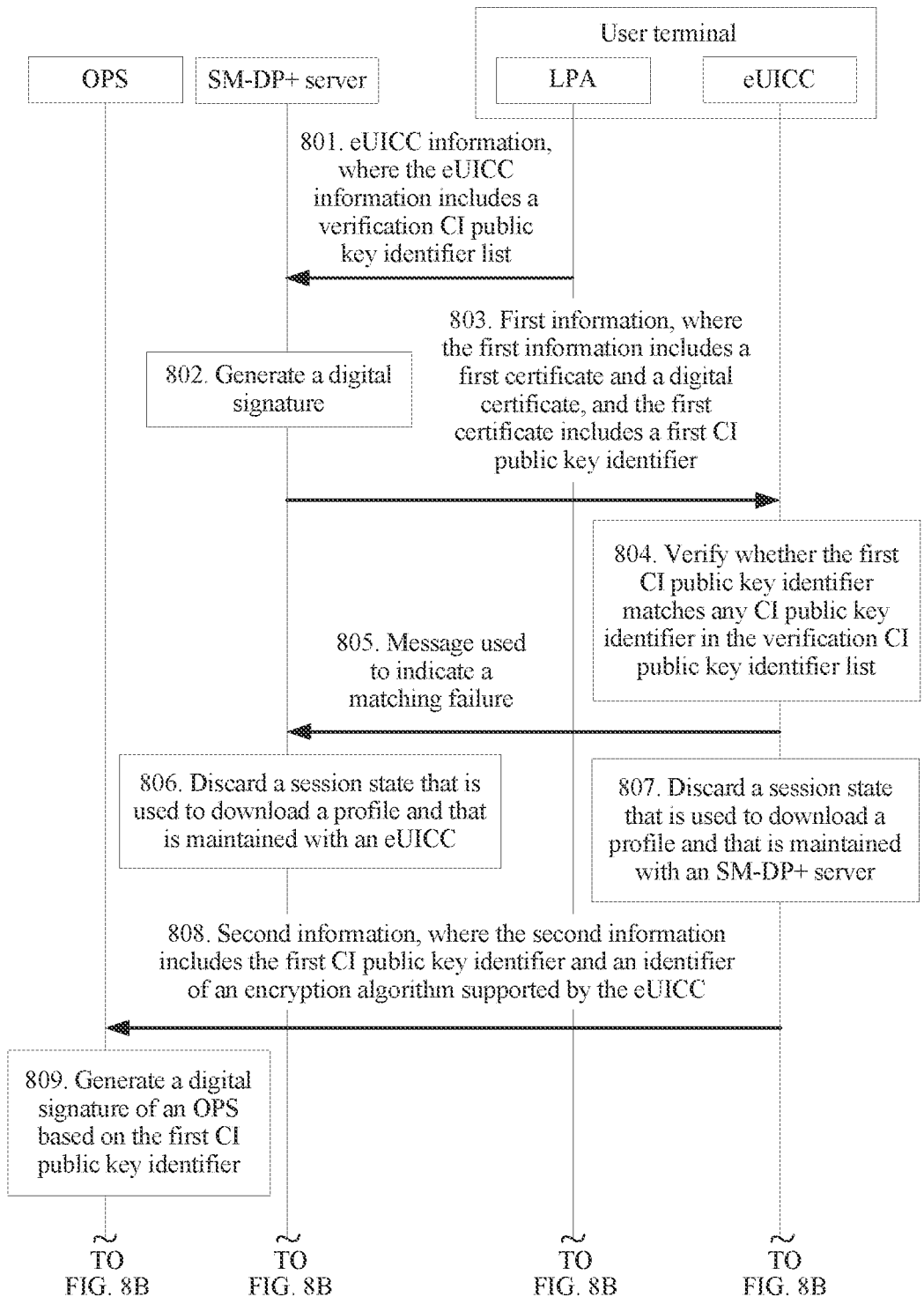
Figure 8B:
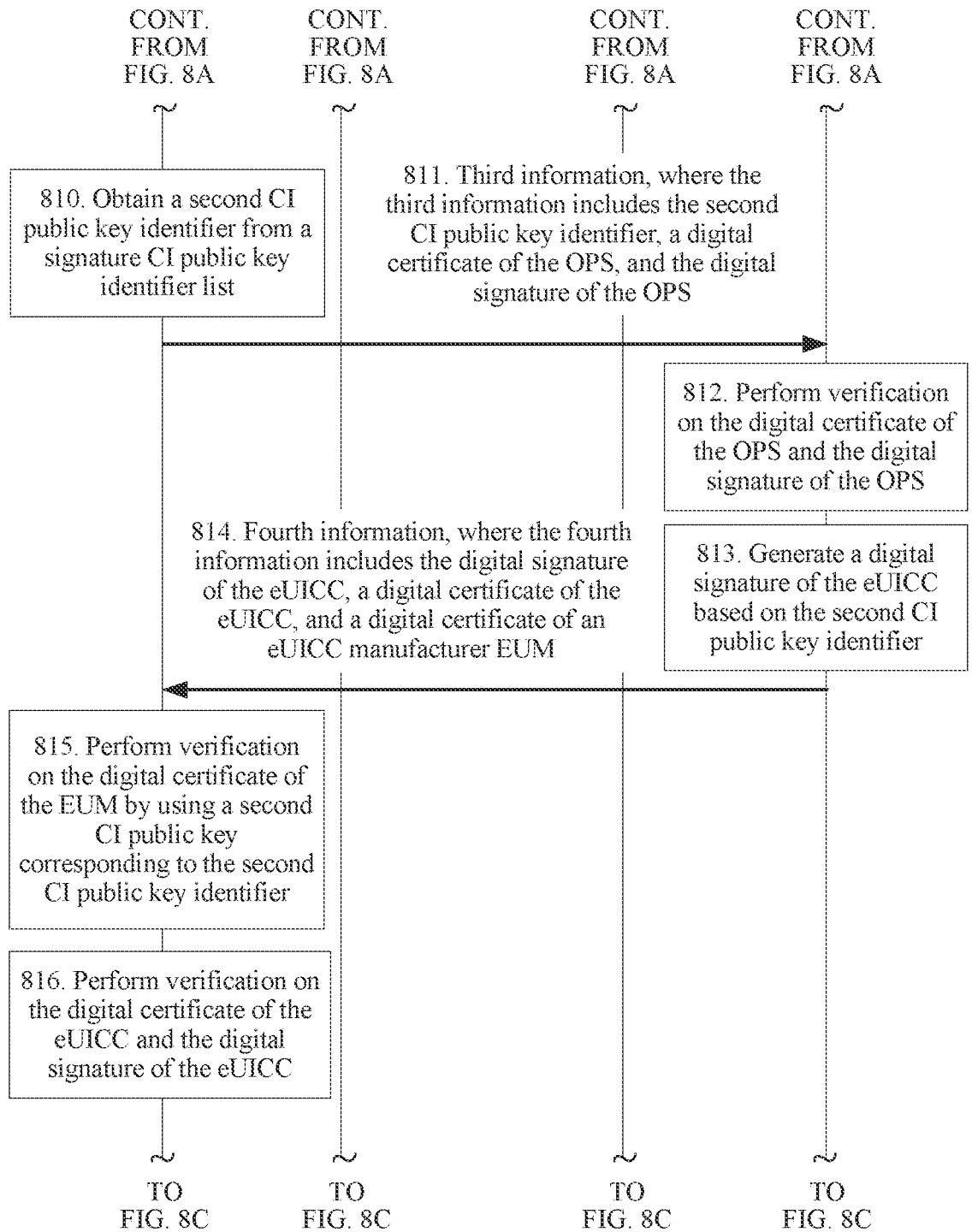
Figure 8C:
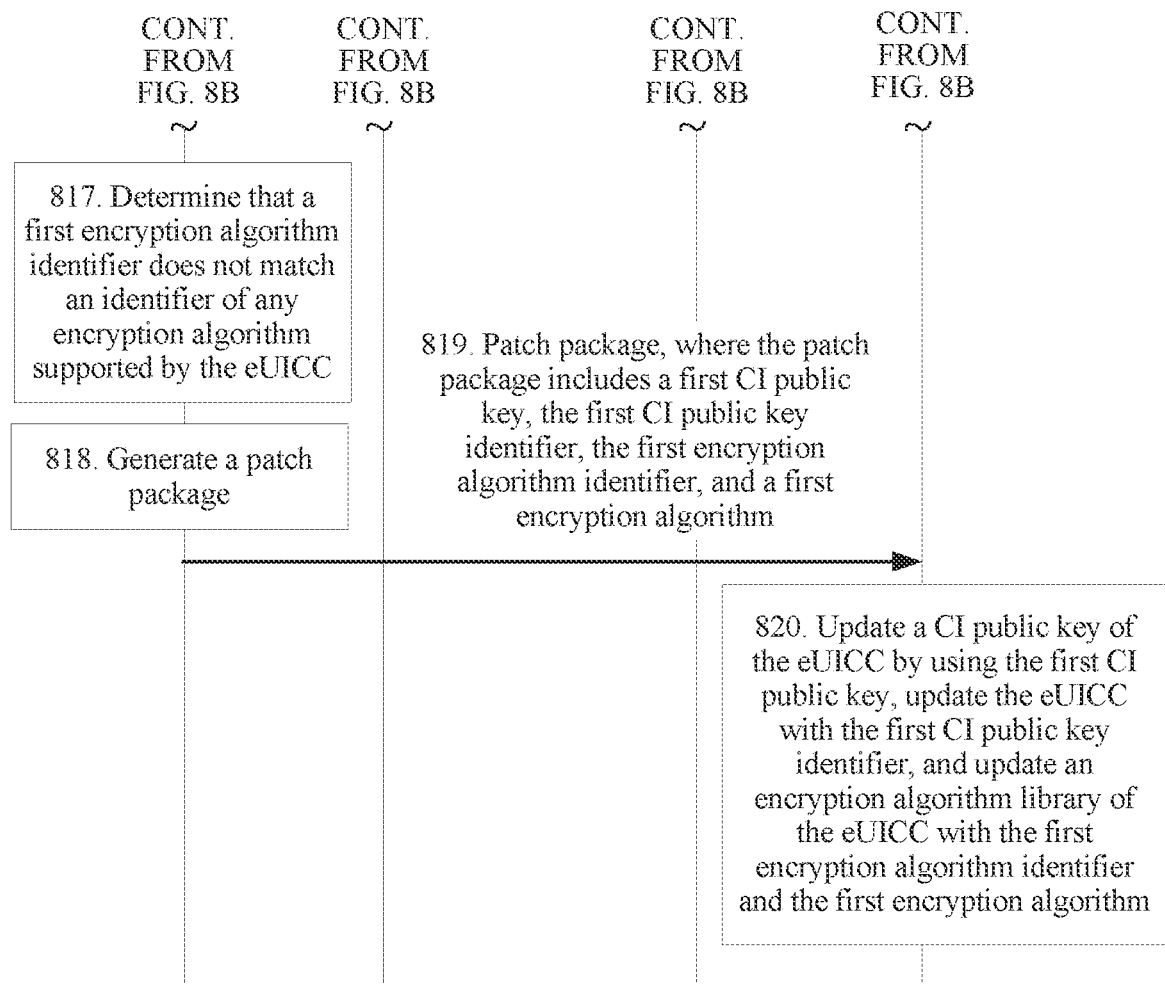

In an optional implementation, as shown in FIG. 8A, FIG. 8B, and FIG. 8C, the first information includes a first certificate, and the first CI public key identifier is included in the first certificate. Optionally, the first certificate may be a digital certificate of the SM-DP+ server. For example, the first certificate may be CERT.DPauth.ECDSA.

In an optional implementation, as shown in FIG. 7A, FIG. 7B, and FIG. 7C, and FIG. 8A, FIG. 8B, and FIG. 8C, after the eUICC receives the first information sent by the LPA, and before the eUICC sends the second information to the OPS by using the LPA, the eUICC may further perform the following parts: the eUICC verifies whether the first CI public key identifier matches any CI public key identifier in the verification CI public key identifier list; and after verifying that the first CI public key identifier cannot match any CI public key identifier in the verification CI public key identifier list, the eUICC performs the step that the eUICC sends second information to an OPS by using the LPA.

In this implementation, when the implementation is applied to the scenario shown in FIG. 7A, FIG. 7B, and FIG. 7C, the eUICC detects again whether the first CI public key identifier cannot match any CI public key identifier in the verification CI public key identifier list, so that a detection result can be more accurate. When the implementation is applied to the scenario shown in FIG. 8A, FIG. 8B, and FIG. 8C, only the eUICC detects whether the eUICC does not have the first CI public key identifier.

In an optional implementation, as shown in FIG. 7A, FIG. 7B, and FIG. 7C, and FIG. 8A, FIG. 8B, and FIG. 8C, after the eUICC receives the first information sent by the LPA, the eUICC may further discard a session state that is used to download a profile and that is maintained with the SM-DP+ server. The session state that is used to download a profile and that is maintained with the SM-DP+ server is discarded, so that a session resource can be released, to enable a new session state used to download a patch package.

In an optional implementation, as shown in FIG. 7A, FIG. 7B, and FIG. 7C, and FIG. 8A, FIG. 8B, and FIG. 8C, before generating the patch package, the OPS may further perform the following parts: the OPS generates a digital signature of the OPS by using the first CI public key identifier; the OPS obtains a second CI public key identifier from the signature CI public key identifier list, where the second CI public key identifier is any identifier in the signature CI public key identifier list; the OPS sends third information to the eUICC by using the LPA, where the third information includes the second CI public key identifier, a digital certificate of the OPS, and the digital signature of the OPS; the OPS receives fourth information sent by the LPA, where the fourth information includes a digital signature of the eUICC, a digital certificate of the eUICC, and a digital certificate of an eUICC manufacturer EUM; the OPS performs verification on the digital certificate of the EUM by using a second CI public key corresponding to the second CI public key identifier; if the verification performed on the digital certificate of the EUM succeeds, the OPS performs verification on the digital certificate of the eUICC and the digital signature of the eUICC; and if the verification performed on both the digital certificate of the eUICC and the digital signature of the eUICC succeeds, the OPS performs the step that the OPS generates a patch package.

In this implementation, optionally, a specific implementation in which the OPS generates the digital signature of the OPS by using the first CI public key identifier may be as follows: the OPS performs a hash operation at least on the first CI public key identifier, to obtain a message digest, and then encrypts the message digest by using a private key of the OPS, to obtain the digital signature of the OPS.

Optionally, the second information may further include a random number generated by the eUICC. The OPS may perform a hash operation on the first CI public key identifier, the random number generated by the eUICC, and a random number and a transaction identifier (Transaction ID) that are generated by the OPS, to obtain a message digest, and then encrypt the message digest by using the private key of OPS, to obtain the digital signature of the OPS. Correspondingly, the third information further includes the random number generated by the eUICC, and the random number and the transaction identifier that are generated by the OPS.

In this implementation, optionally, a specific implementation of performing verification on the digital certificate of the eUICC and the digital signature of the eUIC C may be as follows: the OPS performs verification on the digital certificate of the eUICC by using a public key in the digital certificate of the EUM; if the verification succeeds, the OPS determines that the verification performed on the digital certificate of the eUICC succeeds; and after determining that the verification performed on the digital certificate of the eUICC succeeds, the OPS performs verification on the digital signature of the eUICC by using a public key in the digital certificate of the eUICC. If the verification performed on the digital signature of the eUICC succeeds, the OPS generates an OS patch package.

In this implementation, bidirectional authentication may be performed between the eUICC and the OPS, to ensure validity of the entities on both sides.

In an optional implementation, as shown in FIG. 7A, FIG. 7B, and FIG. 7C, and FIG. 8A, FIG. 8B, and FIG. 8C, the second information further includes eUICC information, the eUICC information includes a signature CI public key identifier list, and after the eUICC sends the second information to the OPS by using the LPA, and before the eUICC receives the patch package sent by the OPS by using the LPA, the eUICC may further perform the following parts: the eUICC receives third information sent by the LPA, where the third information includes a second CI public key identifier, a digital certificate of the OPS, and a digital signature of the OPS, and the second CI public key identifier is an identifier in the signature CI public key identifier list of the eUICC information; the eUICC performs verification on the digital certificate of the OPS and the digital signature of the OPS; after the verification performed on the digital certificate of the OPS and the digital signature of the OPS succeeds, the eUICC generates a digital signature of the eUICC based on the second CI public key identifier; and the eUICC sends fourth information to the LPA, where the fourth information includes the digital signature of the eUICC, a digital certificate of the eUICC, and a digital certificate of an eUICC manufacturer EUM.

In this implementation, a specific implementation in which the eUICC generates the digital signature of the eUICC based on the second CI public key identifier may be as follows: the eUICC signs eUICCSigned1 by using a private key that is of the eUICC and that is corresponding to the second CI public key identifier, to obtain the digital signature of the eUICC.

In this implementation, bidirectional authentication may be performed between the eUICC and the OPS, to ensure validity of the entities on both sides.

In an optional implementation, an initial secure channel message in the patch package includes a remote operation type identifier whose value indicates a binding patch package installation type, and the binding patch package installation type is used by the LPA to download the patch package for the eUICC and is used by eUICC to install the patch package.

The remote operation type identifier is mainly used to notify the eUICC of a security level such as an SCP10 asymmetric key manner or an SCP03 symmetric key manner that is to be used to process a received package.

In an optional implementation, the patch package may further include the first CI public key identifier. Correspondingly, the eUICC may further update the eUICC with the first CI public key identifier in the patch package. Specifically, the eUICC may further update a CI public key identifier list of the eUICC with the first CI public key identifier in the patch package. Optionally, the eUICC may further store, in the verification CI public key identifier list, the first CI public key identifier in the patch package. In this implementation, the eUICC can be updated with the first CI public key identifier that the eUICC does not have.

In an optional implementation, as shown in FIG. 7A, FIG. 7B, and FIG. 7C, and FIG. 8A, FIG. 8B, and FIG. 8C, the second information further includes an identifier of an encryption algorithm supported by the eUICC, and correspondingly, the OPS may further perform the following parts: the OPS determines that a first encryption algorithm identifier does not match an identifier of any encryption algorithm supported by the eUICC; and after determining that the first encryption algorithm identifier does not match the identifier of any encryption algorithm supported by the eUICC, the OPS generates a patch package. A patch in the patch package may include the first CI public key, the first CI public key identifier, the first encryption algorithm identifier, and a first encryption algorithm corresponding to the first encryption algorithm identifier.

In this implementation, the first CI public key identifier, the first CI public key, the first encryption algorithm identifier, and the first encryption algorithm that the eUICC does not have may be placed into one patch package and the patch package is sent to the eUICC.

In an optional implementation, as shown in FIG. 7A, FIG. 7B, and FIG. 7C, and FIG. 8A, FIG. 8B, and FIG. 8C, a patch in the patch package includes the first CI public key identifier, the first CI public key, a first encryption algorithm identifier, and a first encryption algorithm. After receiving the patch package, the eUICC may update the CI public key of the eUICC by using the first CI public key, update the eUICC with the first CI public key identifier, and update an encryption algorithm library of the eUICC with the first encryption algorithm identifier and the first encryption algorithm.

In this implementation, the eUICC can be updated with the first CI public key identifier, the first CI public key, the first encryption algorithm identifier, and the first encryption algorithm that the eUICC does not have.

Figure 9:
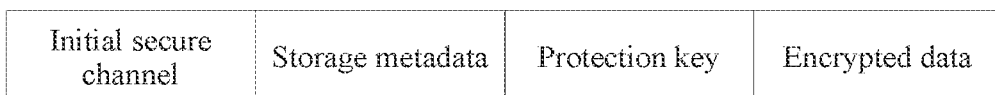
FIG. 9 is a schematic diagram of a data format of a patch package according to an embodiment of the present invention.

Optionally, a data format of the patch package may be shown in FIG. 9. As shown in FIG. 9, the patch package may include an initial security channel (Initial Secure Channel), storage metadata (Store Metadata), a key protection key, and encrypted data. The encrypted data is segment data that is after the key protection key and that includes a CI public key or a CI public key and an encryption algorithm, and the segment data is encrypted by a session key.

In an optional implementation, the first CI public key identifier is included in a storage metadata message of the patch package. Optionally, the first CI public key identifier may be in the encrypted data.

In an optional implementation, the first encryption algorithm identifier is included in the storage metadata message of the patch package. Optionally, the first encryption algorithm identifier may be in the encrypted data.

Figure 10A:
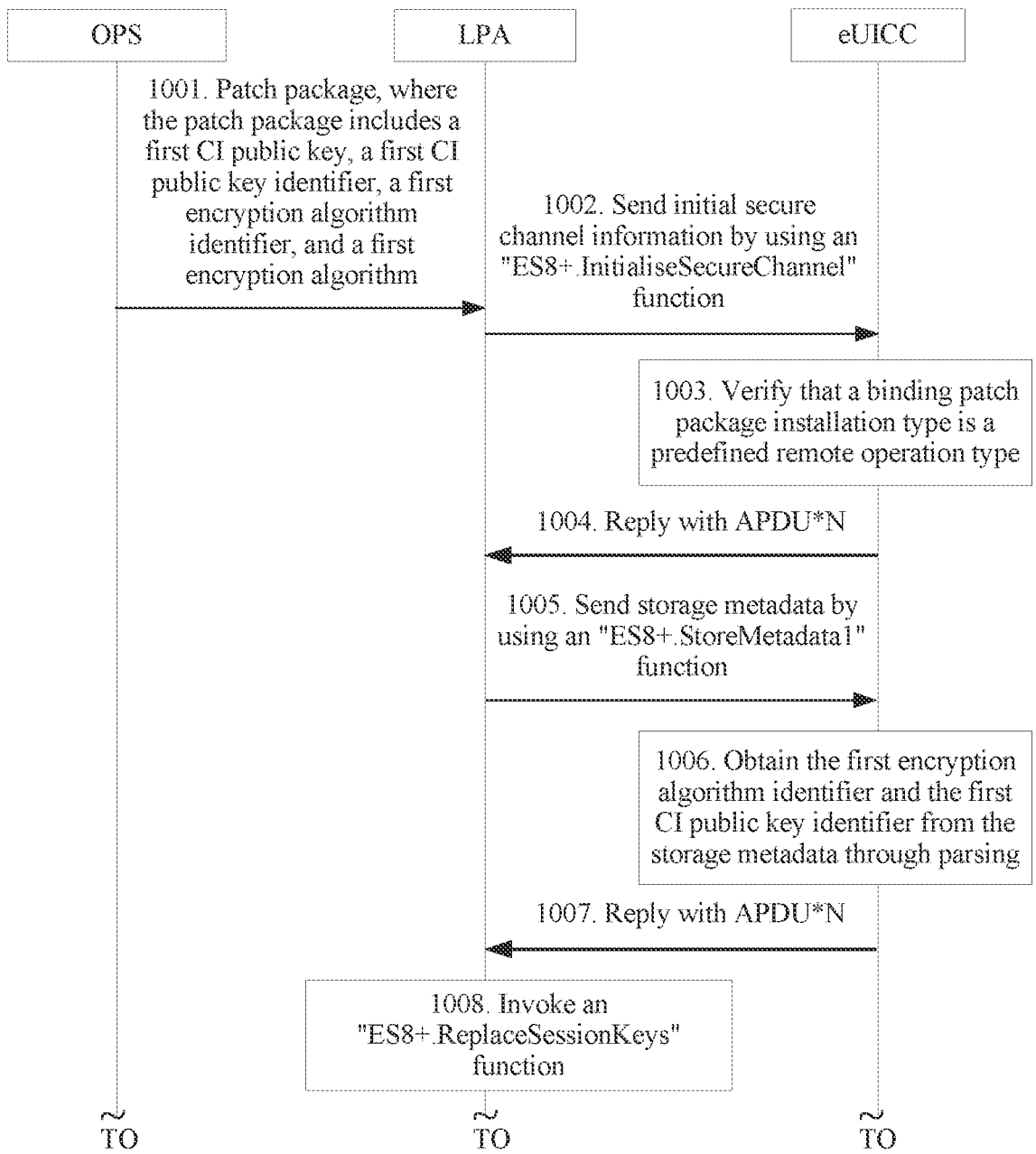
FIG. 10A and FIG. 10B are schematic diagrams of a process in which an OPS sends a patch package to an eUICC according to an embodiment of the present invention.
Figure 10B:
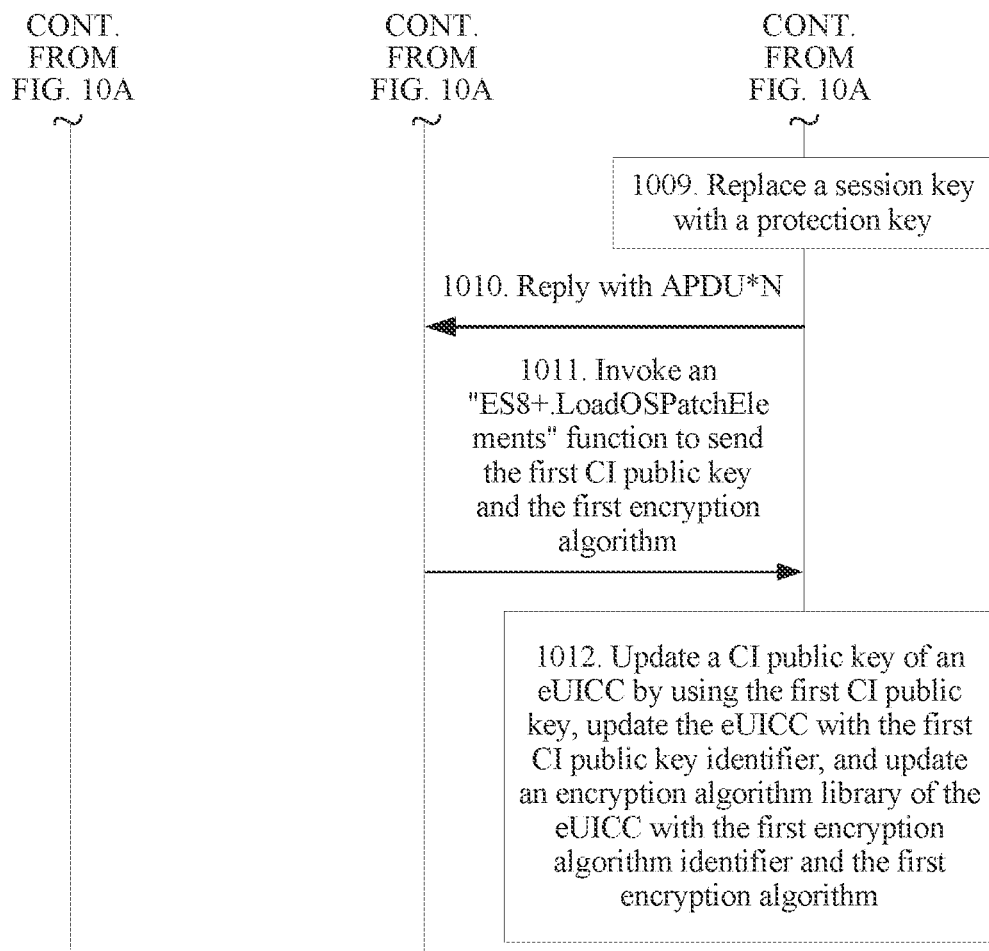
Figure 11A:
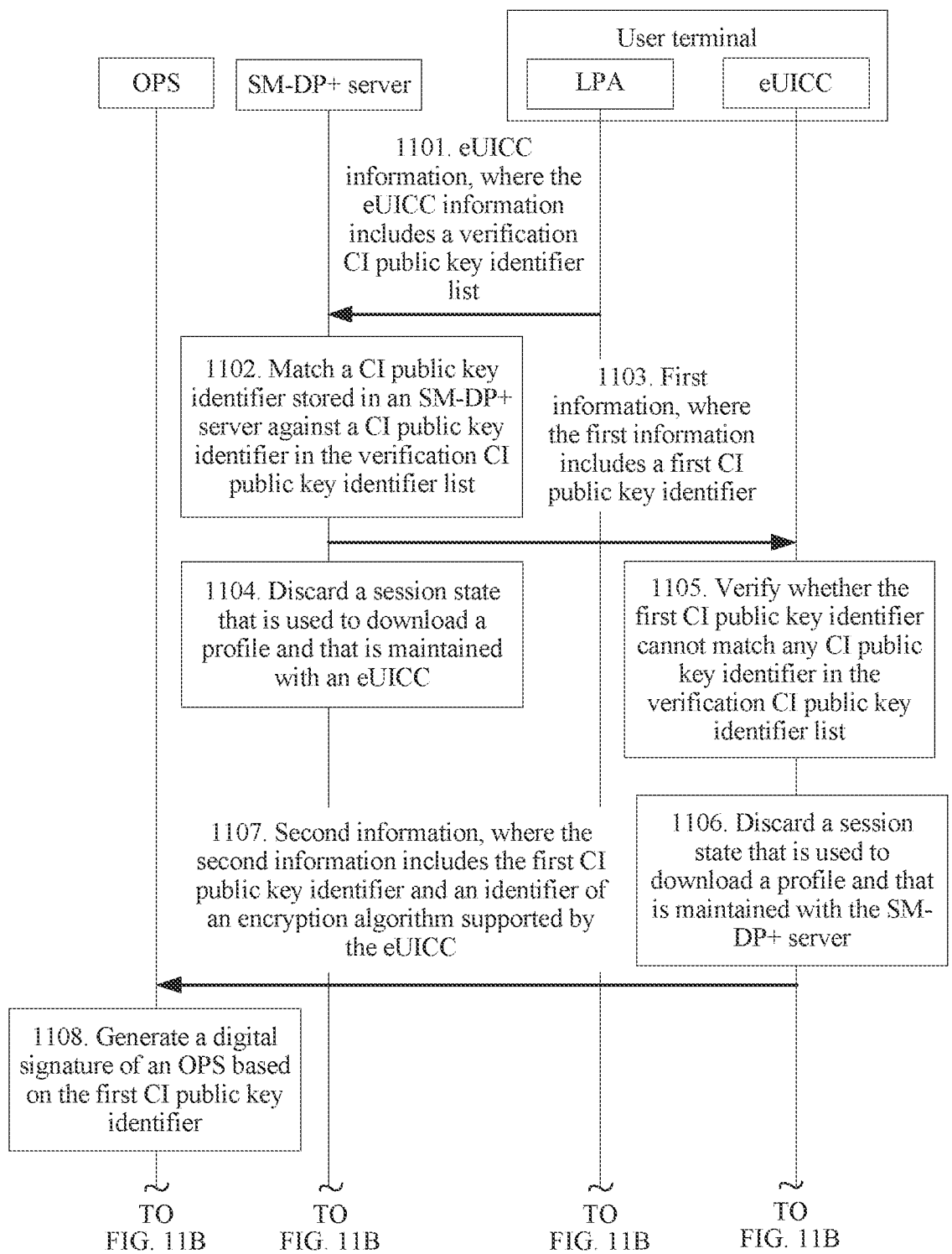
FIG. 11A, FIG. 11B, and FIG. 11C and FIG. 12A, FIG. 12B, and FIG. 12C are schematic flowcharts of a method for updating a certificate issuer public key according to embodiments of the present invention.
Figure 11B:
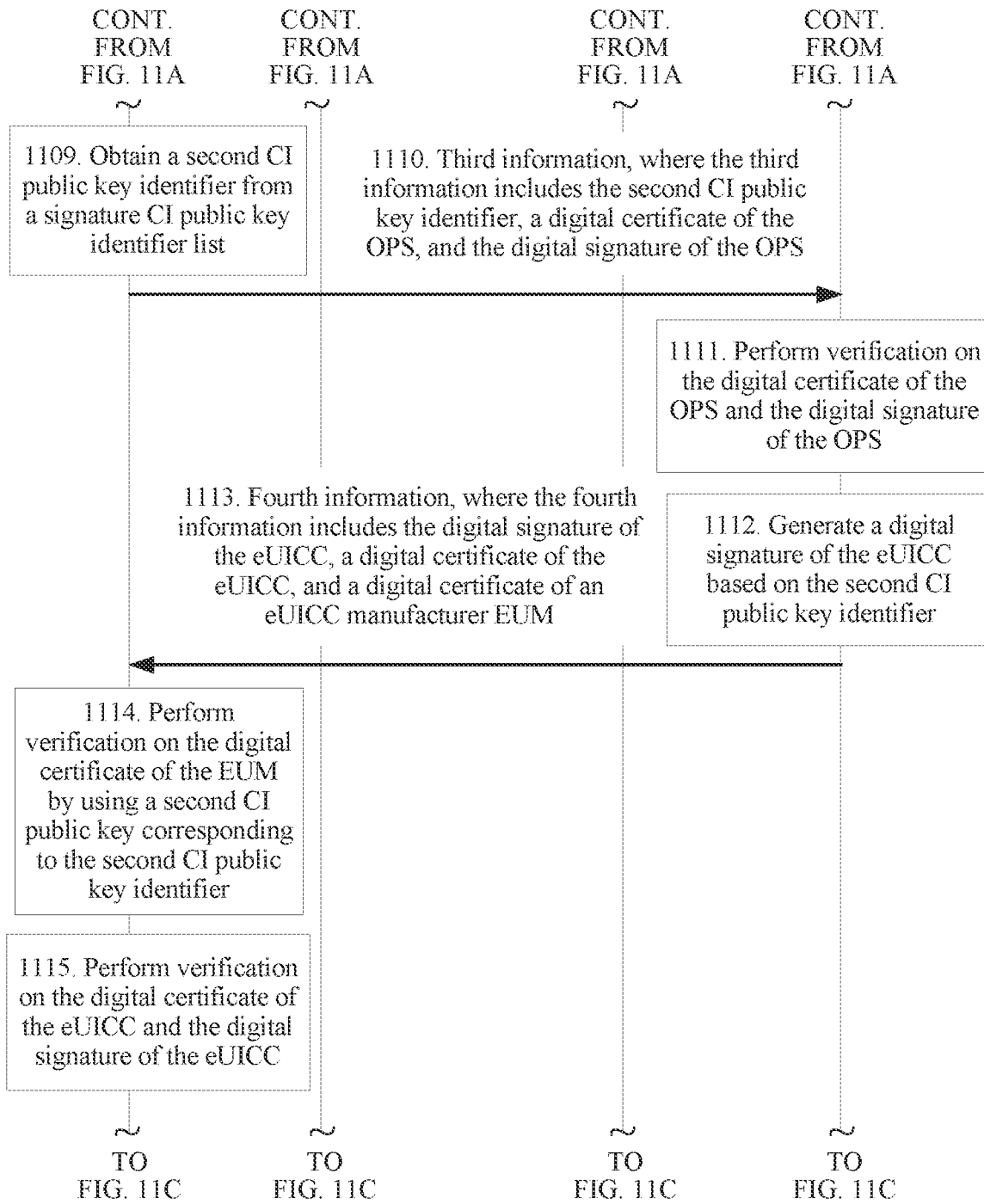
Figure 11C:
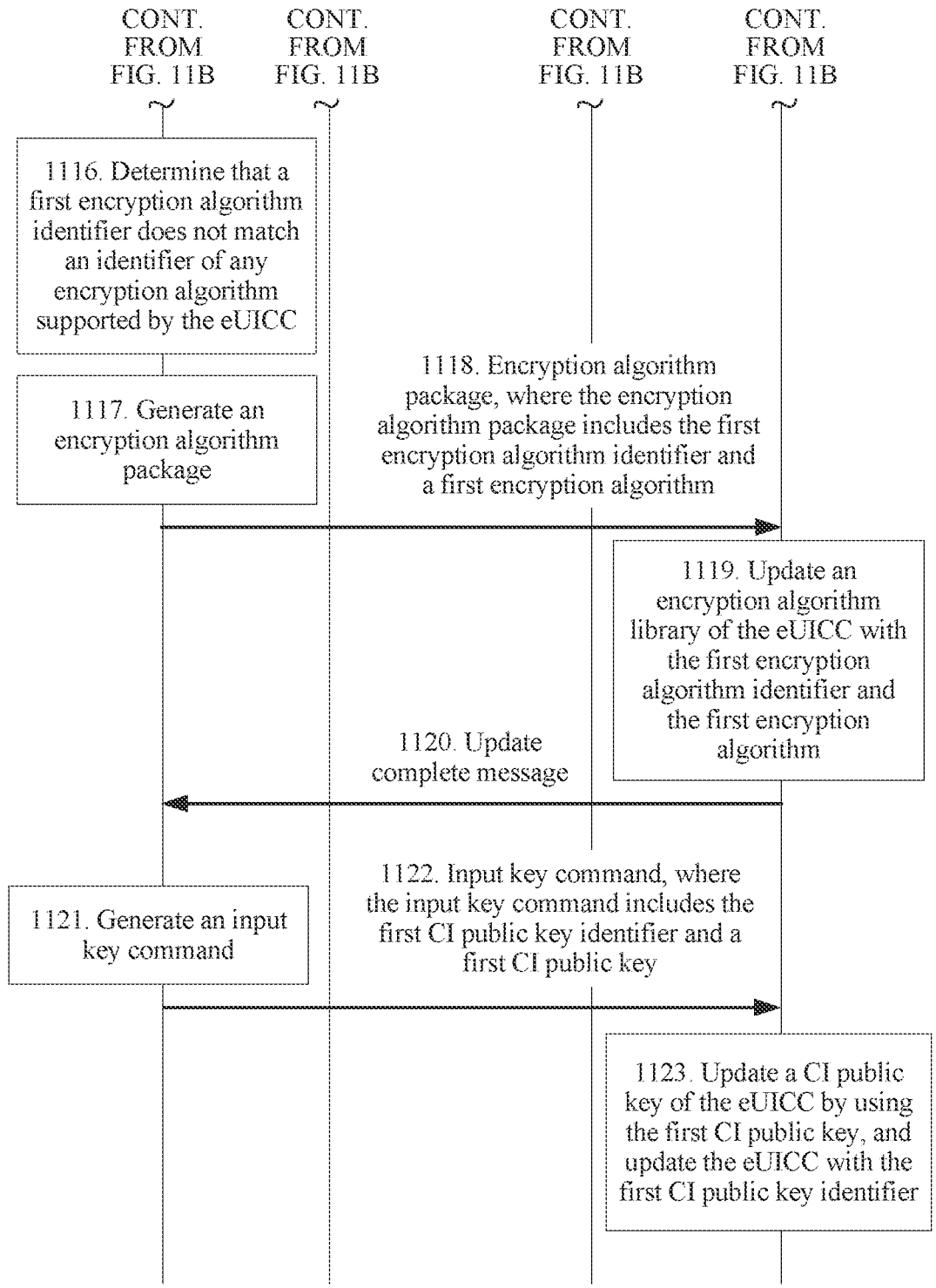
Figure 12A:
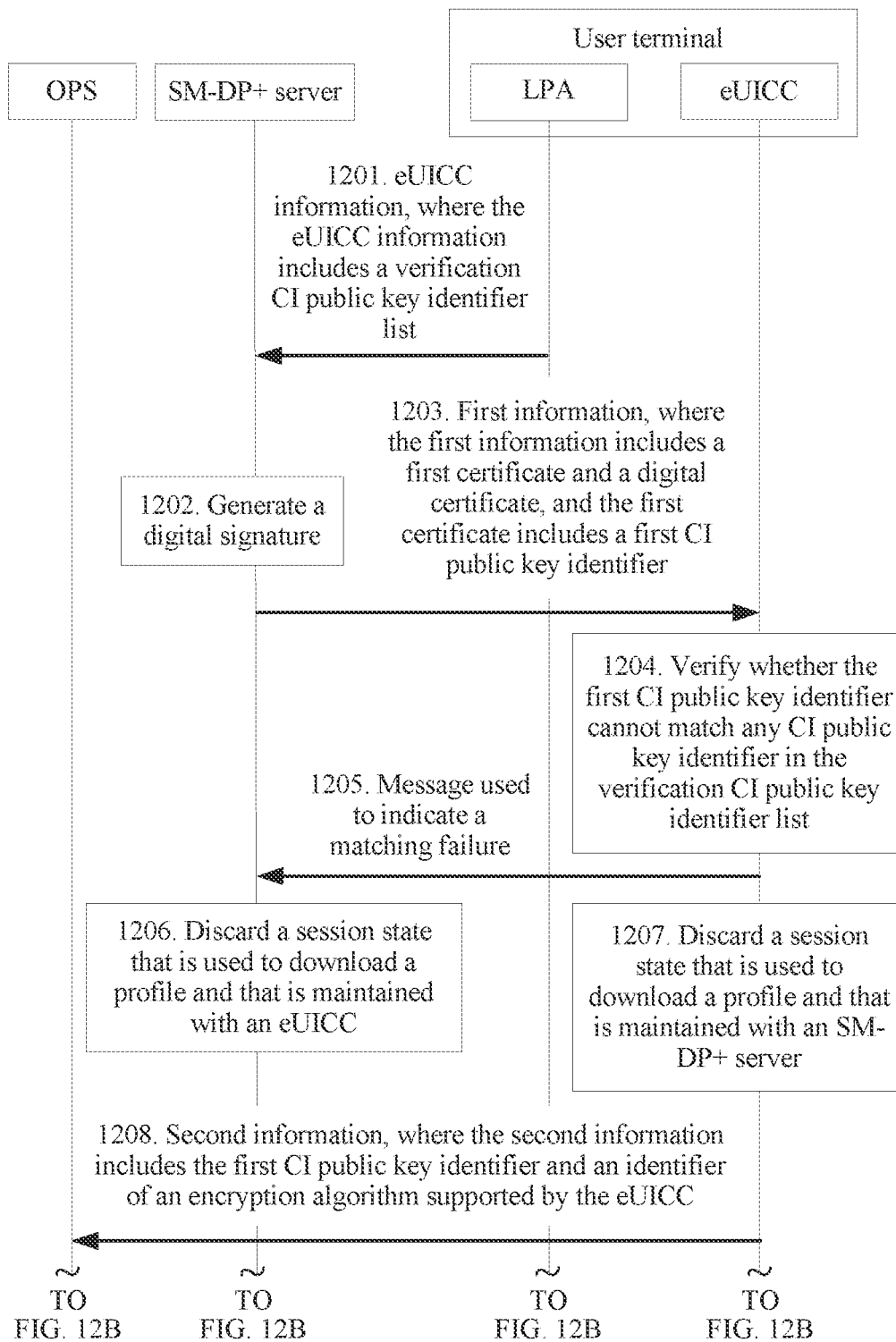
Figure 12B:
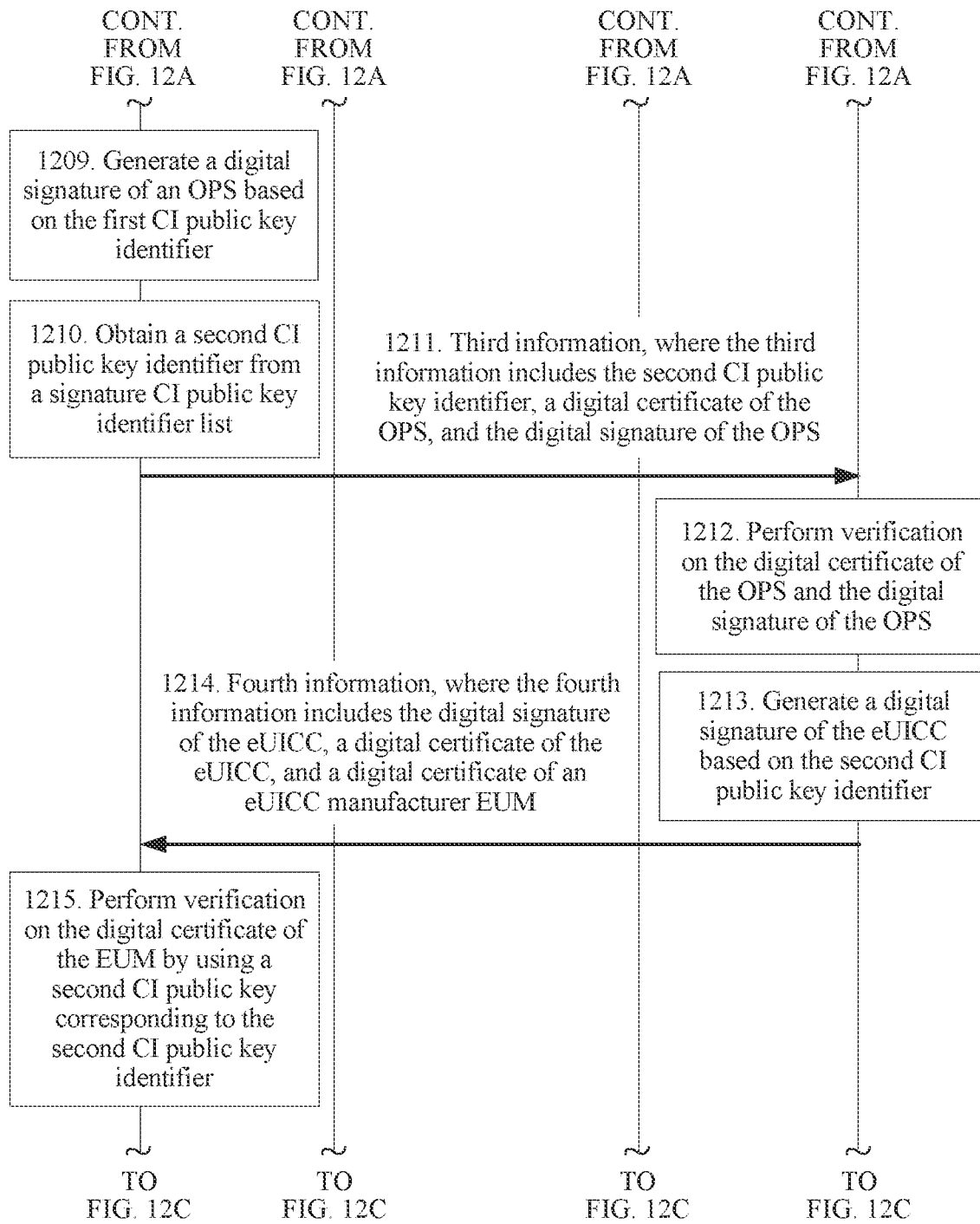
Figure 12C:
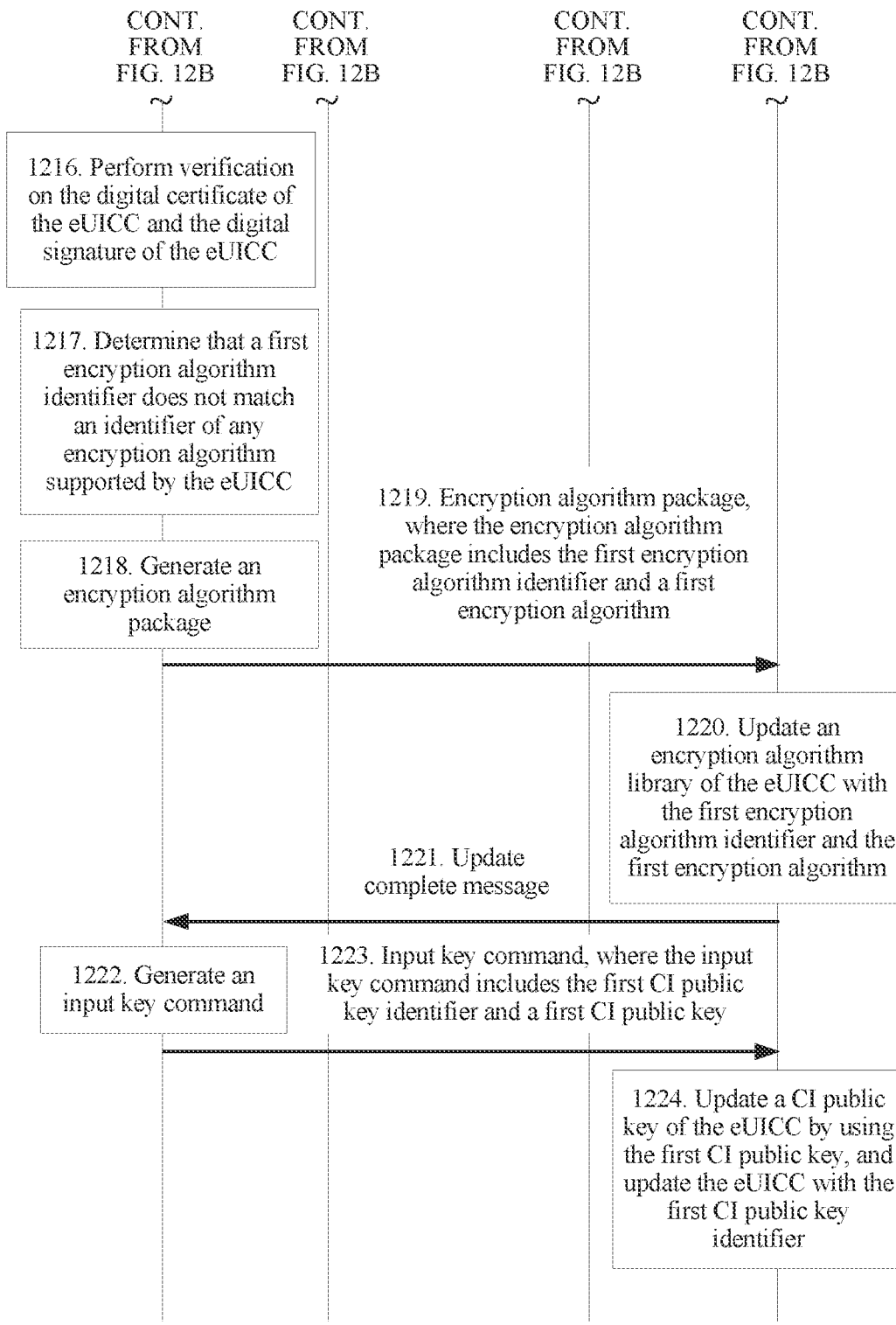

In an optional implementation, when the first encryption algorithm identifier and the first CI public key identifier exist in the storage metadata, a specific process in which the OPS sends the patch package to the eUICC and a specific process in which the eUICC updates a certificate issuer public key may be shown in FIG. 10A and FIG. 10B. As shown in FIG. 10A and FIG. 10B, the LPA sends an initial secure channel message to the eUICC by using an initial secure channel function of an ES8+ interface. After receiving the initial secure channel message, the eUICC verifies that a binding patch package installation type in the initial secure channel message is a predefined remote operation type. Then, the LPA sends the storage metadata to the eUICC by using a storage metadata function of the ES8+ interface. The eUICC obtains the first encryption algorithm identifier and the first CI public key identifier from the storage metadata through parsing. For example, the first encryption algorithm identifier herein may be an identifier of a new elliptic curve algorithm. After the LPA invokes an ES8+ session key replacement function, the eUICC replaces a session key with a key protection key. The LPA sends the first encryption algorithm and the first CI public key to the eUICC by using an ES8+ patch element loading function. After receiving the first encryption algorithm and the first CI public key, the eUICC updates the CI public key of the eUICC by using the first CI public key, updates the eUICC with the first CI public key identifier, and updates an encryption algorithm library of the eUICC with the first encryption algorithm identifier and the first encryption algorithm. In FIG. 10A and FIG. 10B, 1008 and 1009 are optional steps.

Optionally, when the first encryption algorithm identifier and the first CI public key identifier exist in the encrypted data, the eUICC may not perform step 1006.

In an optional implementation, as shown in FIG. 11A, FIG. 11B, and FIG. 11C, and FIG. 12A, FIG. 12B, and FIG. 12C, the second information further includes an identifier of an encryption algorithm supported by the eUICC, and the OPS may further perform the following steps: the OPS determines that a first encryption algorithm identifier corresponding to the first CI public key does not match an identifier of any encryption algorithm supported by the eUICC; the OPS generates an encryption algorithm patch package, where the encryption algorithm patch package includes the first encryption algorithm identifier and a first encryption algorithm corresponding to the first encryption algorithm identifier; and the OPS sends the encryption algorithm patch package to the eUICC; correspondingly, a specific implementation in which the OPS generates the patch package may be as follows: the OPS generates an input key command, where the input key command includes the first CI public key identifier and the first CI public key; and correspondingly, a specific implementation in which the OPS sends the patch package to the eUICC by using the LPA may be as follows: the OPS sends the input key command to the eUICC.

In this implementation, optionally, after the OPS generates the encryption algorithm patch package and sends the encryption algorithm package to the eUICC, and after the OPS receives an update complete message that is returned by the eUICC and that is used to indicate that all patches in the encryption algorithm patch package have been updated, the OPS may generate the input key command, and send the input key command to the eUICC. Alternatively, the OPS may first generate the input key command, and after the OPS receives an update complete message that is returned by the eUICC and that is used to indicate that all patches in the input key command have been updated, the OPS generates the encryption algorithm patch package, and sends the encryption algorithm package to the eUICC.

In this implementation, optionally, the OPS may establish a session with the eUICC by using the LPA, and first send the input key command to the LPA. Then, the LPA sends the input key command to the eUICC by using an APDU (Application Protocol Data Unit, application protocol data unit) command. Optionally, the OPS may directly establish a BIP channel with the eUICC by using the BIP (Bearer Independent Protocol, bearer independent protocol) protocol, and send the input key command to the eUICC.

In this implementation, optionally, the OPS may establish a session with the eUICC by using the LPA, and send the encryption algorithm patch package to the LPA. Then, the LPA sends the encryption algorithm patch package to the eUICC by using an APDU command. Optionally, the OPS may directly establish a BIP channel with the eUICC by using the BIP protocol, and send the encryption algorithm patch package to the eUICC.

In this implementation, the OPS may separately send the encryption algorithm patch package and the input key command, so that the eUICC can separately update the eUICC with the first encryption algorithm identifier and the first encryption algorithm that are in the encryption algorithm patch package and the first CI public key identifier and the first CI public key that are in the input key command.

In an optional implementation, as shown in FIG. 11A, FIG. 11B, and FIG. 11C, and FIG. 12A, FIG. 12B, and FIG.

12C, the eUICC may further receive an encryption algorithm patch package sent by the OPS by using the LPA, where the encryption algorithm patch package includes a first encryption algorithm identifier corresponding to the first CI public key and a first encryption algorithm corresponding to the first encryption algorithm identifier, and the first encryption algorithm identifier does not match an identifier of any encryption algorithm supported by the eUICC; correspondingly, a specific implementation in which the eUICC receives the patch package sent by the OPS by using the LPA may be as follows: the eUICC receives an input key command sent by the OPS by using the LPA, where the input key command includes the first CI public key identifier and the first CI public key; and correspondingly, the eUICC may update an encryption algorithm library of the eUICC with the first encryption algorithm identifier and the first encryption algorithm; and the eUICC may update the CI public key of the eUICC by using the first CI public key, and update the eUICC with the first CI public key identifier.

In this implementation, optionally, the eUICC may first receive the encryption algorithm package sent by the OPS. After updating all patches in the encryption algorithm patch package, the eUICC returns, to the OPS, an update complete message used to indicate that all the patches in the encryption algorithm patch package have been updated. After returning the update complete message to the OPS, the eUICC receives the input key command. Alternatively, the eUICC may first receive the input key command sent by the OPS. After updating all patches in the input key command, the eUICC returns, to the OPS, an update complete message used to indicate that all the patches in the input key command have been updated. After returning the update complete message to the OPS, the eUICC receives the encryption algorithm package.

In this implementation, optionally, the eUICC may establish a session with the OPS by using the LPA, and receive, by using an APDU command, the input key command sent from the LPA. The input key command is sent by the OPS to the LPA. Then, the LPA sends the input key command to the eUICC by using the APDU command. Optionally, the eUICC may directly establish a BIP channel with the OPS by using the bearer independent protocol (BIP) protocol, and receive the input key command from the OPS by using the BIP channel.

In this implementation, optionally, the eUICC may establish a session with the OPS by using the LPA, and receive, by using an APDU command, the encryption algorithm patch package sent from the LPA. The encryption algorithm patch package is sent by the OPS to the LPA. Optionally, the eUICC may directly establish a BIP channel with the OPS by using the BIP protocol, and receive the encryption algorithm patch package from the OPS by using the BIP channel.

In this implementation, the eUICC may separately receive the encryption algorithm patch package and the input key command, to separately update the eUICC with the first encryption algorithm identifier and the first encryption algorithm that are in the encryption algorithm patch package and the first CI public key identifier and the first CI public key that are in the input key command.

Figure 13:
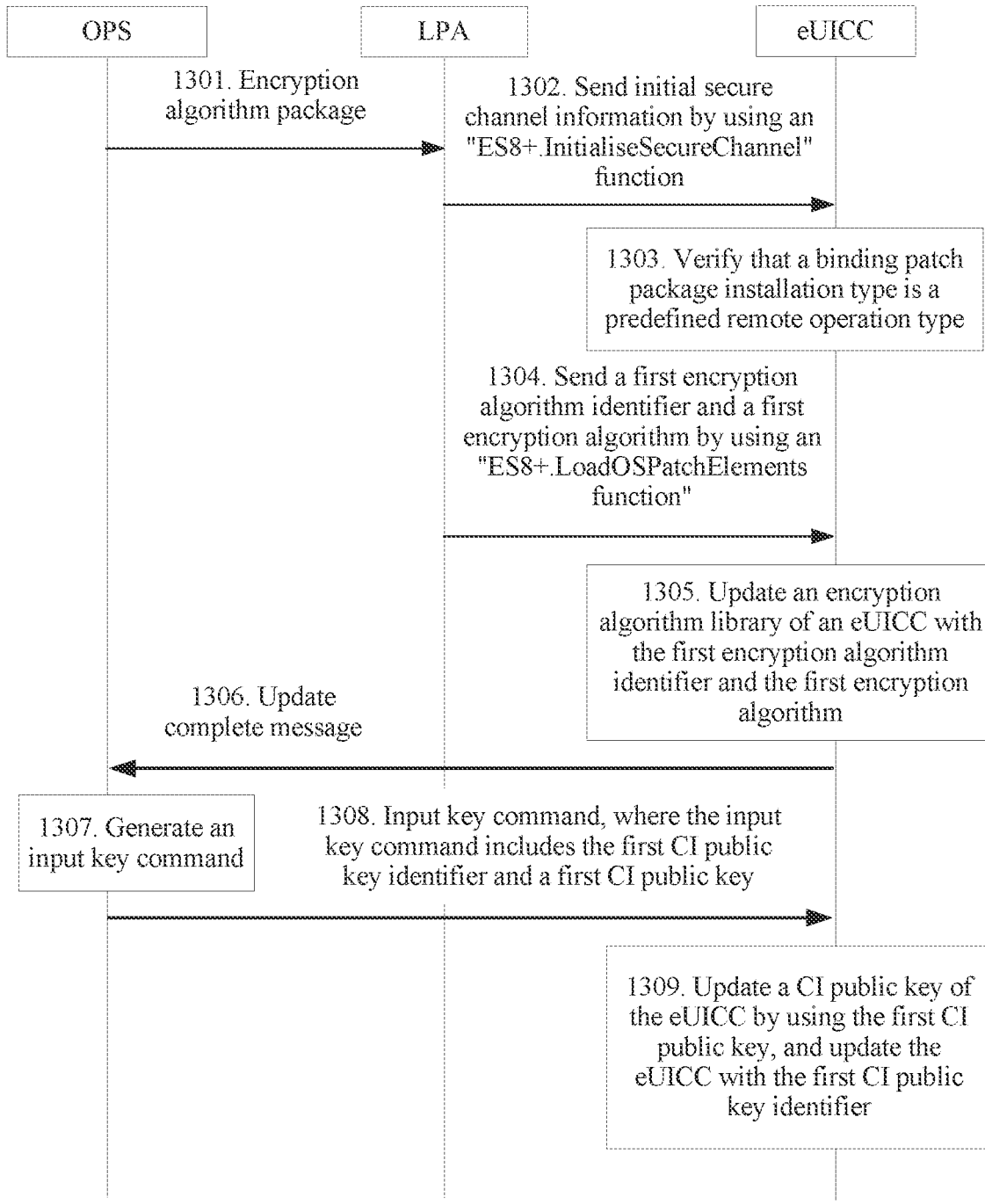
FIG. 13 is a schematic diagram of a process in which an OPS sends a patch package to an eUICC according to an embodiment of the present invention.
Figure 14A:
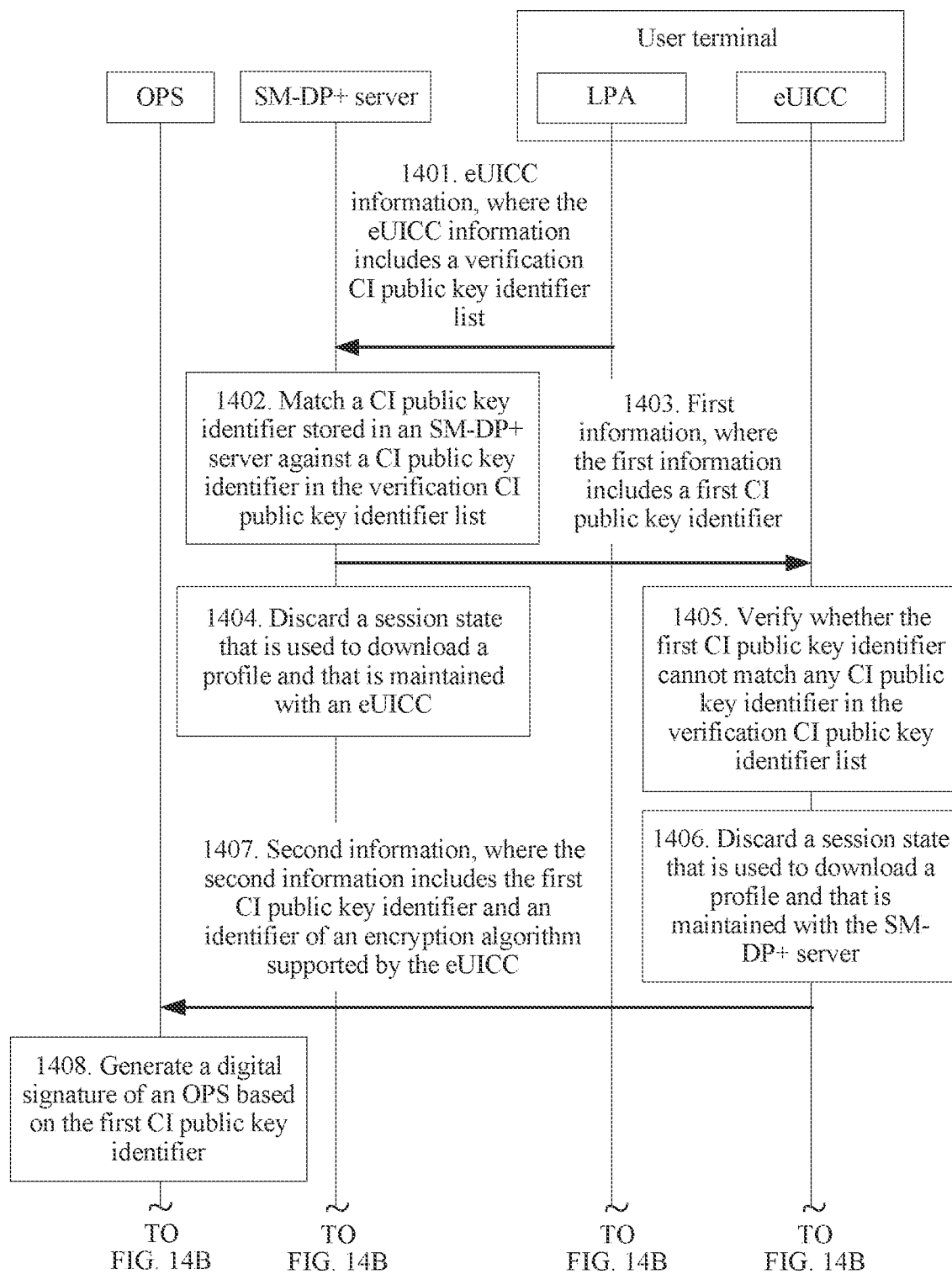
Figure 14B:
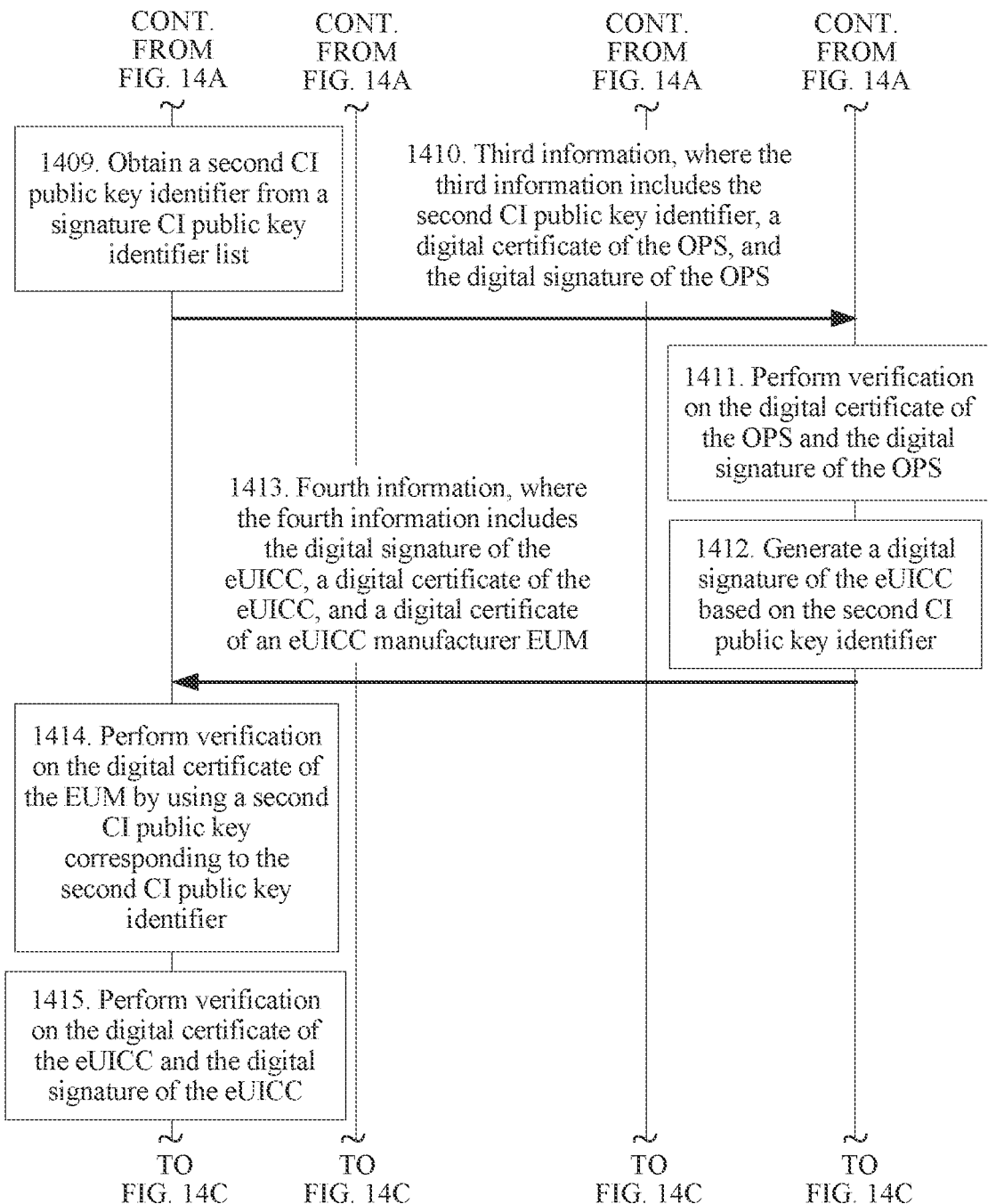
Figure 14C:
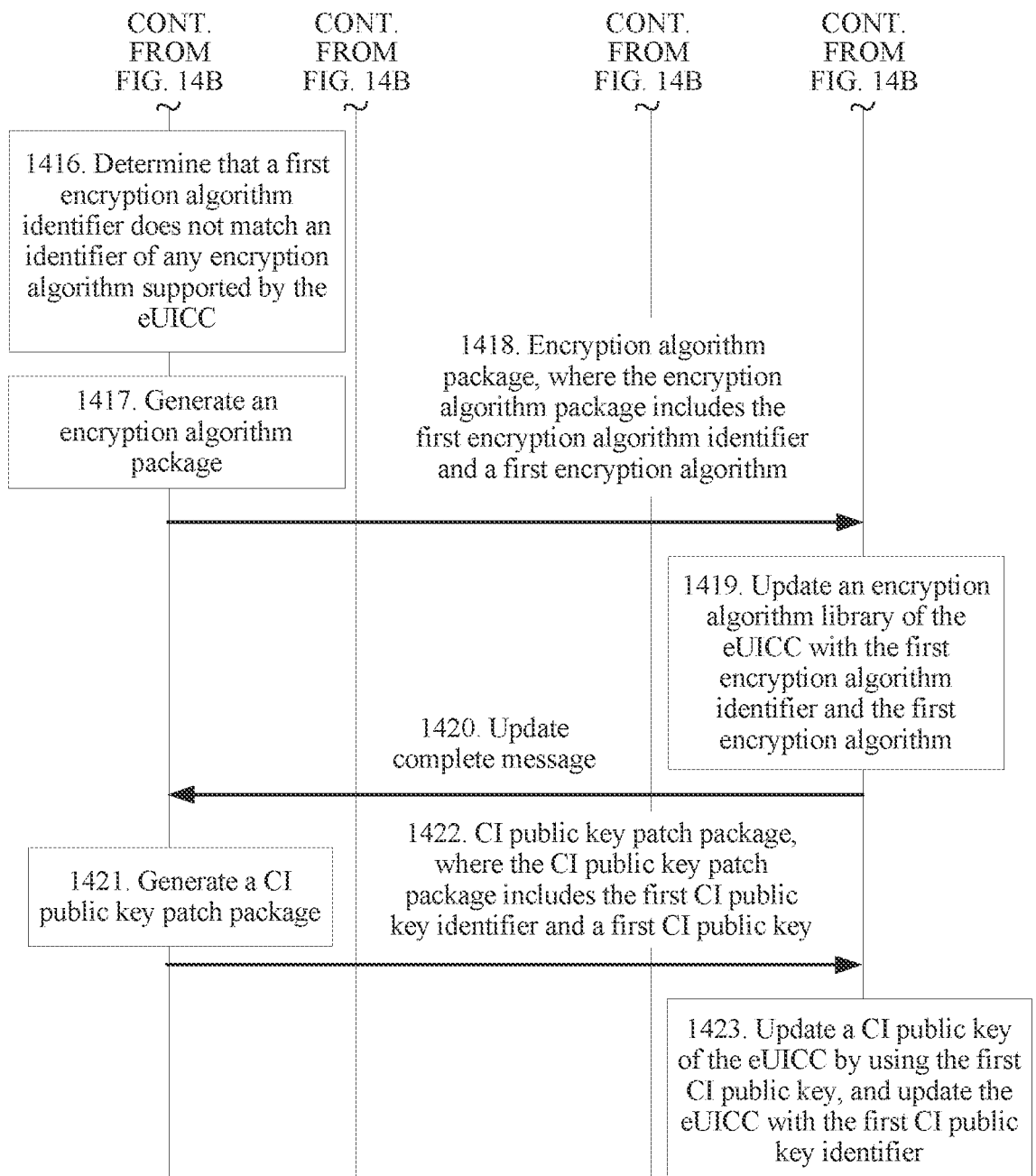
Figure 15A:
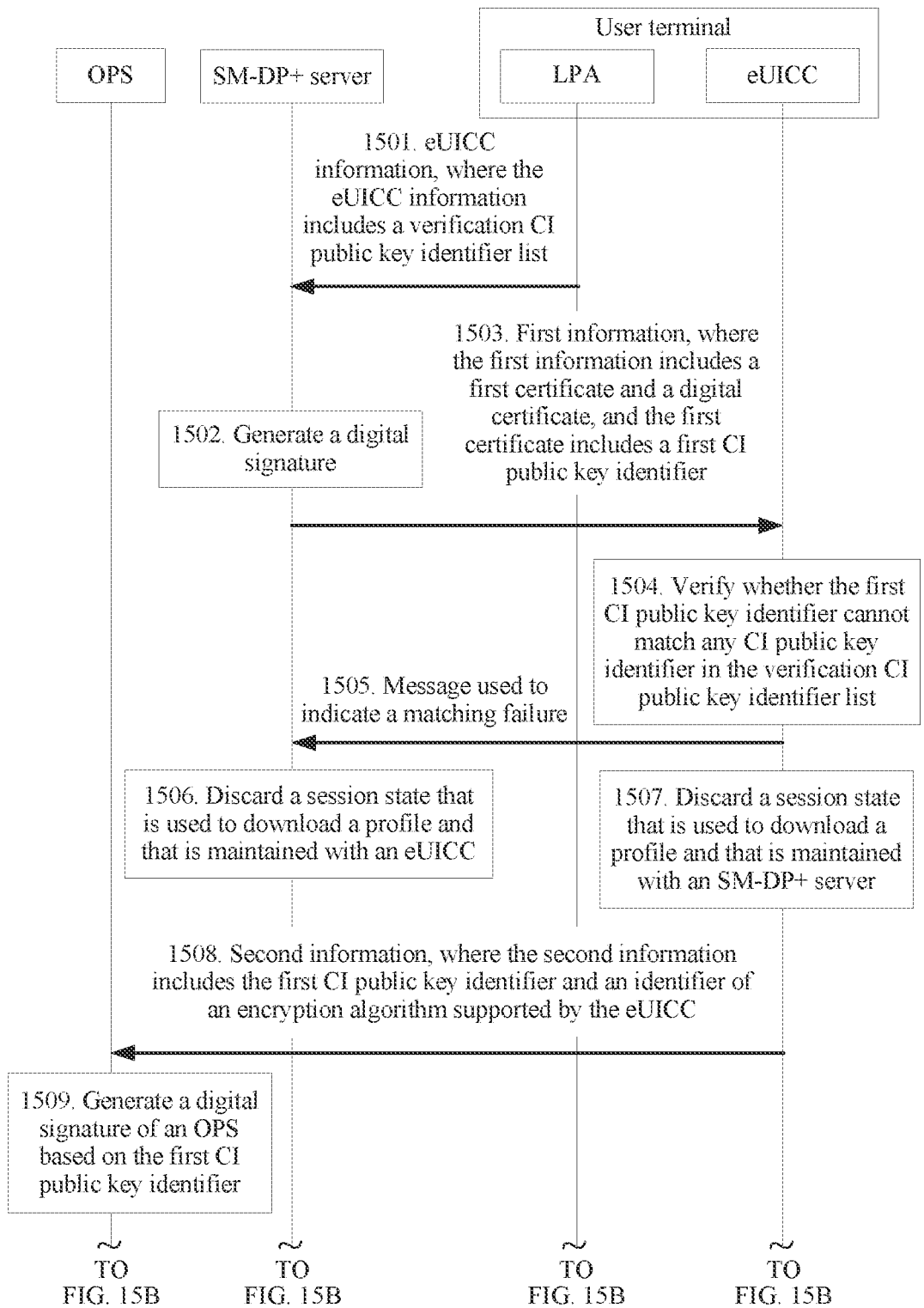
Figure 15B:
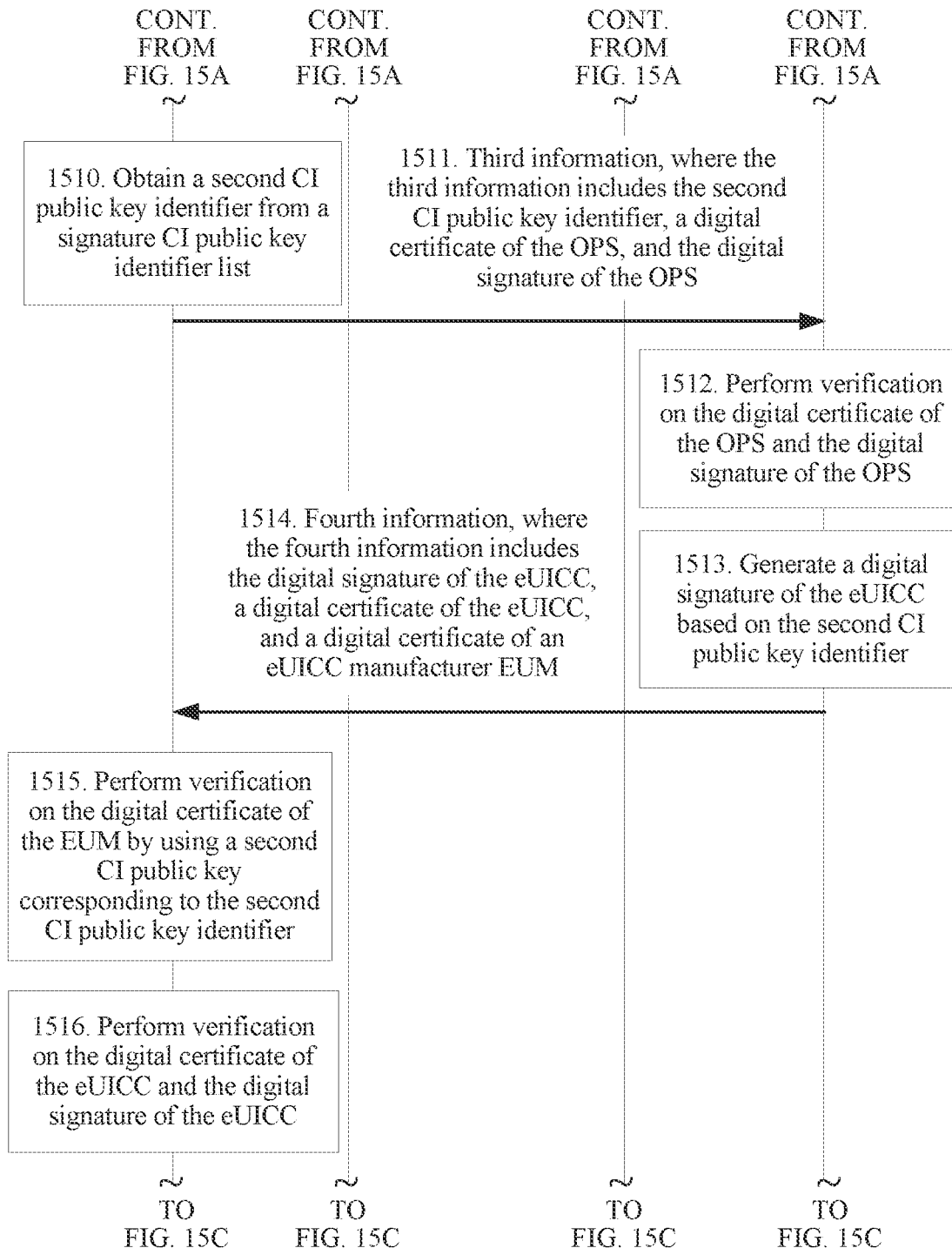
Figure 15C:
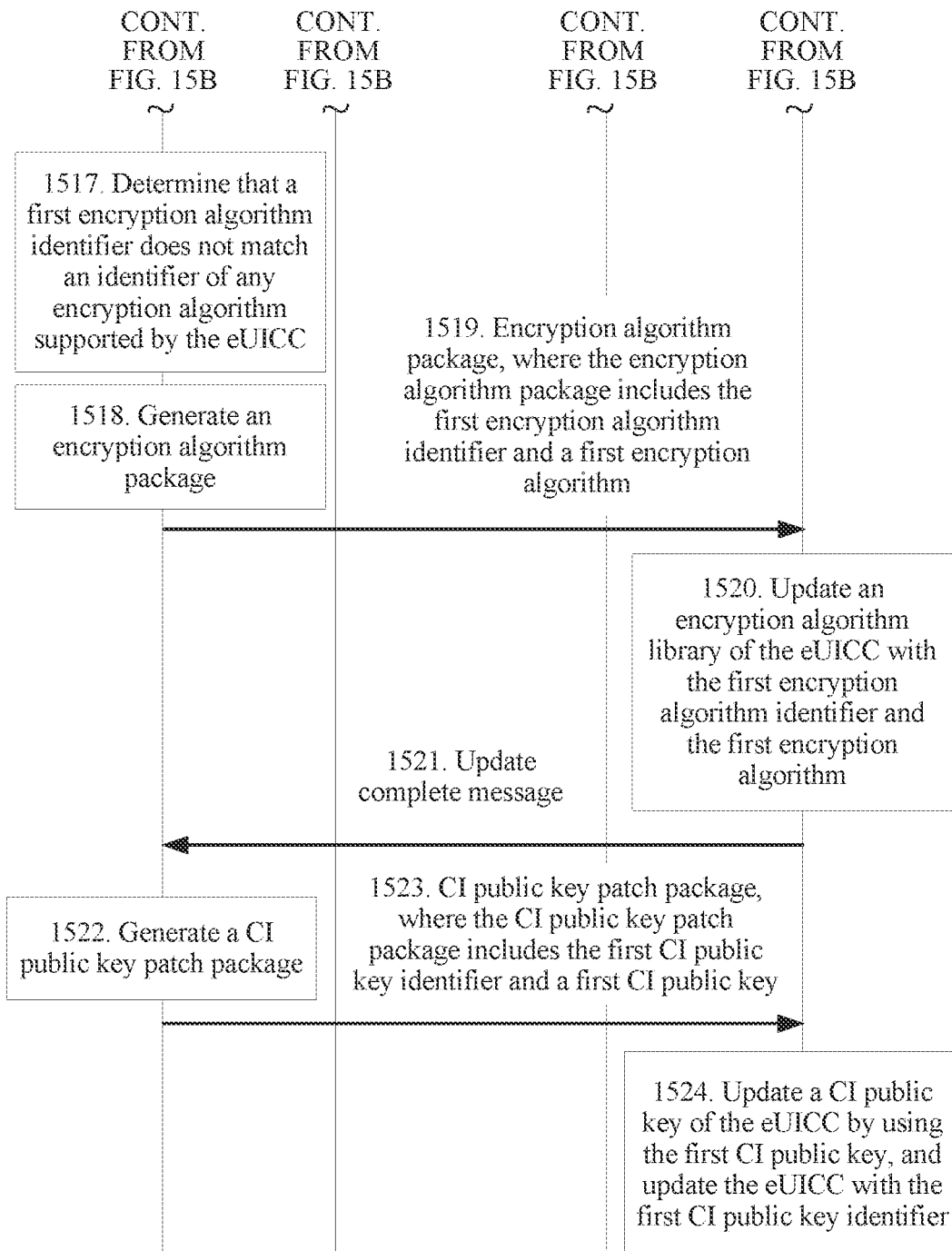

In an optional implementation, when the first encryption algorithm identifier exists in the encrypted data, a specific procedure in which the eUICC receives the encryption algorithm patch package and the input key command that are sent by the OPS by using the LPA may be shown in FIG. 13. As shown in FIG. 13, the LPA repeatedly invokes an ES10b.LoadBoundPackage function, to send an initial secure channel function of an ES8+ interface in the patch package to the eUICC. The eUICC verifies that a binding patch package installation type in an initial secure channel message is a predefined remote operation type. The LPA repeatedly invokes the ES10b.LoadBoundPackage function, to send an ES8+ patch element loading function to the eUICC. After receiving the ES8+ patch element loading function, the eUICC updates an encryption algorithm library of the eUICC with the first encryption algorithm and the first encryption algorithm identifier.

Optionally, when the first encryption algorithm identifier exists in the storage metadata, after the LPA performs step 1302, the LPA may further repeatedly invoke the ES10b.LoadBoundPackage function, to send a storage metadata function of the ES8+ interface in the binding package to the eUICC. After receiving the storage metadata function of the ES8+ interface, the eUICC obtains the first encryption algorithm identifier from the storage metadata through parsing.

In an optional implementation, as shown in FIG. 14A, FIG. 14B, and FIG. 14C, and FIG. 15A, FIG. 15B, and FIG. 15C, the second information further includes an identifier of an encryption algorithm supported by the eUICC, and the OPS may further perform the following steps: the OPS determines that a first encryption algorithm identifier corresponding to the first CI public key does not match an identifier of any encryption algorithm supported by the eUICC; the OPS generates an encryption algorithm patch package, where the encryption algorithm patch package includes the first encryption algorithm identifier and a first encryption algorithm corresponding to the first encryption algorithm identifier; and the OPS sends the encryption algorithm patch package to the eUICC; correspondingly, a specific implementation in which the OPS generates the patch package may be as follows: the OPS generates a CI public key patch package, where the CI public key patch package includes the first CI public key identifier and the first CI public key; and correspondingly, a specific implementation in which the OPS sends the patch package to the eUICC by using the LPA may be as follows: the OPS sends the CI public key patch package to the eUICC.

In this implementation, optionally, after the OPS generates the encryption algorithm patch package and sends the encryption algorithm package to the eUICC, and after the OPS receives an update complete message that is returned by the eUICC and that is used to indicate that all patches in the encryption algorithm patch package have been updated, the OPS may generate the CI public key patch package, and send the CI public key patch package to the eUICC. Optionally, the OPS may first generate the CI public key patch package, and send the CI public key patch package to the eUICC. After receiving an update complete message that is returned by the eUICC and that is used to indicate that all patches in the CI public key patch package have been updated, the OPS generates the encryption algorithm patch package, and sends the encryption algorithm package to the eUICC.

In this implementation, the OPS may separately send the encryption algorithm patch package and the CI public key patch package, so that the eUICC can further separately update the eUICC with the first encryption algorithm identifier and the first encryption algorithm that are in the encryption algorithm patch package and the first CI public key identifier and the first CI public key that are in the CI public key patch package.

In an optional implementation, as shown in FIG. 14A, FIG. 14B, and FIG. 14C, and FIG. 15A, FIG. 15B, and FIG.

15C, the eUICC may further receive an encryption algorithm patch package sent by the OPS by using the LPA, where the encryption algorithm patch package includes a first encryption algorithm identifier corresponding to the first CI public key and a first encryption algorithm corresponding to the first encryption algorithm identifier, and the first encryption algorithm identifier does not match an identifier of any encryption algorithm supported by the eUICC; correspondingly, a specific implementation in which the eUICC receives the patch package sent by the OPS by using the LPA may be as follows: the eUICC receives a CI public key patch package sent by the OPS by using the LPA, where the CI public key patch package includes the first CI public key identifier and the first CI public key; and correspondingly, the eUICC may further update an encryption algorithm library of the eUICC with the first encryption algorithm identifier and the first encryption algorithm; and the eUICC may update the CI public key of the eUICC by using the first CI public key, and update the eUICC with the first CI public key identifier.

In this implementation, optionally, the eUICC may first receive the encryption algorithm package sent by the OPS. After updating all patches in the encryption algorithm patch package, the eUICC returns, to the OPS, an update complete message that is used to indicate that all the patches in the encryption algorithm patch package have been updated. After returning the update complete message to the OPS, the eUICC receives the CI public key patch package. Alternatively, the eUICC may first receive the CI public key patch package sent by the OPS. After updating all patches in the CI public key patch package, the eUICC returns, to the OPS, an update complete message that is used to indicate that all the patches in the CI public key patch package have been updated. After returning the update complete message to the OPS, the eUICC receives the encryption algorithm package.

In this implementation, the eUICC may separately receive the encryption algorithm patch package and the CI public key patch package, to separately update the eUICC with the first encryption algorithm identifier and the first encryption algorithm that are in the encryption algorithm patch package and the first CI public key identifier and the first CI public key that are in the CI public key patch package.

Figure 16:
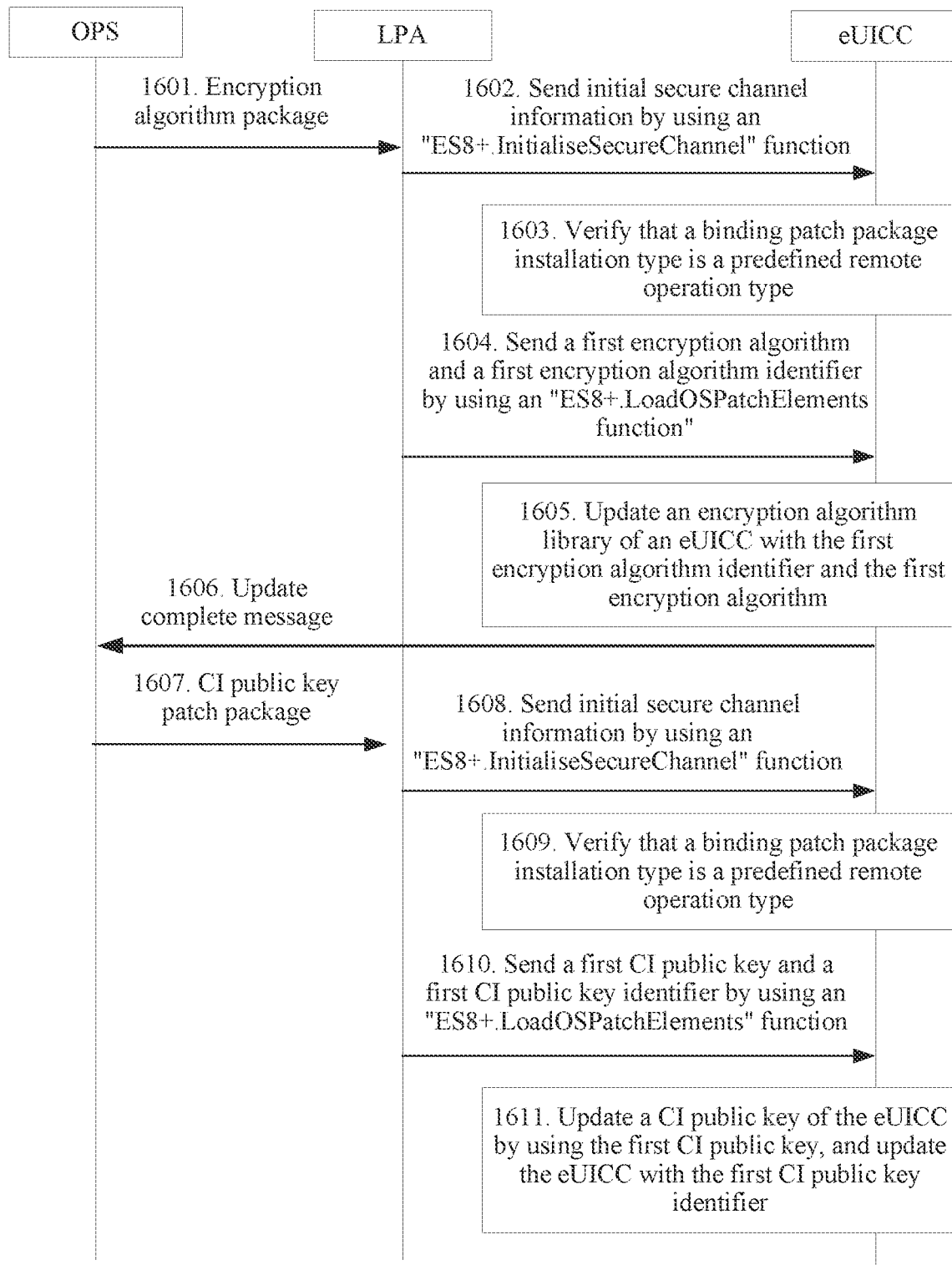
Figure 17A:
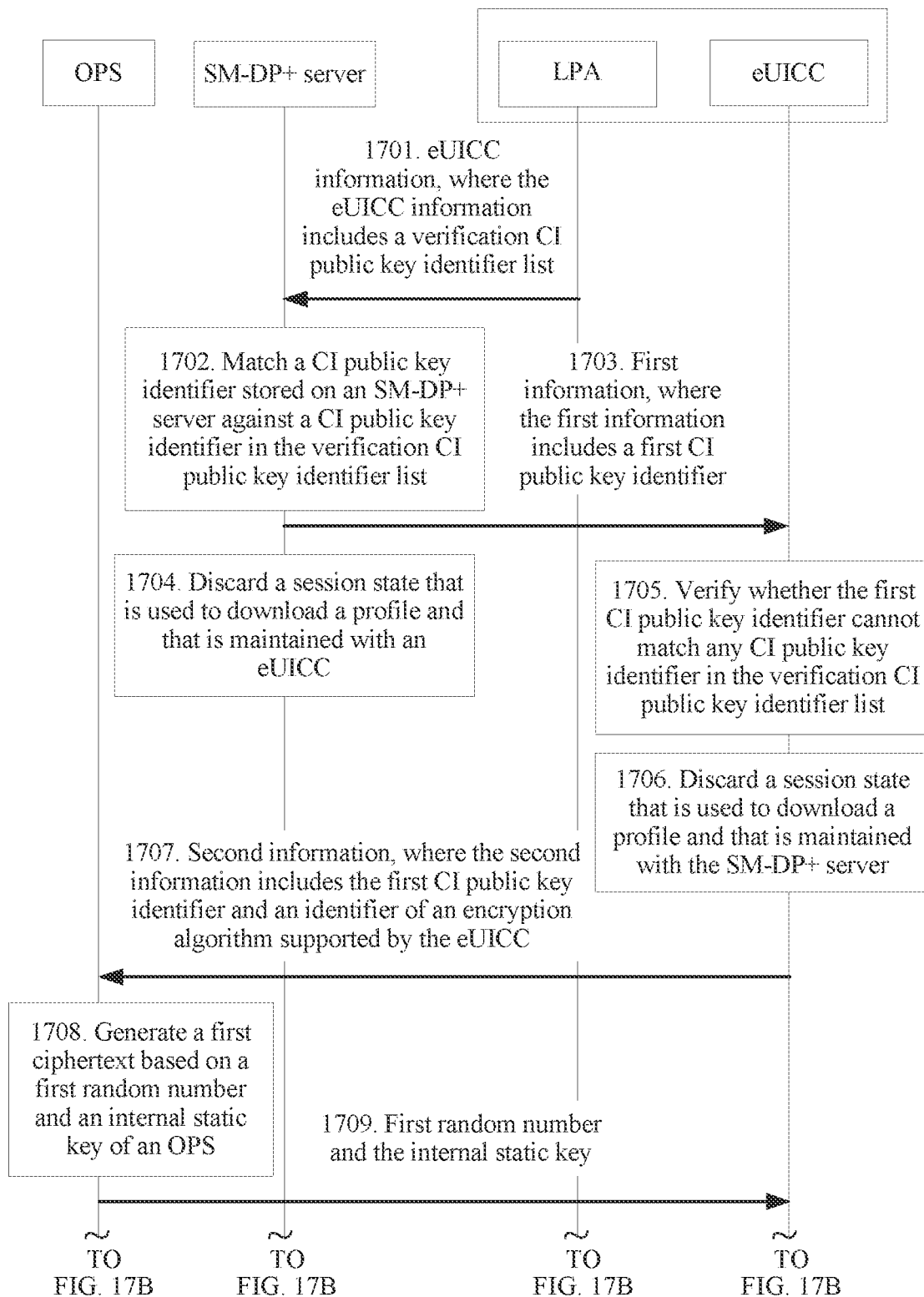
Figure 17B:
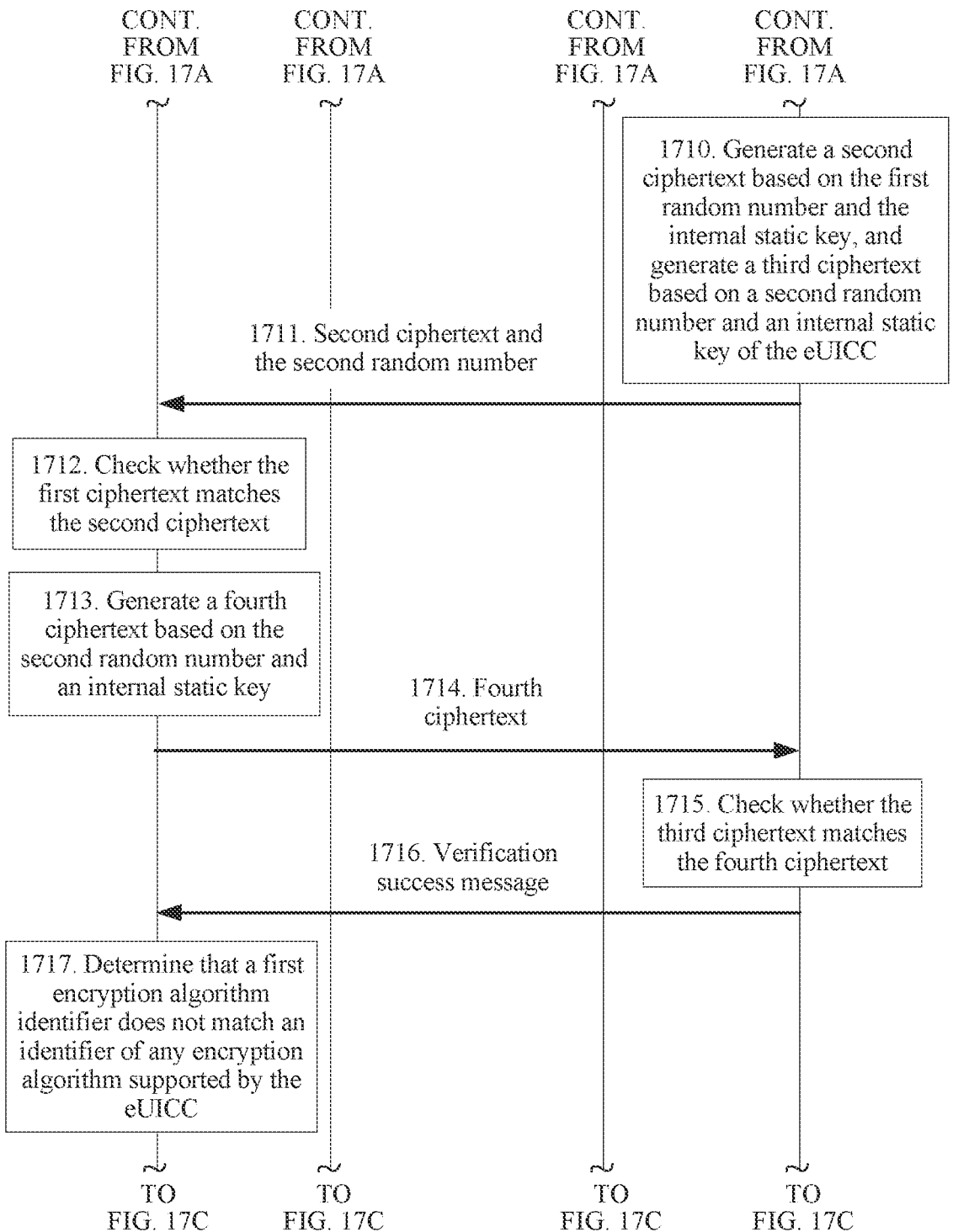
Figure 17C:
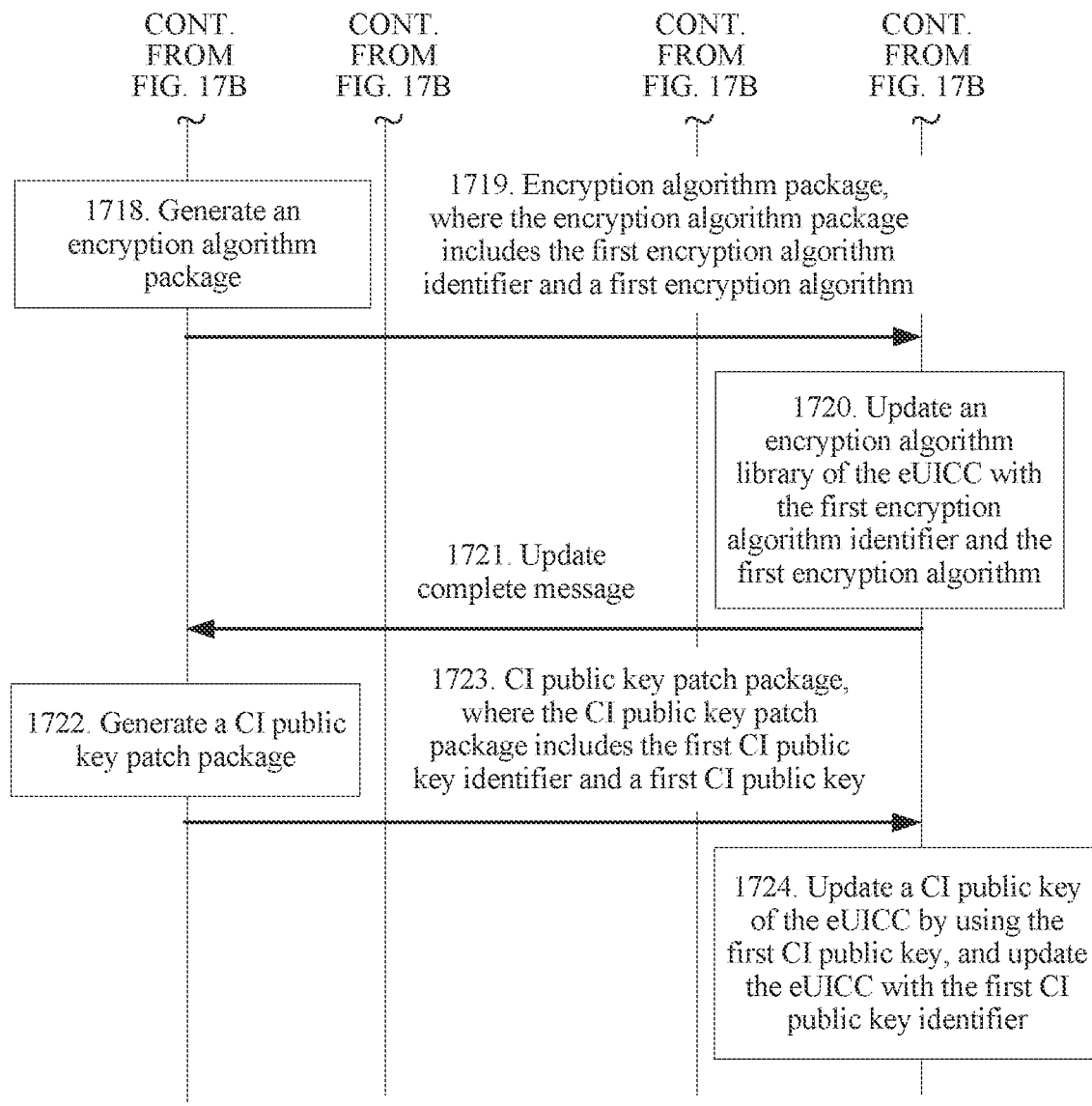
Figure 18A:
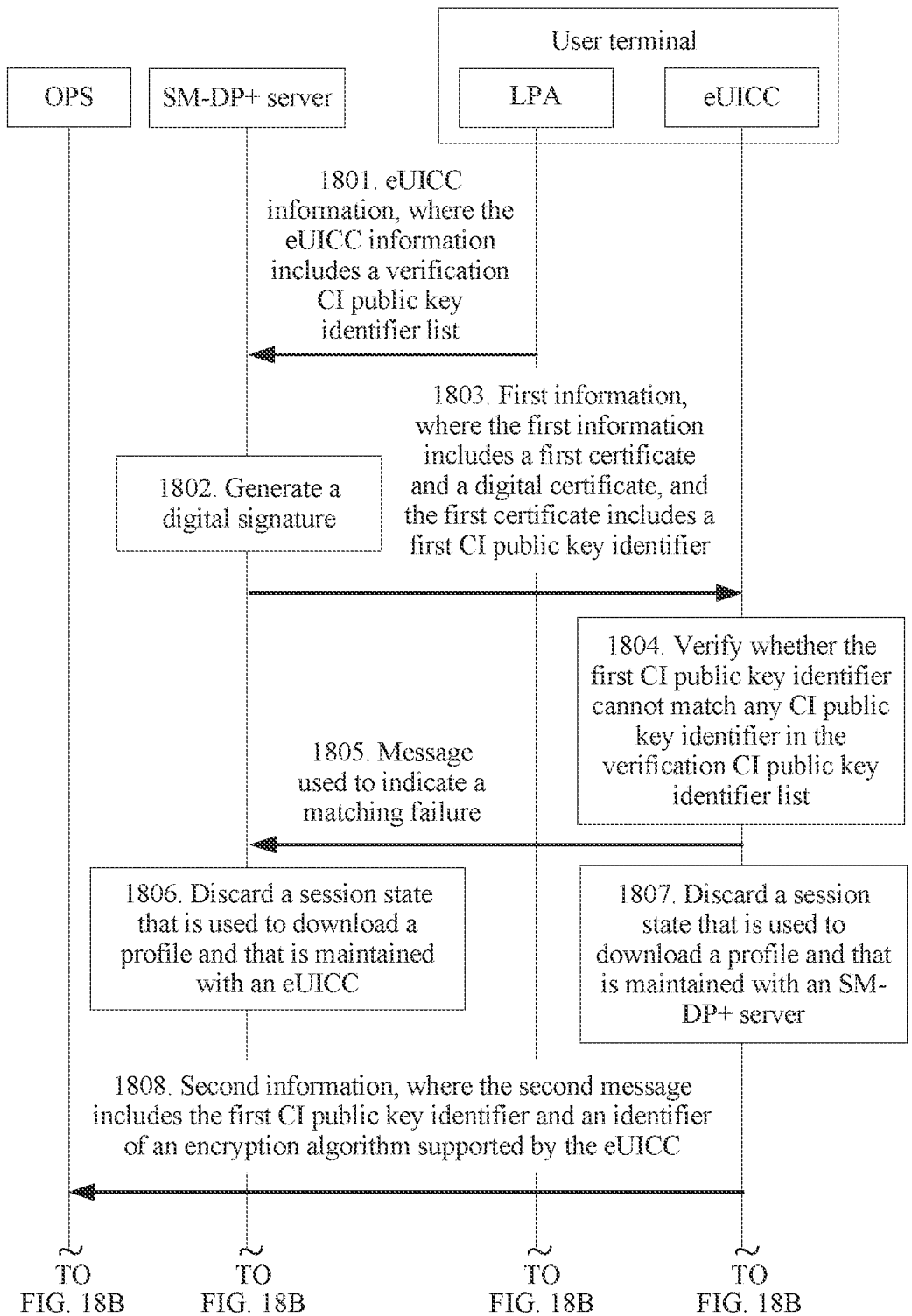
Figure 18B:
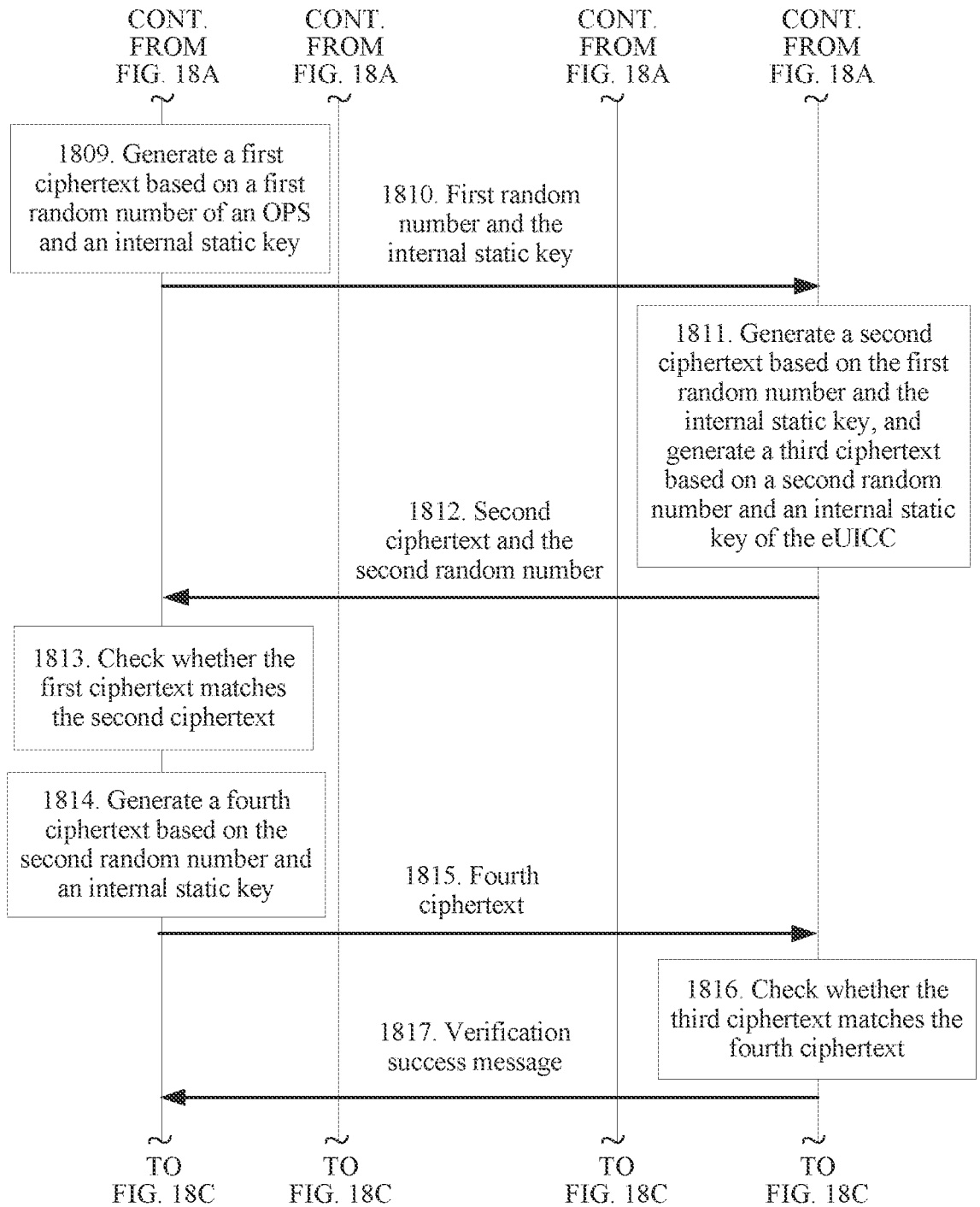
Figure 18C:
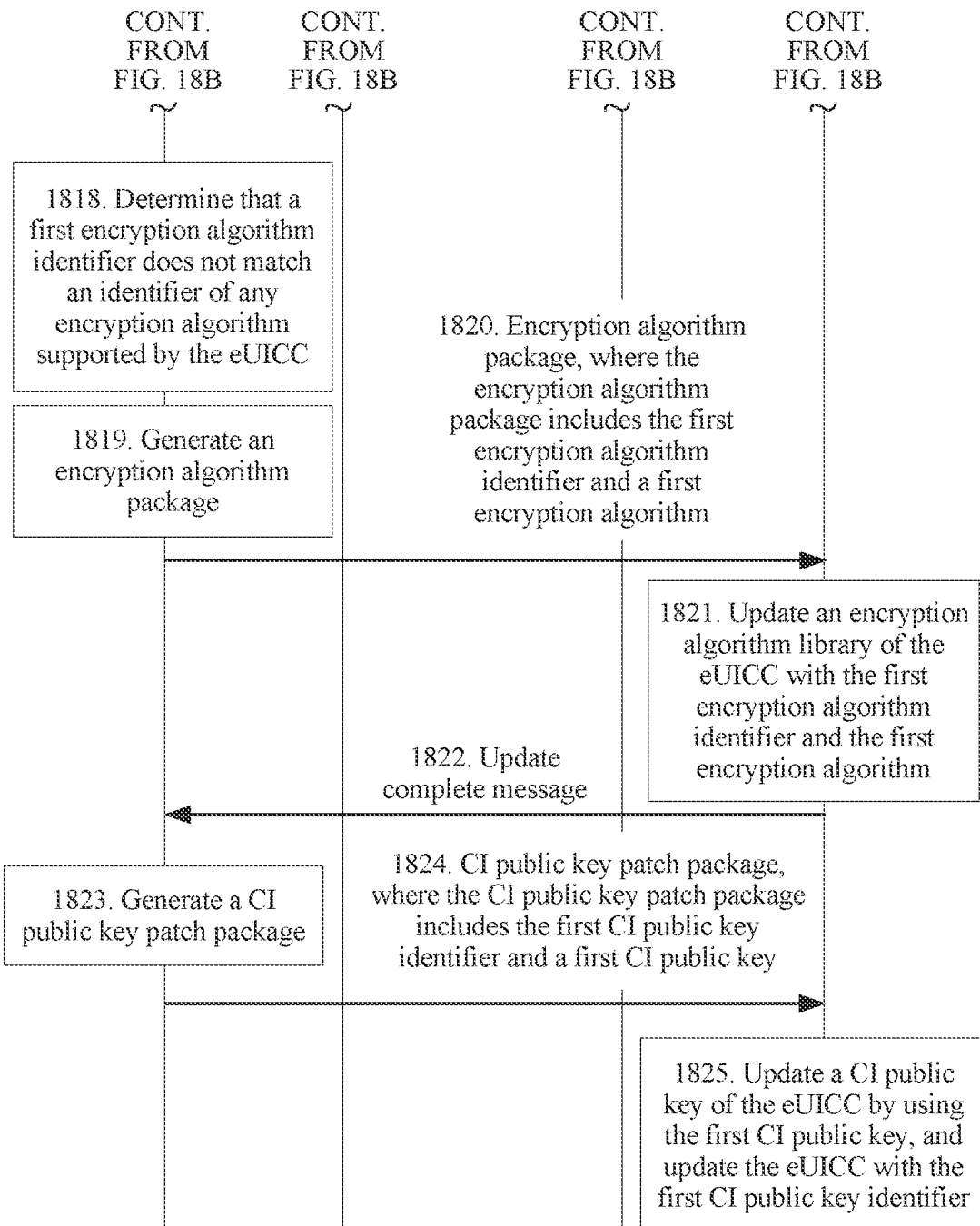

In an optional implementation, when the first encryption algorithm identifier exists in the encrypted data, as shown in FIG. 16, a specific procedure in which the eUICC receives the encryption algorithm patch package and the CI public key patch package that are sent by the OPS by using the LPA may be shown in FIG. 16. As shown in FIG. 16, after the LPA receives the CI public key patch package, the LPA repeatedly invokes an ES10b.LoadBoundPackage function, to send an initial secure channel function of an ES8+ interface in the patch package to the eUICC. The eUICC verifies that a binding patch package installation type in an initial secure channel message is a predefined remote operation type. The LPA repeatedly invokes the ES10b.LoadBoundPackage function, to send an ES8+ patch element loading function to the eUICC. After receiving the ES8+ patch element loading function, the eUICC updates an encryption algorithm library of the eUICC with the first encryption algorithm and the first encryption algorithm identifier.

As shown in FIG. 16, after receiving the CI public key patch package, the LPA repeatedly invokes the ES10b.LoadBoundPackage function, to send the initial secure channel function of the ES8+ interface in the patch package to the eUICC. The eUICC verifies that the binding patch package installation type in the initial secure channel message is the predefined remote operation type. The LPA repeatedly invokes the ES10b.LoadBoundPackage function, to send the ES8+ patch element loading function to the eUICC. After receiving the ES8+ patch element loading function, the eUICC updates the eUICC with the first CI public key and the first CI public key identifier.

In an optional implementation, as shown in FIG. 17A, FIG. 17B, and FIG. 17C, and FIG. 18A, FIG. 18B, and FIG. 18C, after receiving the second information, the OPS may further perform the following parts: the OPS generates a first ciphertext based on a first random number and an internal static key of the OPS; the OPS sends the first random number and the internal static key to the eUICC by using the LPA; the OPS receives a second ciphertext sent by the eUICC and a second random number of the eUICC; the OPS checks whether the first ciphertext matches the second ciphertext; if the first ciphertext matches the second ciphertext, the OPS generates a fourth ciphertext based on the second random number and an internal static key of the eUICC, and the OPS sends the fourth ciphertext to the eUICC by using the LPA; and after the OPS receives a verification success message sent by the eUICC by using the LPA, the OPS performs the step of generating a patch package.

In this implementation, bidirectional authentication may be performed between the eUICC and the OPS, to ensure validity of the entities on both sides.

In an optional implementation, as shown in FIG. 17A, FIG. 17B, and FIG. 17C, and FIG. 18A, FIG. 18B, and FIG. 18C, after sending the second information to the OPS, the eUICC may further perform the following parts: the eUICC receives a first random number and an internal static key that are sent by the OPS by using the LPA; the eUICC generates a second ciphertext based on the first random number and the internal static key, and generates a third ciphertext based on a second random number and an internal static key of the eUICC; the eUICC sends the second ciphertext and the second random number to the OPS by using the LPA; the eUICC receives a fourth ciphertext sent by the OPS by using the LPA; the eUICC checks whether the third ciphertext matches the fourth ciphertext; and if the third ciphertext matches the fourth ciphertext, the eUICC sends a verification success message to the OPS by using the LPA.

The OPS generates a session key by using a random number of the OPS, a random number of the eUICC, and a static key. Likewise, the eUICC generates a session key by using a same method. When generating the patch package, the OPS encrypts a generated CI public key message and a generated algorithm patch package by using the session key.

In this implementation, bidirectional authentication may be performed between the eUICC and the OPS, to ensure validity of the entities on both sides.

Figure 19A:
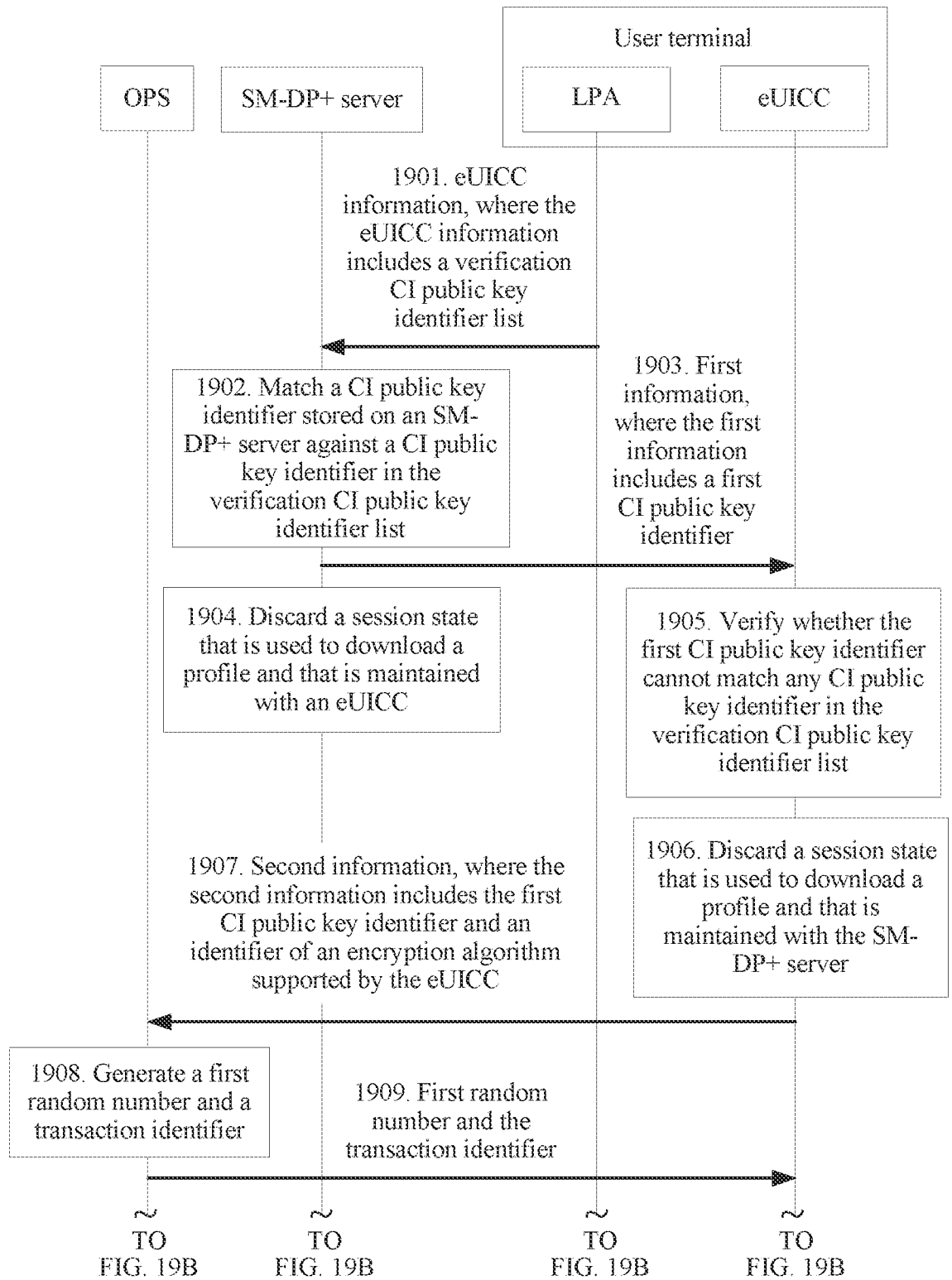
Figure 19B:
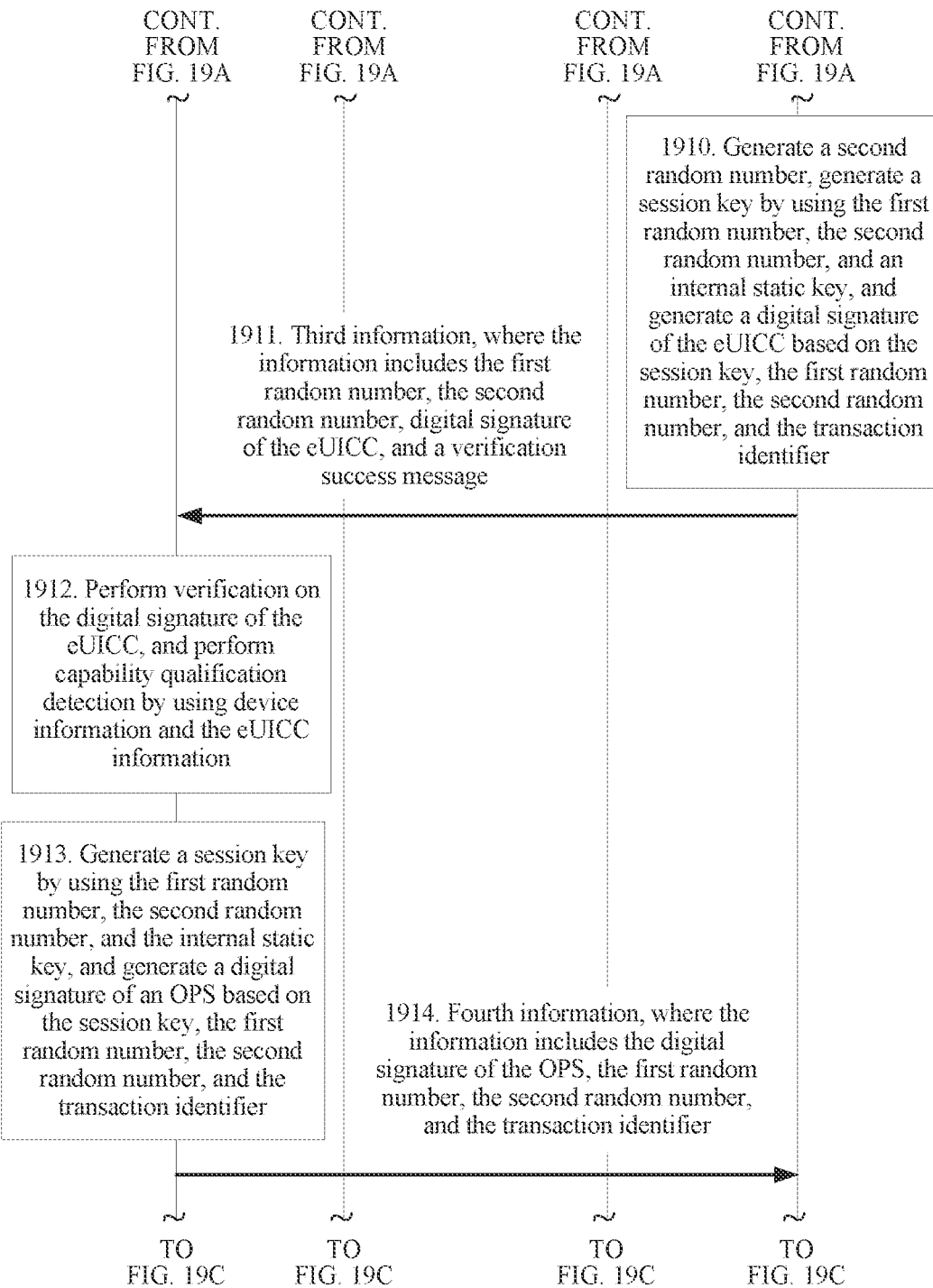
Figure 19C:
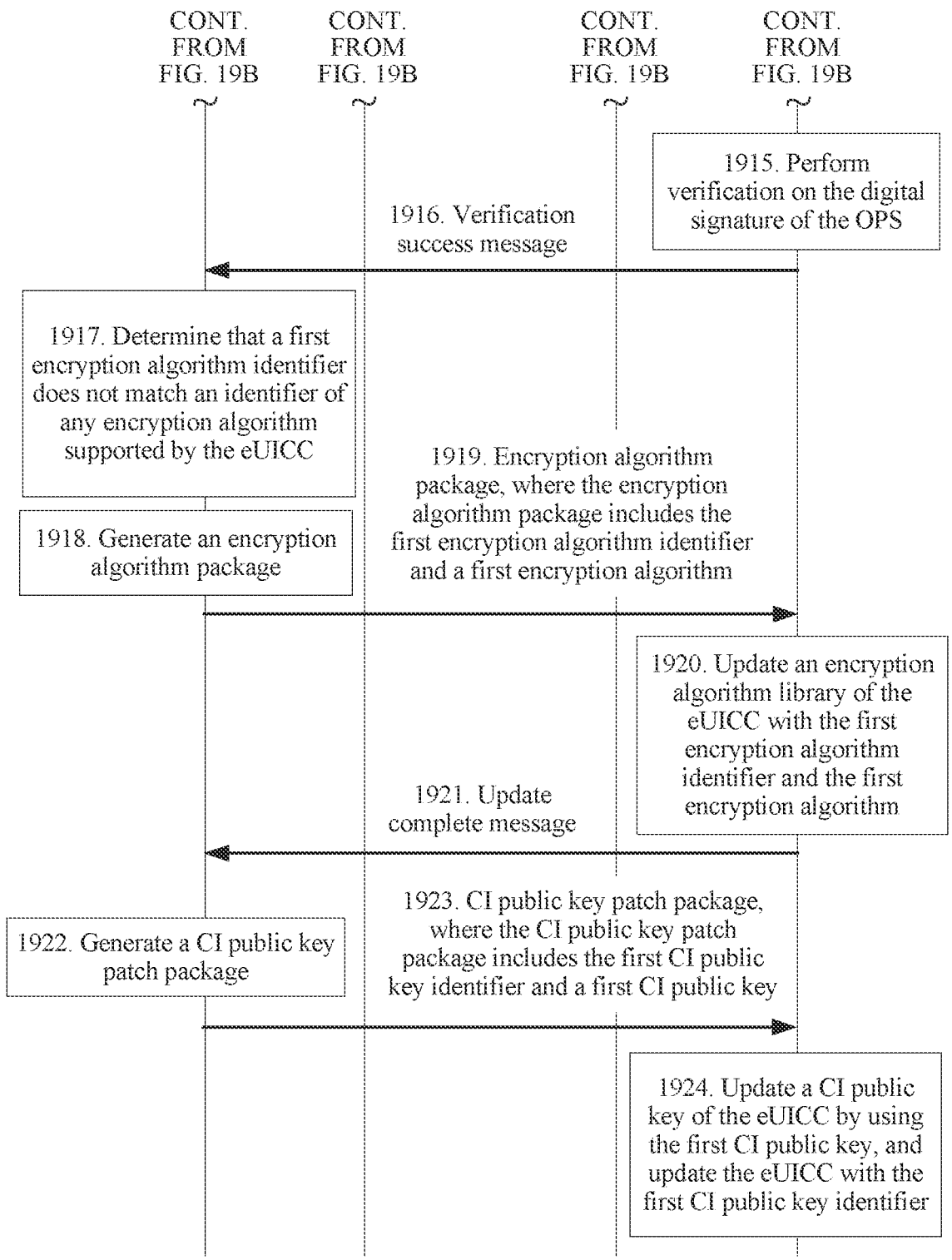

In an optional implementation, as shown in FIG. 19A, FIG. 19B, and FIG. 19C, after receiving the second information, the OPS may further perform the following parts: The OPS generates a first random number and a transaction identifier (namely, a transaction ID). The OPS sends the first random number and the transaction identifier to the eUICC by using the LPA. The OPS receives third information sent by the eUICC by using the LPA. The OPS performs verification on a digital signature of the eUICC, and performs capability qualification detection by using device information and eUICC information. If the verification performed on the digital signature of the eUICC succeeds, and the capability qualification detection succeeds, the OPS generates a session key by using the first random number, a second random number, and an internal static key, and generates a digital signature of the OPS based on the session key, the first random number, the second random number, and the transaction identifier. The OPS sends fourth information to the eUICC by using the LPA. If the OPS receives a verification success message sent by the eUICC by using the LPA, bidirectional authentication succeeds.

In this implementation, the OPS may perform verification on the digital signature of the eUICC by using the first random number, the second random number, and the transaction identifier that are in the third information.

In this implementation, a specific implementation in which the OPS generates the digital signature of the OPS based on the session key, the first random number, the second random number, and the transaction identifier may be as follows: the OPS generates to-be-signed information (OPSSigned1) by using the first random number, the second random number, and the transaction identifier; and the OPS signs the to-be-signed information by using the session key, to obtain the digital signature of the OPS. Optionally, the OPSSigned1 may further include an OPS address.

In this implementation, bidirectional authentication may be performed between the eUICC and the OPS, to ensure validity of the entities on both sides.

In an optional implementation, as shown in FIG. 19A, FIG. 19B, and FIG. 19C, after sending the second information to the OPS by using the LPA, the eUICC may further perform the following parts: the eUICC receives a first random number and a transaction identifier; the eUICC generates a second random number, generates a session key by using the first random number, the second random number, and an internal static key, and generates a digital signature of the eUICC based on the session key, the first random number, the second random number, and the transaction identifier; the eUICC sends third information to the OPS by using the LPA; the eUICC receives fourth information; the eUICC performs verification on the digital signature of the OPS; and if the verification performed on the digital signature of the OPS succeeds, the eUICC sends a verification success message to the OPS by using the LPA.

In this implementation, the eUICC may perform verification on the digital signature of the OPS by using the first random number, the second random number, and the transaction identifier that are in the fourth information.

In this implementation, a specific implementation in which the eUICC generates the digital signature of the eUICC based on the session key, the first random number, the second random number, and the transaction identifier may be as follows: the eUICC generates euiccSigned1 by using the first random number, the second random number, and the transaction identifier; and the eUICC signs euiccSigned1 by using the session key, to obtain the digital signature of the eUICC. Optionally, the euiccSigned1 may further include eUICC information.

In this implementation, bidirectional authentication may be performed between the eUICC and the OPS, to ensure validity of the entities on both sides.

Figure 20:
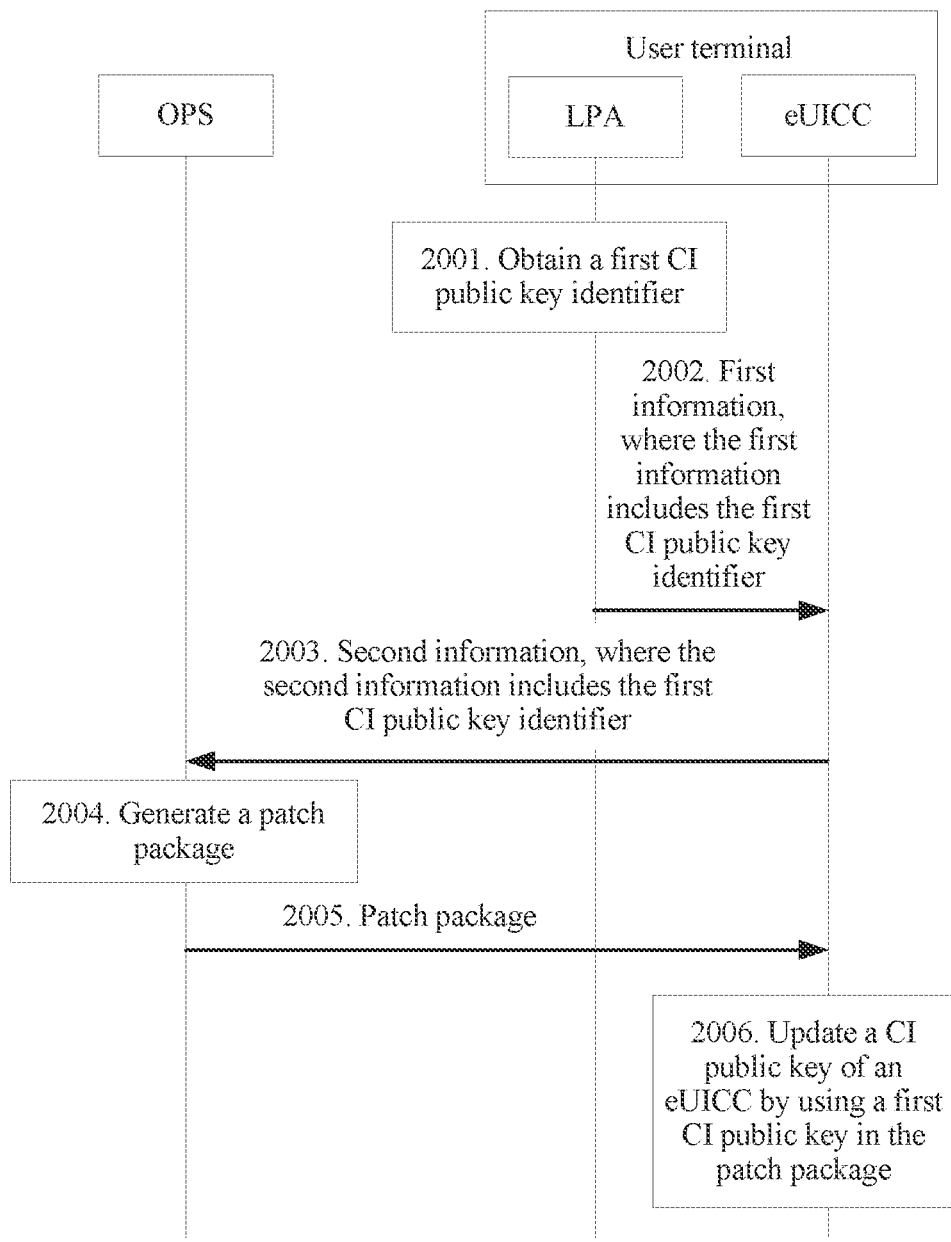

FIG. 20 is a schematic flowchart of a method for updating a certificate issuer public key according to an embodiment of the present invention. As shown in FIG. 20, the method for updating a certificate issuer public key may include parts 2001 to 2006.

2001. An LPA obtains a first CI public key identifier.

The first CI public key identifier cannot match any CI public key identifier in a verification CI public key identifier list of an eUICC. In other words, the first CI public key identifier does not exist in the verification CI public key identifier list of the eUICC, in other words, a CI public key corresponding to the first CI public key identifier does not exist in the eUICC.

Optionally, the verification CI public key identifier list of the eUICC stores, in a sequence of priorities, CI public key identifiers used to perform verification on CERT.DPauth-.ECDSA. For example, if an extracted CI public key identifier is a CI public key identifier 1, the verification CI public key identifier list is searched for the extracted CI public key identifier. If the extracted CI public key identifier 1 exists in the verification CI public key identifier list, a CI public key corresponding to the CI public key identifier 1 is used to perform verification on the CERT.DPauth.ECDSA. If the extracted CI public key identifier 1 does not exist in the verification CI public key identifier list, the eUICC does not have a CI public key corresponding to the CI public key identifier 1.

Optionally, the eUICC further includes a signature CI public key identifier list. The signature CI public key identifier list stores, in a sequence of priorities, CI public key identifiers used for signature calculation. For example, if the CI public key identifier obtained from the LPA is a public key identifier 1, after the eUICC creates eUICCSigned1, the eUICC searches the signature CI public key identifier list for the public key identifier 1. If the public key identifier 1 exists in the signature CI public key identifier list, SK.EUIC-C.ECDSA (an eUICC private key) corresponding to the public key identifier 1 is used to sign eUICCSigned1, to obtain a signature of the eUICC.

Optionally, the first CI public key identifier is obtained by the LPA by parsing an activation code Activation Code or a command code Command Code.

For example, a user may hold a user terminal, and scan an activation code by using the LPA of the user terminal. After scanning the activation code, the LPA parses the activation code, to obtain the first CI public key identifier from the activation code through parsing.

For another example, the LPA may receive a command code sent by a server, and parse the command code, to obtain the first CI public key identifier from the command code through parsing. Optionally, the server may be an SM DP+ server.

Optionally, the first CI public key identifier is information received by the LPA from a server. In other words, the LPA obtains the first CI public key identifier by receiving the first CI public key identifier sent by the server. The server may be an operator server or an SM DP+ server.

2002. The LPA sends first information to an eUICC.

In this embodiment of this application, after obtaining the first CI public key identifier, the LPA sends the first information to the eUICC. The first information includes the first CI public key identifier.

Optionally, after the LPA sends the first information to the eUICC, the LPA sends a session termination message to the eUICC, to discard a session state that is used to download a profile and that is maintained with the eUICC. In this way, a session resource can be released, to enable a new session state used to download a patch package.

2003. The eUICC sends second information to an OPS.

In this embodiment of the present invention, after the eUICC receives the first information sent by the LPA, the eUICC sends the second information to the OPS. The second information includes the first CI public key identifier.

Optionally, the first information further includes an OPS address, and the eUICC establishes an association with the OPS based on the OPS address received from the LPA.

Optionally, a specific implementation in which the eUICC sends the second information to the OPS is as follows: the eUICC sends the second information to the OPS by using the LPA.

Optionally, a specific implementation in which the eUICC sends the second information to the OPS is as follows: the eUICC sends the second information to the SM DP+ server by using the LPA, so that after receiving the second information, the SM DP+ server sends the second information to the OPS.

2004. The OPS generates a patch package.

In this embodiment of the present invention, after the OPS receives the second information sent by the eUICC, the OPS generates the patch package. The patch package includes at least a first CI public key corresponding to the first CI public key identifier.

2005. The OPS sends the patch package to the eUICC.

Optionally, after generating the patch package, the OPS sends the patch package to the eUICC by using the LPA.

2006. The eUICC updates a CI public key of the eUICC by using a first CI public key in the patch package.

In this embodiment of the present invention, after the eUICC receives the patch package sent by the OPS, the eUICC updates the CI public key of the eUICC by using the first CI public key in the patch package.

Specifically, the eUICC updates a CI public key set of the eUICC with the first CI public key in the patch package.

It may be learned that in the method described in FIG. 20, a CI public key identifier that the eUICC does not have can be updated in time, to ensure that the eUICC updates the first public key after the LPA obtains a CI public key identifier that is of an SM DP+ server and that is required for bidirectional authentication between the SM-DP+ server and the eUICC, so that subsequent bidirectional authentication is successfully performed. Therefore, after the bidirectional authentication between the SM-DP+ server and the eUICC succeeds, a profile can be successfully downloaded.

Figure 21:
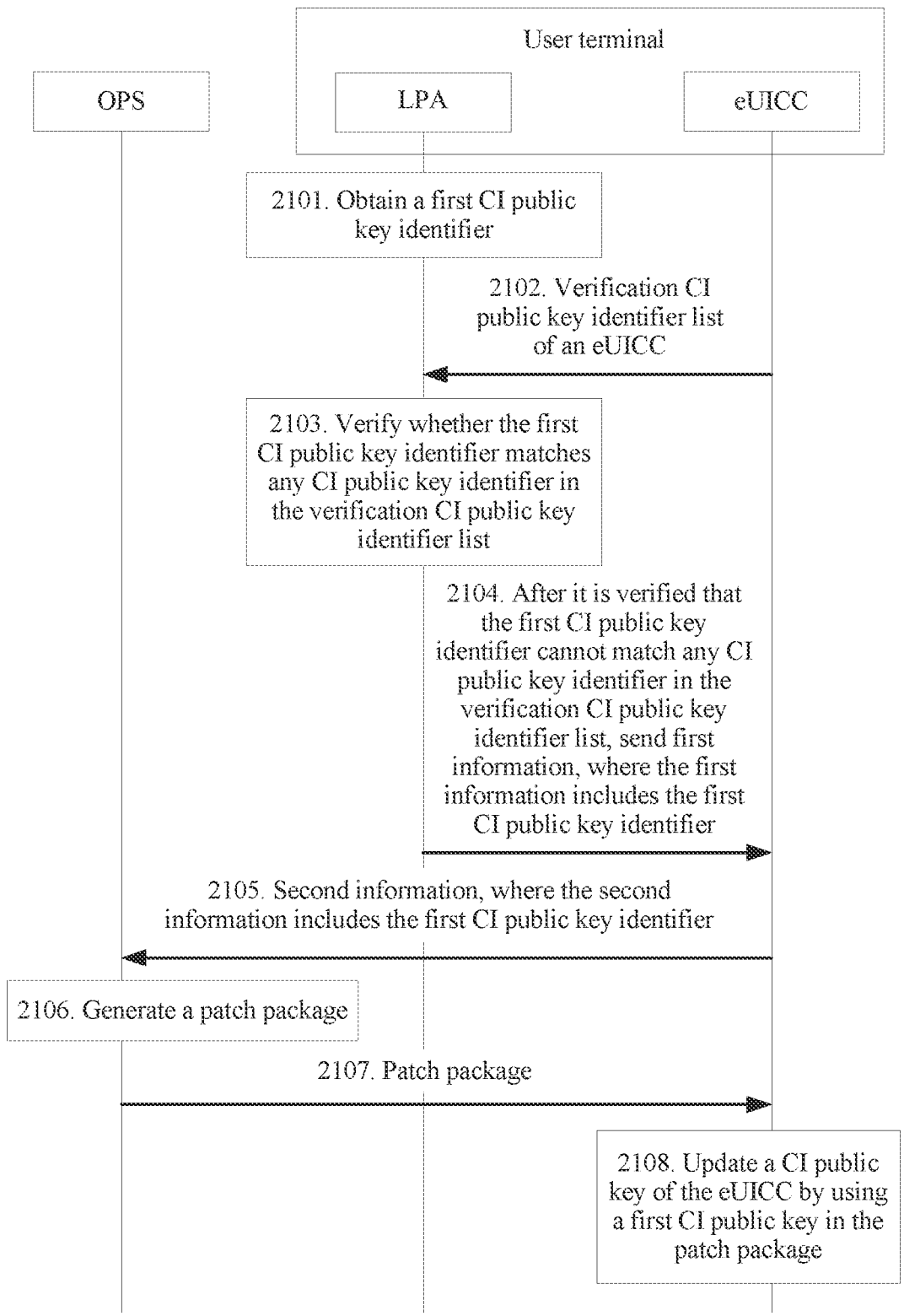

Optionally, as shown in FIG. 21, before the eUICC receives the first information sent by the LPA, the eUICC may further send a verification CI public key identifier list of the eUICC to the LPA. Correspondingly, the LPA may receive the verification CI public key identifier list of the eUICC from the eUICC; after obtaining the first CI public key identifier, the LPA verifies whether the first CI public key identifier matches any CI public key identifier in the verification CI public key identifier list; and after verifying that the first CI public key identifier cannot match any CI public key identifier in the verification CI public key identifier list, the LPA performs the step that the LPA sends first information to an eUICC.

Optionally, before obtaining the first CI public key identifier, the LPA may receive the verification CI public key identifier list of the eUICC from the eUICC, or after obtaining the first CI public key identifier, the LPA may receive the verification CI public key identifier list of the eUICC from the eUICC. In FIG. 21, an example in which after obtaining the first CI public key identifier, the LPA receives the verification CI public key identifier list of the eUICC from the eUICC is used.

Optionally, a specific implementation in which the eUICC sends the verification CI public key identifier list of the eUICC to the LPA is as follows: the eUICC sends eUICC-related information to the LPA, namely, eUICC information. The eUICC-related information includes the verification CI public key identifier list of the eUICC. Optionally, the eUICC-related information may further include the signature CI public key identifier list.

For example, the first CI public key identifier is a CI public key identifier 1, and the verification CI public key identifier list includes a CI public key identifier 2, a CI public key identifier 3, and a CI public key identifier 4. After verifying that the CI public key identifier 1 does not match the CI public key identifier 2, the CI public key identifier 1 does not match the CI public key identifier 3, and the CI public key identifier 1 does not match the CI public key identifier 4, the LPA sends the first information to the eUICC. In other words, the LPA sends the first CI public key identifier to the LPA.

In this implementation, the LPA may detect whether the eUICC does not have the first CI public key identifier.

Figure 22:
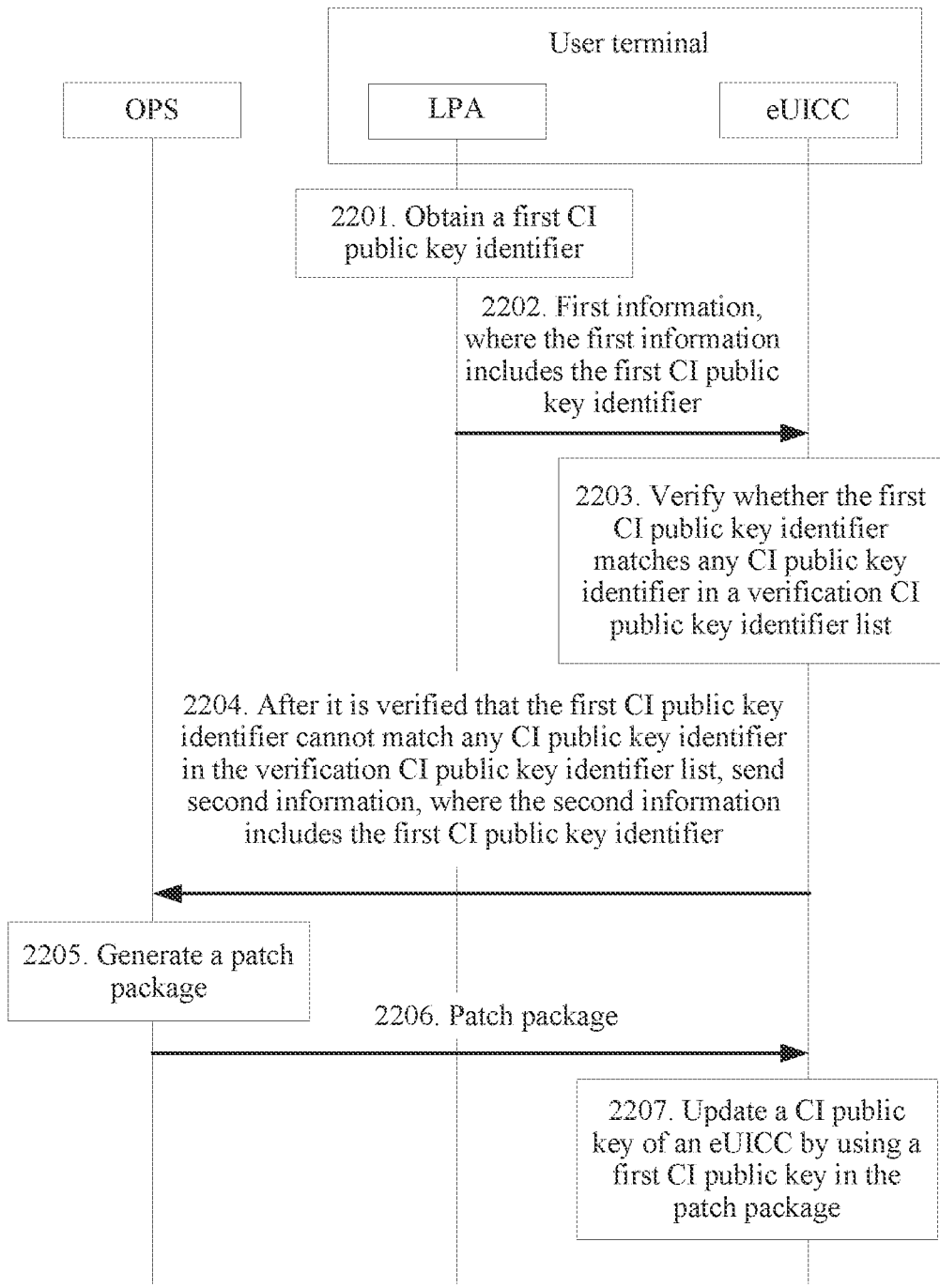

Optionally, as shown in FIG. 22, after the eUICC receives the first information sent by the LPA, and before the eUICC sends the second information to the OPS, the eUICC verifies whether the first CI public key identifier matches any CI public key identifier in the verification CI public key identifier list; and after verifying that the first CI public key identifier cannot match any CI public key identifier in the signature verification CI public key identifier list, the eUICC performs the step that the eUICC sends second information to an OPS.

In this implementation, the eUICC may detect whether the eUICC does not have the first CI public key identifier.

Figure 23:
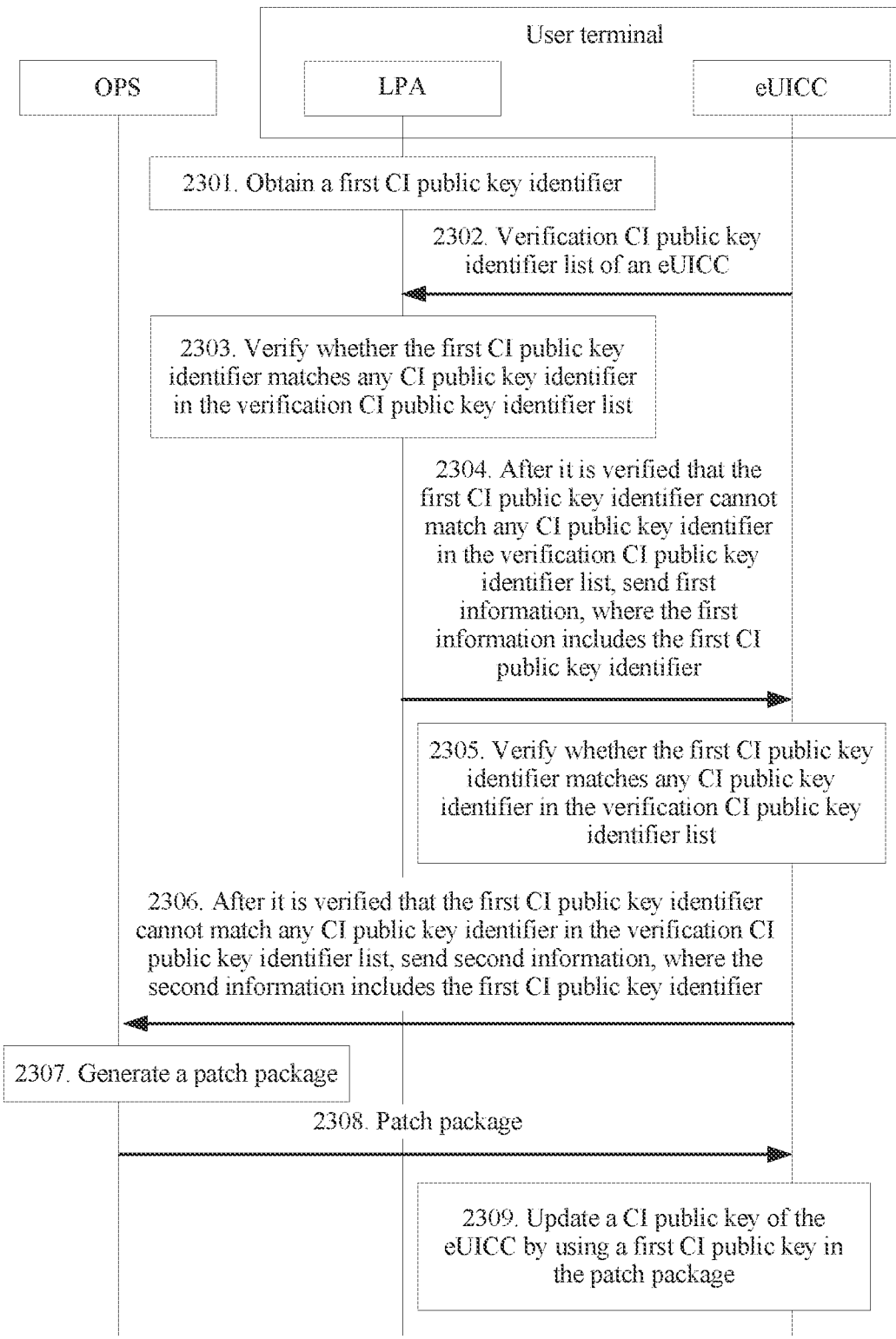

Optionally, as shown in FIG. 23, before the eUICC receives the first information sent by the LPA, the eUICC sends a verification CI public key identifier list of the eUICC to the LPA. Correspondingly, the LPA receives the verification CI public key identifier list of the eUICC from the eUICC; after obtaining the first CI public key identifier, the LPA verifies whether the first CI public key identifier matches any CI public key identifier in the verification CI public key identifier list; and after verifying that the first CI public key identifier cannot match any CI public key identifier in the verification CI public key identifier list, the LPA performs the step that the LPA sends first information to an eUICC. After the eUICC receives the first information sent by the LPA, and before the eUICC sends the second information to the OPS, the eUICC further verifies whether the first CI public key identifier matches any CI public key identifier in the verification CI public key identifier list; and after verifying that the first CI public key identifier cannot match any CI public key identifier in the signature verification CI public key identifier list, the eUICC performs the step that the eUICC sends second information to an OPS.

Optionally, before obtaining the first CI public key identifier, the LPA may receive the verification CI public key identifier list of the eUICC from the eUICC, or after obtaining the first CI public key identifier, the LPA may receive the verification CI public key identifier list of the eUICC from the eUICC. In FIG. 23, an example in which after obtaining the first CI public key identifier, the LPA receives the verification CI public key identifier list of the eUICC from the eUICC is used.

In other words, the LPA first detects whether the eUICC does not have the first CI public key identifier, and after the eUICC receives the first information, the eUICC detects whether the eUICC does not have the first CI public key identifier. Two pieces of detection are performed totally, so that accuracy of a detection result can be improved.

Optionally, the eUICC may perform any one or more steps performed by the eUICC in 707 to 719 shown in FIG. 7A, FIG. 7B, and FIG. 7C. Optionally, the OPS may perform any one or more steps performed by the OPS in 707 to 719 shown in FIG. 7A, FIG. 7B, and FIG. 7C.

Figure 24:
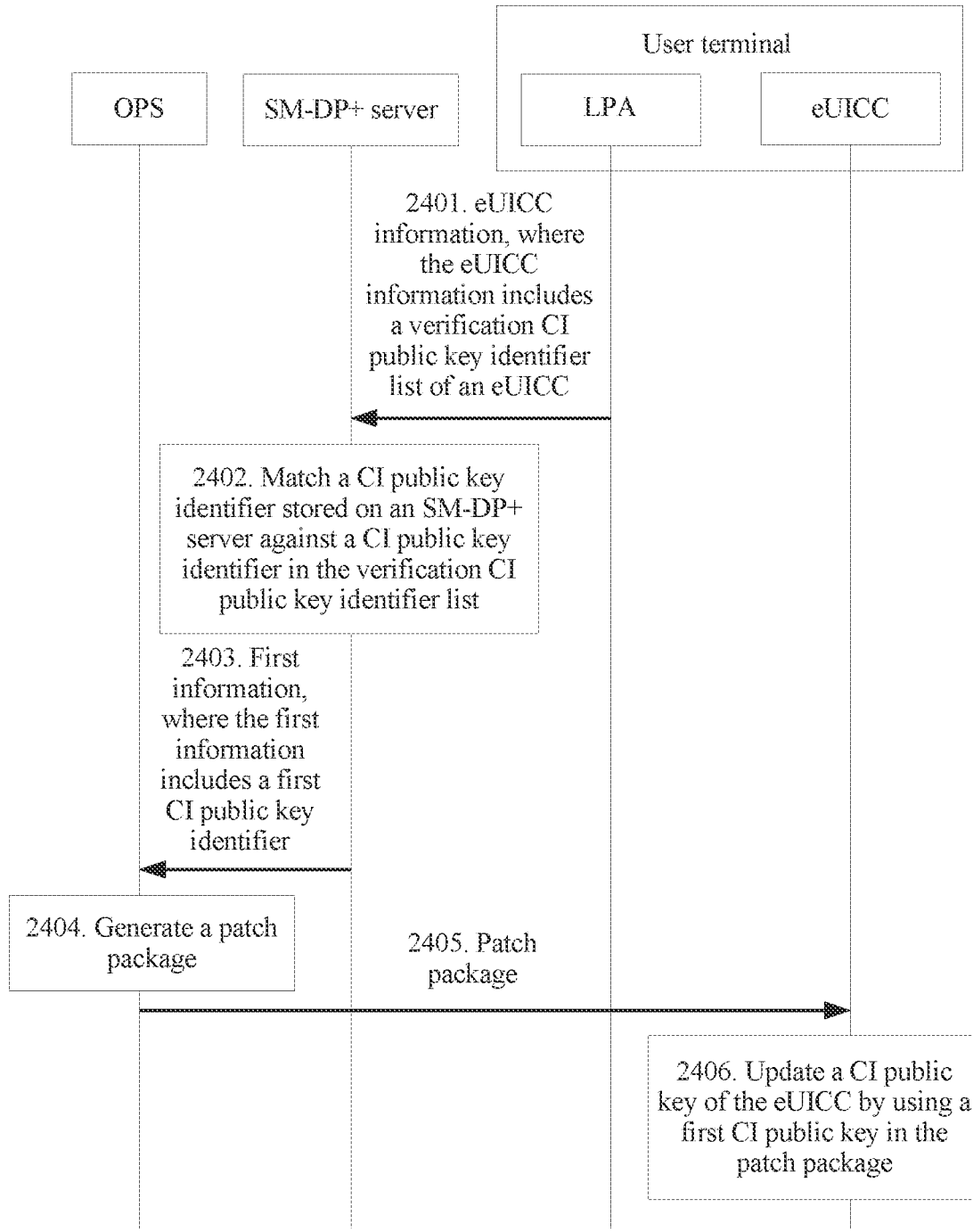

FIG. 24 is a schematic flowchart of a method for updating a certificate issuer public key according to an embodiment of the present invention. As shown in FIG. 24, the method for updating a certificate issuer public key may include parts 2401 to 2406.

2401. An LPA sends eUICC information to an SM-DP+ server.

The eUICC information includes a verification CI public key identifier list of an eUICC.

Optionally, the eUICC-related information may further include a signature CI public key identifier list. For the verification CI public key identifier list and the signature CI public key identifier list, refer to the description in the foregoing embodiments. Details are not described herein again.

Optionally, the eUICC information may further include an OPS address, so that the SM DP+ server establishes a connection to an OPS. Optionally, the OPS address may be replaced with identification information of the OPS.

2402. The SM-DP+ server matches a CI public key identifier stored on the SM-DP+ server against a CI public key identifier in the verification CI public key identifier list.

In this embodiment of this application, after receiving the eUICC information sent by the LPA, the SM-DP+ server matches the CI public key identifier stored on the SM-DP+ server against the CI public key identifier in the verification CI public key identifier list.

2403. If a first CI public key identifier exists on the SM-DP+ server, and the first CI public key identifier does not match any CI public key identifier in the verification CI public key identifier list, the SM-DP+ server sends first information to an OPS server.

In this embodiment of the present invention, the first information includes the first CI public key identifier. The first CI public key identifier does not exist in the verification CI public key identifier list of the eUICC, in other words, a CI public key corresponding to the first CI public key identifier does not exist in the eUICC.

Optionally, the first information includes a first certificate, and the first CI public key identifier is included in the first certificate. Optionally, the first certificate may be a digital certificate of the SM-DP+ server. For example, the first certificate may be CERT.DPauth.ECDSA.

Optionally, the SM DP+ server may send a session termination message to the LPA, to discard a session state that is used to download a profile and that is maintained with the eUICC. The session state that is used to download a profile and that is maintained with the eUICC is discarded, so that a session resource can be released, to enable a new session state used to download a patch package. 2404. The OPS generates a patch package.

In this embodiment of the present invention, after the OPS receives the first information sent by the SM DP+, the OPS generates the patch package. The patch package includes at least the first CI public key corresponding to the first CI public key identifier.

Optionally, before the OPS generates the patch package, bidirectional verification between the OPS and the eUICC may be further completed. For example, a key set keysets updated by using a key is used to ensure that the patch package is securely transmitted to the eUICC.

For another example, the first information may further include the eUICC information, and before generating the patch package, the OPS may further perform the following parts: the OPS generates a digital signature of the OPS by using the first CI public key identifier; the OPS obtains a second CI public key identifier from the signature CI public key identifier list, where the second CI public key identifier is any identifier in the signature CI public key identifier list; the OPS sends second information to the eUICC by using the LPA, where the second information includes the second CI public key identifier, a digital certificate of the OPS, and the digital signature of the OPS; the OPS receives third information sent by the LPA, where the third information includes a digital signature of the eUICC, a digital certificate of the eUICC, and a digital certificate of an eUICC manufacturer EUM; the OPS performs verification on the digital certificate of the EUM by using a second CI public key corresponding to the second CI public key identifier; if the verification performed on the digital certificate of the EUM succeeds, the OPS performs verification on the digital certificate of the eUICC and the digital signature of the eUICC; and if the verification performed on both the digital certificate of the eUICC and the digital signature of the eUICC succeeds, the OPS performs the step that the OPS generates a patch package.

Correspondingly, before receiving the patch package sent by the OPS, the eUICC may further perform the following parts: the eUICC receives the second information sent by the LPA, where the second information includes the second CI public key identifier, the digital certificate of the OPS, and the digital signature of the OPS, and the second CI public key identifier is an identifier in the signature CI public key identifier list of the eUICC information; the eUICC performs verification on the digital certificate of the OPS and the digital signature of the OPS; after the verification performed on the digital certificate of the OPS and the digital signature of the OPS succeeds, the eUICC generates the digital signature of the eUICC based on the second CI public key identifier; and the eUICC sends the third information to the LPA, where the third information includes the digital signature of the eUICC, the digital certificate of the eUICC, and the digital certificate of the eUICC manufacturer EUM.

Optionally, a specific implementation of performing verification on the digital certificate of the eUICC and the digital signature of the eUICC may be as follows: the OPS performs verification on the digital certificate of the eUICC by using a public key in the digital certificate of the EUM; if the verification succeeds, the OPS determines that the verification performed on the digital certificate of the eUICC succeeds; and after determining that the verification performed on the digital certificate of the eUICC succeeds, the OPS performs verification on the digital signature of the eUICC by using a public key in the digital certificate of the eUICC. If the verification performed on the digital signature of the eUICC succeeds, the OPS generates an OS patch package.

2405. The OPS sends the patch package to an eUICC.

Optionally, the first information further includes an eUICC address, so that the OPS server sends the patch package to the target eUICC based on the eUICC address.

In this embodiment of the present invention, after generating the patch package, the OPS sends the patch package to the eUICC. Optionally, the OPS server may send the patch package to the eUICC by using the LPA.

2406. The eUICC updates a CI public key of the eUICC by using a first CI public key in the patch package.

In this embodiment of the present invention, after the eUICC receives the patch package sent by the OPS, the eUICC updates the CI public key of the eUICC by using the first CI public key in the patch package.

Specifically, the eUICC updates a CI public key set of the eUICC with the first CI public key in the patch package.

It may be learned that in the method described in FIG. 24, a CI public key that the eUICC does not have can be updated in time, to ensure that bidirectional authentication between the SM-DP+ server and the eUICC is successfully performed. Therefore, after the bidirectional authentication between the SM-DP+ server and the eUICC succeeds, a profile can be successfully downloaded.

Figure 25:
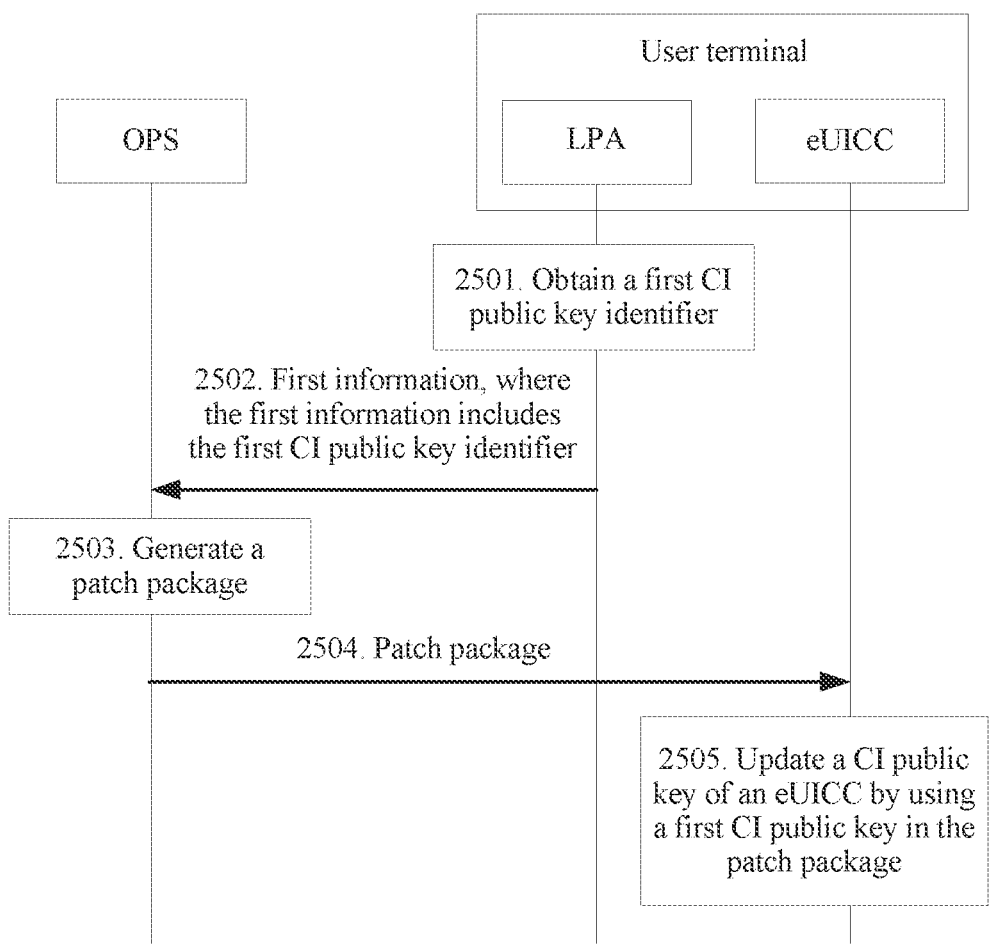

FIG. 25 is a schematic flowchart of a method for updating a certificate issuer public key according to an embodiment of the present invention. As shown in FIG. 25, the method for updating a certificate issuer public key may include a part 2501 to a part 2505.

2501. An LPA obtains a first CI public key identifier.

The first CI public key identifier cannot match any CI public key identifier in a verification CI public key identifier list of an eUICC. In other words, the first CI public key identifier does not exist in the verification CI public key identifier list of the eUICC, in other words, a CI public key corresponding to the first CI public key identifier does not exist in the eUICC.

Optionally, the verification CI public key identifier list of the eUICC stores, in a sequence of priorities, CI public key identifiers used to perform verification on CERT.DPauth-.ECDSA. For example, if an extracted CI public key identifier is a CI public key identifier 1, the verification CI public key identifier list is searched for the extracted CI public key identifier. If the extracted CI public key identifier 1 exists in the verification CI public key identifier list, a CI public key corresponding to the CI public key identifier 1 is used to perform verification on the CERT.DPauth.ECDSA. If the extracted CI public key identifier 1 does not exist in the verification CI public key identifier list, the eUICC does not have a CI public key corresponding to the CI public key identifier 1.

Optionally, the eUICC further includes a signature CI public key identifier list. The signature CI public key identifier list stores, in a sequence of priorities, CI public key identifiers used for signature calculation. For example, if the CI public key identifier obtained from the LPA is a public key identifier 1, after the eUICC creates, the eUICC searches the signature CI public key identifier list for the public key identifier 1. If the public key identifier 1 exists in the signature CI public key identifier list, SK.EUICC.ECDSA (an eUICC private key) corresponding to the public key identifier 1 is used to sign eUICCSigned1, to obtain a signature of the eUICC.

Optionally, the first CI public key identifier is obtained by the LPA by parsing an activation code Activation Code or a command code Command Code.

For example, a user may hold a user terminal, and scan an activation code by using the LPA of the user terminal. After scanning the activation code, the LPA parses the activation code, to obtain the first CI public key identifier from the activation code through parsing.

For another example, the LPA may receive a command code sent by a server, and parse the command code, to obtain the first CI public key identifier from the command code through parsing. Optionally, the server may be an SM DP+ server.

Optionally, the first CI public key identifier is information received by the LPA from a server. In other words, the LPA obtains the first CI public key identifier by receiving the first CI public key identifier sent by the server. The server may be an operator server or an SM DP+ server.

2502. The LPA sends first information to an OPS.

In this embodiment of this application, after obtaining the first CI public key identifier, the LPA sends the first information to the OPS. The first information includes the first CI public key identifier.

2503. The OPS generates a patch package.

In this embodiment of the present invention, after the OPS receives the first information sent by the LPA, the OPS generates the patch package. The patch package includes at least the first CI public key corresponding to the first CI public key identifier.

Optionally, before the OPS generates the patch package, bidirectional verification between the OPS and the eUICC may be further completed. For example, a key set keysets updated by using a key is used to ensure that the patch package is securely transmitted to the eUICC.

2504. The OPS sends the patch package to an eUICC.

Optionally, after generating the patch package, the OPS sends the patch package to the eUICC by using the LPA.

Optionally, the first information further includes an eUICC address, so that the OPS sends the patch package to the eUICC based on the eUICC address.

2505. The eUICC updates a CI public key of the eUICC by using a first CI public key in the patch package.

In this embodiment of the present invention, after the eUICC receives the patch package sent by the OPS, the eUICC updates the CI public key of the eUICC by using the first CI public key in the patch package.

Specifically, the eUICC updates a CI public key set of the eUICC with the first CI public key in the patch package.

It may be learned that in the method described in FIG. 25, a CI public key identifier that the eUICC does not have can be updated in time, to ensure that the eUICC updates the first public key after the LPA obtains a CI public key identifier that is of an SM DP+ server and that is required for bidirectional authentication between the SM-DP+ server and the eUICC, so that subsequent bidirectional authentication is successfully performed. Therefore, after the bidirectional authentication between the SM-DP+ server and the eUICC succeeds, a profile can be successfully downloaded.

Figure 26:
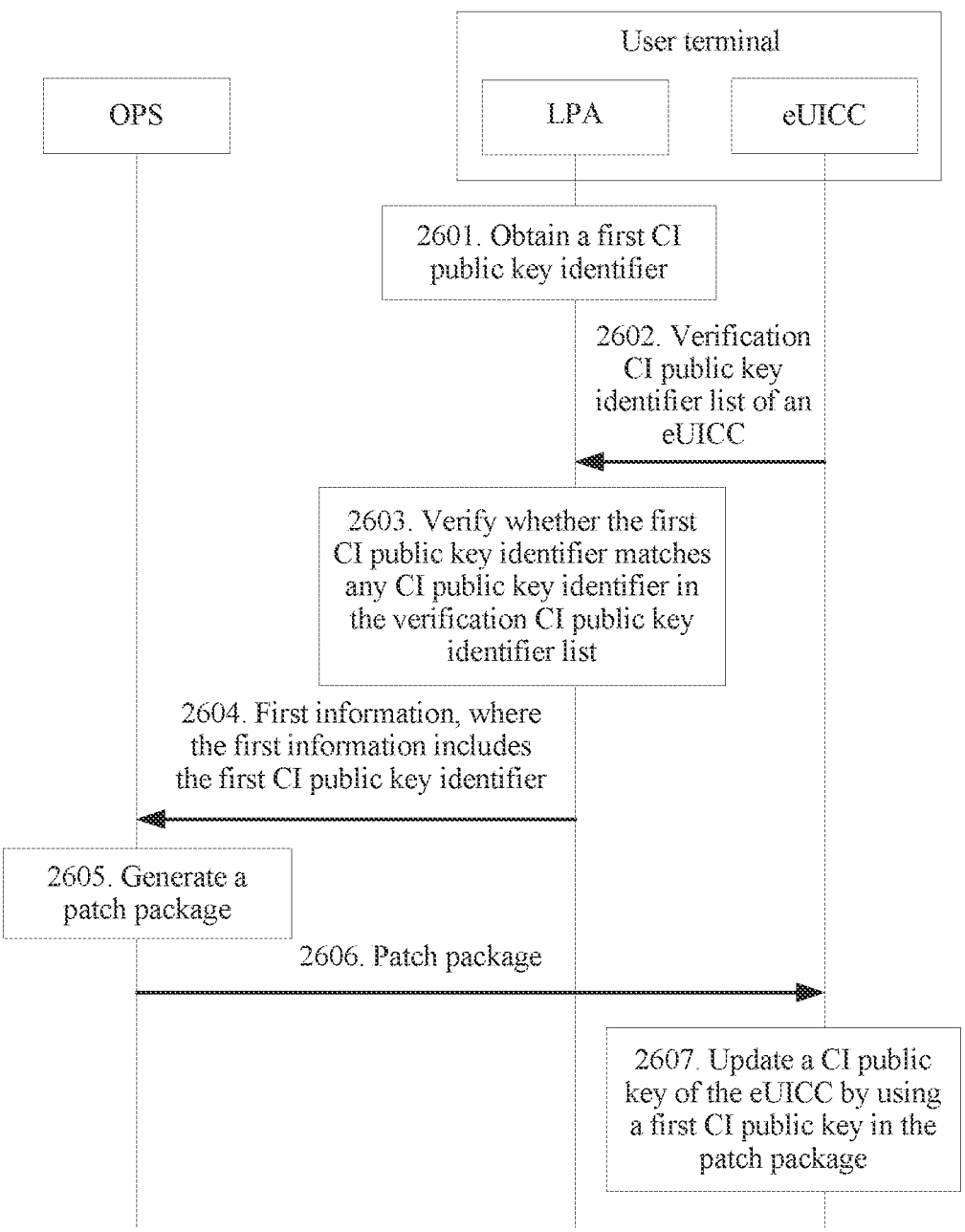

Optionally, as shown in FIG. 26, the LPA may further receive the verification CI public key identifier list of the eUICC from the eUICC; after obtaining the first CI public key identifier, the LPA verifies whether the first CI public key identifier matches any CI public key identifier in the verification CI public key identifier list; and after verifying that the first CI public key identifier cannot match any CI public key identifier in the verification CI public key identifier list, the LPA performs the step that the LPA sends first information to an operating system patch server OPS.

Optionally, before obtaining the first CI public key identifier, the LPA may receive the verification CI public key identifier list of the eUICC from the eUICC, or after obtaining the first CI public key identifier, the LPA may receive the verification CI public key identifier list of the eUICC from the eUICC. In FIG. 26, an example in which after obtaining the first CI public key identifier, the LPA receives the verification CI public key identifier list of the eUICC from the eUICC is used.

Optionally, a specific implementation in which the eUICC sends the verification CI public key identifier list of the eUICC to the LPA is as follows: the eUICC sends eUICC-related information to the LPA, namely, eUICC information. The eUICC-related information includes the verification CI public key identifier list of the eUICC. Optionally, the eUICC-related information may further include the signature CI public key identifier list.

In the embodiments of the present invention, the SM-DP+ server, the OPS, and the eUICC may be divided into functional units based on the foregoing method examples. For example, each functional unit may be obtained through division based on a corresponding function, or two or more functions may be integrated into one unit. The integrated unit may be implemented in a form of hardware, or may be implemented in a form of a software functional unit. It should be noted that the unit division in the embodiments of the present invention is an example, and is only logical function division. There may be another division manner in actual implementation.

Figure 27:
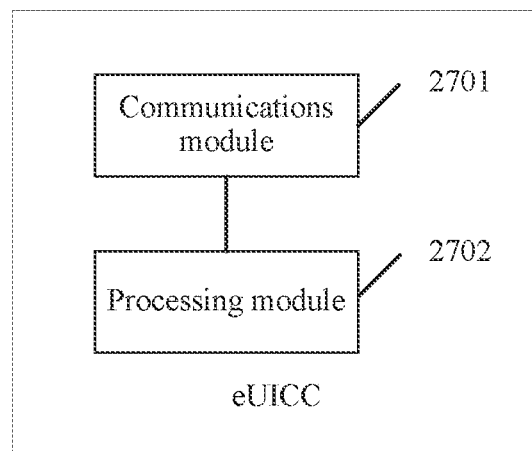
FIG. 27 is a schematic structural diagram of an eUICC according to an embodiment of the present invention.

FIG. 27 is a schematic structural diagram of an eUICC according to an embodiment of the present invention. As shown in FIG. 27, the eUICC includes a communications module 2701 and a processing module 2702.

The communications module 2701 is configured to receive first information sent by a local profile assistant LPA. The first information includes a first CI public key identifier, and the first CI public key identifier cannot match any CI public key identifier in a verification CI public key identifier list of the eUICC.

The communications module 2701 is further configured to send second information to an OPS by using the LPA, and the second information includes the first CI public key identifier.

The communications module 2701 is further configured to receive a patch package sent by the OPS by using the LPA, and the patch package includes at least a first CI public key corresponding to the first CI public key identifier.

The processing module 2702 is configured to update a CI public key of the eUICC by using the first CI public key.

In an optional implementation, the first information includes a first certificate, and the first CI public key identifier is included in the first certificate.

In an optional implementation, the processing module 2702 is further configured to: after the communications module 2701 receives the first information sent by the local profile assistant LPA, verify whether the first CI public key identifier matches any CI public key identifier in the verification CI public key identifier list. If the eUICC verifies that the first CI public key identifier cannot match any CI public key identifier in the signature verification CI public key identifier list, the communications module 2701 sends the second information to the OPS by using the LPA.

In an optional implementation, the processing module 2702 is further configured to: after the communications module 2701 receives the first information sent by the local profile assistant LPA, discard a session state that is used to download a profile and that is maintained with an SM-DP+ server.

In an optional implementation, the second information further includes eUICC information, and the eUICC information includes a signature CI public key identifier list. The communications module 2701 is further configured to: after the communications module 2701 sends the second information to the OPS by using the LPA, and before the communications module 2701 receives the patch package that is sent by the OPS by using the LPA, receive third information sent by the LPA. The third information includes a second CI public key identifier, a digital certificate of the OPS, and a digital signature of the OPS, and the second CI public key identifier is an identifier in the signature CI public key identifier list of the eUICC information. The processing module 2702 is further configured to: after verification performed on the digital certificate of the OPS and the digital signature of the OPS succeeds, generate a digital signature of the eUICC based on the second CI public key identifier. The communications module 2701 is further configured to send fourth information to the LPA, and the fourth information includes the digital signature of the eUICC, a digital certificate of the eUICC, and a digital certificate of an eUICC manufacturer EUM.

In an optional implementation, an initial secure channel message in the patch package includes a remote operation type identifier whose value indicates a binding patch package installation type, and the binding patch package installation type is used by the LPA to download the patch package for the eUICC and is used by the eUICC to install the patch package.

In an optional implementation, the patch package further includes the first CI public key identifier; and the processing module 2702 is further configured to update the eUICC with the first CI public key identifier in the patch package.

In an optional implementation, the first CI public key identifier is included in a storage metadata message of the patch package.

In an optional implementation, the second information further includes an identifier of an encryption algorithm supported by the eUICC, the patch package further includes a first encryption algorithm identifier corresponding to the first CI public key and a first encryption algorithm corresponding to the first encryption algorithm identifier, and the first encryption algorithm identifier does not match an identifier of any encryption algorithm supported by the eUICC. The processing module 2702 is further configured to: update the eUICC with the first CI public key identifier, and update an encryption algorithm library of the eUICC with the encryption algorithm identifier and the first encryption algorithm.

In an optional implementation, the first encryption algorithm identifier is included in the storage metadata message of the patch package.

In an optional implementation, the second information further includes an identifier of an encryption algorithm supported by the eUICC. The communications module 2701 is further configured to receive an encryption algorithm patch package sent by the OPS by using the LPA. The encryption algorithm patch package includes a first encryption algorithm identifier corresponding to the first CI public key and a first encryption algorithm corresponding to the first encryption algorithm identifier, and the first encryption algorithm identifier does not match an identifier of any encryption algorithm supported by the eUICC. A manner in which the communications module 2701 receives the patch package sent by the OPS by using the LPA is specifically as follows: the communications module 2701 receives an input key command sent by the OPS by using the LPA. The input key command includes the first CI public key identifier and the first CI public key. The processing module 2702 is further configured to update an encryption algorithm library of the eUICC with the first encryption algorithm identifier and the first encryption algorithm. The processing module 2702 is further configured to update the eUICC with the first CI public key identifier.

In an optional implementation, the second information further includes an identifier of an encryption algorithm supported by the eUICC. The communications module 2701 is further configured to receive an encryption algorithm patch package sent by the OPS by using the LPA. The encryption algorithm patch package includes a first encryption algorithm identifier corresponding to the first CI public key and a first encryption algorithm corresponding to the first encryption algorithm identifier, and the first encryption algorithm identifier does not match an identifier of any encryption algorithm supported by the eUICC. A manner in which the communications module 2701 receives the patch package sent by the OPS by using the LPA is specifically as follows: the communications module 2701 receives a CI public key patch package sent by the OPS by using the LPA, and the CI public key patch package includes the first CI public key identifier and the first CI public key. The processing module 2702 is further configured to update an encryption algorithm library of the eUICC with the first encryption algorithm identifier and the first encryption algorithm. The processing module 2702 is further configured to update the eUICC with the first CI public key identifier.

Figure 28:
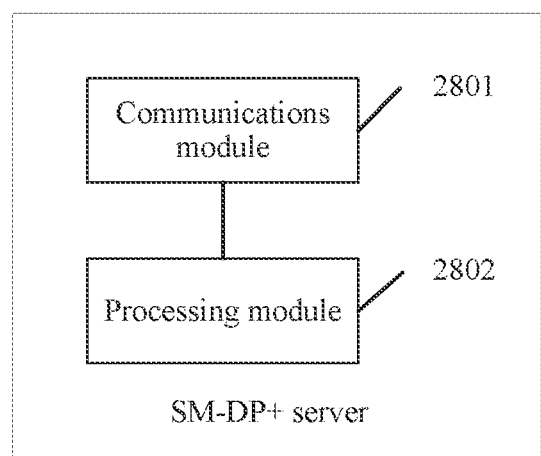
FIG. 28 is a schematic structural diagram of an SM-DP+ server according to an embodiment of the present invention.

FIG. 28 is a schematic structural diagram of an SM-DP+ server according to an embodiment of the present invention. As shown in FIG. 28, the SM-DP+ server includes a communications module 2801 and a processing module 2802.

The communications module 2801 is configured to receive embedded universal integrated circuit card eUICC information sent by a local profile assistant LPA, and the eUICC information includes a verification certificate issuer CI public key identifier list.

The communications module 2801 is further configured to: if a first CI public key identifier exists on the SM-DP+ server, send first information to an eUICC by using the LPA. The first information includes the first CI public key identifier, and the first CI public key identifier does not match any CI public key identifier in the verification CI public key identifier list.

The processing module 2802 is configured to: after the communications module 2801 sends the first information to the eUICC by using the LPA, discard a session state that is used to download a profile and that is maintained with the eUICC.

Figure 29:
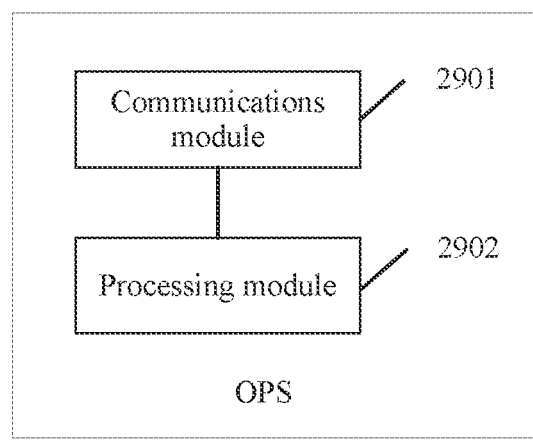
FIG. 29 is a schematic structural diagram of an OPS according to an embodiment of the present invention.

FIG. 29 is a schematic structural diagram of an OPS according to an embodiment of the present invention. As shown in FIG. 29, the OPS includes a communications module 2901 and a processing module 2902.

The communications module 2901 is configured to receive second information sent by a local profile assistant LPA, and the second information includes a first certificate issuer CI public key identifier.

The processing module 2902 is configured to generate a patch package, and the patch package includes a first CI public key corresponding to the first CI public key identifier.

The communications module 2901 is further configured to send the patch package to an embedded universal integrated circuit card eUICC by using the LPA.

In an optional implementation, the second information further includes eUICC information, and the eUICC information includes a signature CI public key identifier list. The processing module 2902 is further configured to generate a digital signature of the OPS by using the first CI public key identifier. The processing module 2902 is further configured to obtain a second CI public key identifier from the signature CI public key identifier list, and the second CI public key identifier is any identifier in the signature CI public key identifier list. The communications module 2901 is further configured to send third information to the eUICC by using the LPA, and the third information includes the second CI public key identifier, a digital certificate of the OPS, and the digital signature of the OPS. The communications module 2901 is further configured to receive fourth information sent by the LPA, and the fourth information includes a digital signature of the eUICC, a digital certificate of the eUICC, and a digital certificate of an eUICC manufacturer EUM.

The processing module 2902 is further configured to perform verification on the digital certificate of the EUM by using a second CI public key corresponding to the second CI public key identifier. The processing module 2902 is further configured to: if the verification performed by the OPS on the digital certificate of the EUM succeeds, perform verification on the digital certificate of the eUICC and the digital signature of the eUICC. If the verification performed by the OPS on both the digital certificate of the eUICC and the digital signature of the eUICC succeeds, the processing module 2902 generates the patch package.

In an optional implementation, an initial secure channel message in the patch package includes a remote operation type identifier whose value indicates a binding patch package installation type, and the binding patch package installation type is used by the LPA to download the patch package for the eUICC and is used by the eUICC to install the patch package.

In an optional implementation, the patch package further includes the first CI public key identifier.

In an optional implementation, the first CI public key identifier is included in a storage metadata message of the patch package.

In an optional implementation, the second information further includes an identifier of an encryption algorithm supported by the eUICC, and the patch package further includes a first encryption algorithm identifier corresponding to the first CI public key and a first encryption algorithm corresponding to the first encryption algorithm identifier. The processing module 2902 is further configured to determine that the first encryption algorithm identifier does not match an identifier of any encryption algorithm supported by the eUICC.

In an optional implementation, the first encryption algorithm identifier is included in the storage metadata message of the patch package.

In an optional implementation, the second information further includes an identifier of an encryption algorithm supported by the eUICC. The processing module 2902 is further configured to determine that a first encryption algorithm identifier does not match an identifier of any encryption algorithm supported by the eUICC. A manner in which the processing module 2902 generates the patch package is specifically as follows: the OPS generates an encryption algorithm patch package, and the encryption algorithm patch package includes the first encryption algorithm identifier and a first encryption algorithm corresponding to the first encryption algorithm identifier; and the OPS generates an input key command, where the input key command includes the first CI public key identifier and the first CI public key.

In an optional implementation, the second information further includes an identifier of an encryption algorithm supported by the eUICC. The processing module 2902 is further configured to determine that a first encryption algorithm identifier does not match an identifier of any encryption algorithm supported by the eUICC. A manner in which the processing module 2902 generates the patch package is specifically as follows: the OPS generates an encryption algorithm patch package, where the encryption algorithm patch package includes the first encryption algorithm identifier and a first encryption algorithm corresponding to the first encryption algorithm identifier; and the OPS generates a CI public key patch package, where the CI public key patch package includes the first CI public key identifier and the first CI public key.

FIG. 27 is a schematic structural diagram of an eUICC according to an embodiment of the present invention. As shown in FIG. 27, the eUICC includes a communications module 2701 and a processing module 2702.

The communications module 2701 is configured to receive first information sent by a local profile assistant LPA. The first information includes a first certificate issuer CI public key identifier, and the first CI public key identifier cannot match any CI public key identifier in a verification CI public key identifier list of the eUICC.

The communications module 2701 is further configured to send second information to an operating system patch server OPS, and the second information includes the first CI public key identifier.

The communications module 2701 is further configured to receive a patch package sent by the OPS, and the patch package includes at least a first CI public key corresponding to the first CI public key identifier.

The processing module 2702 is configured to update, by the eUICC, a CI public key of the eUICC by using the first CI public key.

Optionally, the communications module 2701 and the processing module 2702 may further perform other functions performed by the eUICC in the foregoing method embodiments. Details are not described herein again.

Figure 30:
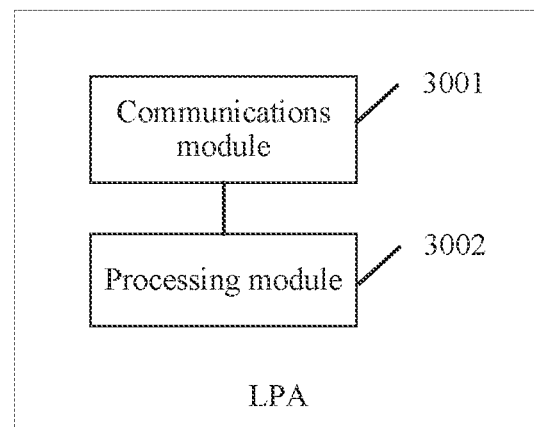
FIG. 30 is a schematic structural diagram of an LPA according to an embodiment of the present invention.

FIG. 30 is a schematic structural diagram of an LPA according to an embodiment of the present invention. As shown in FIG. 30, the LPA includes a communications module 3001 and a processing module 3002.

The processing module 3002 is configured to obtain a first certificate issuer CI public key identifier, and the first CI public key identifier cannot match any CI public key identifier in a verification CI public key identifier list of an embedded universal integrated circuit card eUICC. The communications module 3001 is configured to send first information to the eUICC, and the first information includes the first CI public key identifier.

Optionally, the first CI public key identifier is obtained by the LPA by parsing an activation code or a command code, or the first CI public key identifier is information received by the LPA from a server.

Optionally, the communications module 3001 is further configured to receive the verification CI public key identifier list of the eUICC from the eUICC. The processing module 3002 is further configured to: verify, after obtaining the first CI public key identifier, whether the first CI public key identifier matches any CI public key identifier in the verification CI public key identifier list. After verifying that the first CI public key identifier cannot match any CI public key identifier in the verification CI public key identifier list, the processing module 3002 triggers the communications module 3001 to send the first information to the embedded universal integrated circuit card eUICC.

FIG. 29 is a schematic structural diagram of an OPS according to an embodiment of the present invention. As shown in FIG. 29, the OPS includes a communications module 2901 and a processing module 2902.

The communications module 2901 is configured to receive second information sent by an embedded universal integrated circuit card eUICC. The second information includes a first certificate issuer CI public key identifier, and the first CI public key identifier cannot match any CI public key identifier in a verification CI public key identifier list of the eUICC. The processing module 2902 is configured to generate a patch package, and the patch package includes at least a first CI public key corresponding to the first CI public key identifier. The communications module 2901 is further configured to send the patch package to the eUICC, and the patch package is used by the eUICC to update a CI public key of the eUICC by using the first CI public key in the patch package.

FIG. 28 is a schematic structural diagram of an SM-DP+ server according to an embodiment of the present invention. As shown in FIG. 28, the SM-DP+ server includes a communications module 2801 and a processing module 2802.

The communications module 2801 is configured to receive embedded universal integrated circuit card eUICC information sent by a local profile assistant LPA, and the eUICC information includes a verification certificate issuer CI public key identifier list of an eUICC. The processing module 2802 is configured to match a CI public key identifier stored on the SM-DP+ server against a CI public key identifier in the verification CI public key identifier list. The communications module 2801 is further configured to: when the processing module 2802 determines that a first CI public key identifier exists on the SM-DP+ server, and the first CI public key identifier does not match any CI public key identifier in the verification CI public key identifier list, send first information to an operating system patch server OPS, where the first information includes the first CI public key identifier.

Optionally, the communications module 2801 is further configured to: after receiving the embedded universal integrated circuit card eUICC information sent by the local profile assistant LPA, send a session termination message to the LPA, to discard a session state that is used to download a profile and that is maintained with the eUICC.

FIG. 29 is a schematic structural diagram of an OPS according to an embodiment of the present invention. As shown in FIG. 29, the OPS includes a communications module 2901 and a processing module 2902.

The communications module 2901 is configured to receive first information sent by a subscription manager-data preparation SM-DP+ server. The first information includes a first certificate issuer CI public key identifier, and the first CI public key identifier does not match any CI public key identifier in a verification CI public key identifier list of a universal integrated circuit card eUICC. The processing module 2902 is configured to generate a patch package, and the patch package includes at least a first CI public key corresponding to the first CI public key identifier.

The communications module 2901 is further configured to send the patch package to the eUICC, and the patch package is used by the eUICC to update a CI public key of the eUICC by using the first CI public key in the patch package.

FIG. 30 is a schematic structural diagram of an LPA according to an embodiment of the present invention. As shown in FIG. 30, the LPA includes a communications module 3001 and a processing module 3002.

The processing module 3002 is configured to obtain a first certificate issuer CI public key identifier, and the first CI public key identifier cannot match any CI public key identifier in a verification CI public key identifier list of an embedded universal integrated circuit card eUICC. The communications module 3001 is further configured to send first information to an operating system patch server OPS, and the first information includes the first CI public key identifier. Optionally, the first CI public key identifier is obtained by the LPA by parsing an activation code or a command code, or the first CI public key identifier is information received by the LPA from the server.

Optionally, the communications module 3001 is further configured to receive the verification CI public key identifier list of the eUICC from the eUICC.

The processing module 3002 is further configured to: verify, after obtaining the first CI public key identifier, whether the first CI public key identifier matches any CI public key identifier in the verification CI public key identifier list. After verifying that the first CI public key identifier cannot match any CI public key identifier in the verification CI public key identifier list, the processing module 3002 triggers the communications module 3001 to send the first information to the operating system patch server OPS.

FIG. 29 is a schematic structural diagram of an OPS according to an embodiment of the present invention. As shown in FIG. 29, the OPS includes a communications module 2901 and a processing module 2902.

The communications module 2901 is configured to receive first information sent by a local profile assistant LPA. The first information includes a first certificate issuer CI public key identifier, and the first CI public key identifier does not match any CI public key identifier in a verification CI public key identifier list of a universal integrated circuit card eUICC. The processing module 2902 is configured to generate a patch package, and the patch package includes at least a first CI public key corresponding to the first CI public key identifier. The communications module 2901 is further configured to send the patch package to the eUICC, and the patch package is used by the eUICC to update a CI public key of the eUICC by using the first CI public key in the patch package.

Figure 31:
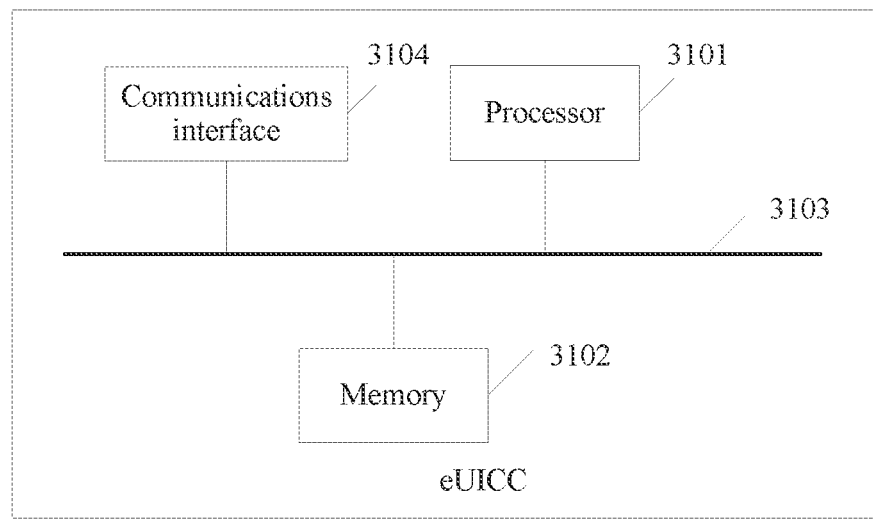
FIG. 31 is a schematic structural diagram of another eUICC according to an embodiment of the present invention.

FIG. 31 is another possible schematic structural diagram of an eUICC according to an embodiment of the present invention. As shown in FIG. 31, the eUICC 3100 includes a processor 3101, a memory 3102, and a communications interface 3104. The processor 3101 is connected to the memory 3102, and the communications interface 3104 is connected to the processor 3101. Optionally, the eUICC 3100 may further include a bus system 3103. The processor 3101, the memory 3102, and the communications interface 3104 are connected by using the bus system 3103.

The processor 3101 may be a central processing unit (Central Processing Unit, CPU), a general purpose processor, a coprocessor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a transistor logic device, a hardware component, or any combination thereof. Alternatively, the processor 3101 may be a combination of processors implementing a computing function, for example, a combination of one or more microprocessors or a combination of the DSP and a microprocessor.

The bus system 3103 may be a peripheral component interconnect (Peripheral Component Interconnect, PCI for short) bus or an extended industry standard architecture (Extended Industry Standard Architecture, EISA for short) bus or the like. The bus system 3103 may be classified into an address bus, a data bus, a control bus, and the like. For ease of indication, the bus is indicated by using only one bold line in FIG. 31. However, it does not indicate that there is only one bus or only one type of bus.

The communications interface 3104 is configured to implement communication with another network element (for example, an LPA).

The processor 3101 invokes program code stored in the memory 3102, to perform any one or more steps performed by the eUICC in the foregoing method embodiments. For example, the processor 3101 invokes the program code stored in the memory 3102, to perform the steps performed by the eUICC in FIG. 6 to FIG. 8A, FIG. 8B, and FIG. 8C, and FIG. 10A and FIG. 10B to FIG. 26.

Based on a same inventive concept, a problem-resolving principle of the eUICC provided in this embodiment of the present invention is similar to that of the method embodiments of the present invention. Therefore, for implementation of the eUICC, refer to the implementation of the methods. For brevity of description, details are not described herein again.

Figure 32:
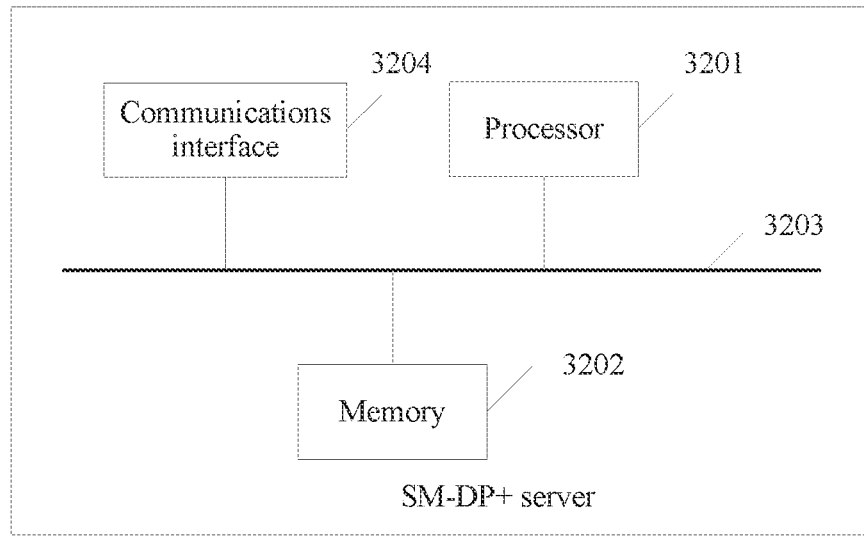
FIG. 32 is a schematic structural diagram of another SM-DP+ server according to an embodiment of the present invention.

FIG. 32 is another possible schematic structural diagram of an SM-DP+ server according to an embodiment of the present invention. As shown in FIG. 32, the SM-DP+ server 3200 includes a processor 3201, a memory 3202, and a communications interface 3204. The processor 3201 is connected to the memory 3202, and the communications interface 3204 is connected to the processor 3201. Optionally, the SM-DP+ server 3200 may further include a bus system 3203. The processor 3201, the memory 3202, and the communications interface 3204 are connected by using the bus system 3203.

The processor 3201 may be a central processing unit (Central Processing Unit, CPU), a general purpose processor, a coprocessor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a transistor logic device, a hardware component, or any combination thereof. Alternatively, the processor 3201 may be a combination of processors implementing a computing function, for example, a combination of one or more microprocessors or a combination of the DSP and a microprocessor.

The bus system 3203 may be a peripheral component interconnect (Peripheral Component Interconnect, PCI for short) bus or an extended industry standard architecture (Extended Industry Standard Architecture, EISA for short) bus or the like. The bus system 3203 may be classified into an address bus, a data bus, a control bus, and the like. For ease of indication, the bus is indicated by using only one bold line in FIG. 32. However, it does not indicate that there is only one bus or only one type of bus.

The communications interface 3204 is configured to implement communication with another network element (for example, an LPA).

The processor 3201 invokes program code stored in the memory 3202, to perform any one or more steps performed by the SM-DP+ server in the foregoing method embodiments. For example, the processor 3201 invokes the program code stored in the memory 3202, to perform the steps performed by the SM-DP+ server in FIG. 6 to FIG. 8A, FIG. 8B, and FIG. 8C, and FIG. 10A and FIG. 10B to FIG. 26.

Based on a same inventive concept, a problem-resolving principle of the SM-DP+ server provided in this embodiment of the present invention is similar to that of the method embodiments of the present invention. Therefore, for implementation of the SM-DP+ server, refer to the implementation of the methods. For brevity of description, details are not described herein again.

Figure 33:
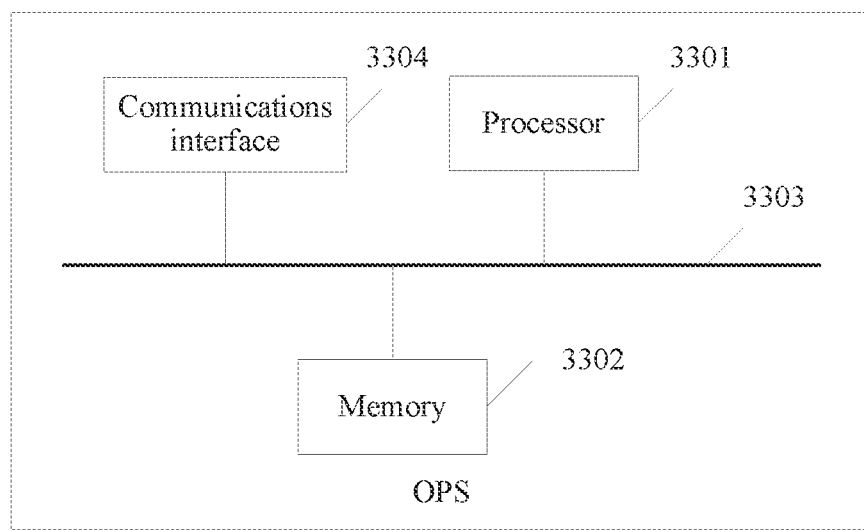
FIG. 33 is a schematic structural diagram of another OPS according to an embodiment of the present invention.

FIG. 33 is another possible schematic structural diagram of an OPS according to an embodiment of the present invention. As shown in FIG. 33, the OPS 3300 includes a processor 3301, a memory 3302, and a communications interface 3304. The processor 3301 is connected to the memory 3302, and the communications interface 3304 is connected to the processor 3301. Optionally, the OPS 3300 may further include a bus system 3303. The processor 3301, the memory 3302, and the communications interface 3304 are connected by using the bus system 3303.

The processor 3301 may be a central processing unit (Central Processing Unit, CPU), a general purpose processor, a coprocessor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a transistor logic device, a hardware component, or any combination thereof. Alternatively, the processor 3301 may also be a combination of processors implementing a computing function, for example, a combination of one or more microprocessors or a combination of the DSP and a microprocessor.

The bus system 3303 may be a peripheral component interconnect (Peripheral Component Interconnect, PCI for short) bus or an extended industry standard architecture (Extended Industry Standard Architecture, EISA for short) bus or the like. The bus system 3303 may be classified into an address bus, a data bus, a control bus, and the like. For ease of indication, the bus is indicated by using only one bold line in FIG. 33. However, it does not indicate that there is only one bus or only one type of bus.

The communications interface 3304 is configured to implement communication with another network element (for example, an LPA).

The processor 3301 invokes program code stored in the memory 3302, to perform any one or more steps performed by the OPS in the foregoing method embodiments. For example, the processor 3301 invokes the program code stored in the memory 3302, to perform the steps performed by the OPS in FIG. 6 to FIG. 8A, FIG. 8B, and FIG. 8C, and FIG. 10A and FIG. 10B to FIG. 26.

Based on a same inventive concept, a problem-resolving principle of the OPS provided in this embodiment of the present invention is similar to that of the method embodiments of the present invention. Therefore, for implementation of the OPS, refer to the implementation of the methods. For brevity of description, details are not described herein again.

Figure 34:
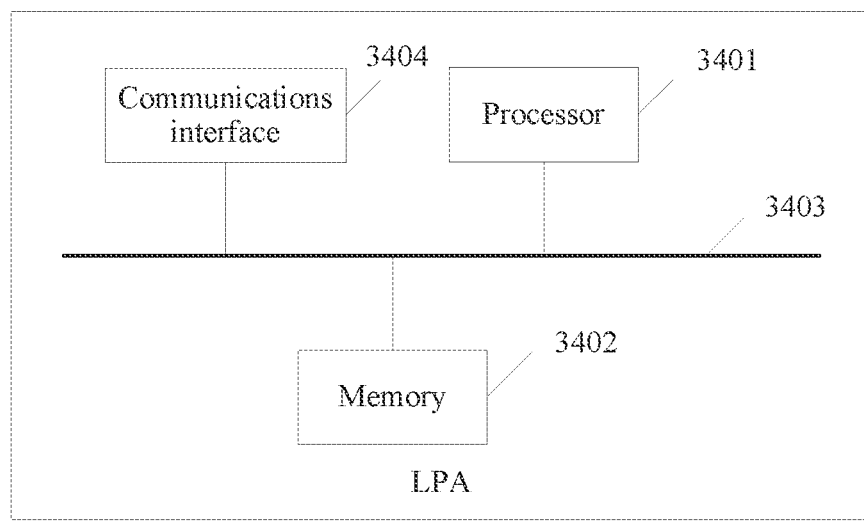
FIG. 34 is a schematic structural diagram of another OPS according to an embodiment of the present invention.

FIG. 34 is another possible schematic structural diagram of an LPA according to an embodiment of the present invention. As shown in FIG. 34, the LPA 3400 includes a processor 3401, a memory 3402, and a communications interface 3404. The processor 3401 is connected to the memory 3402, and the communications interface 3404 is connected to the processor 3401. Optionally, the LPA 3400 may further include a bus system 3403. The processor 3401, the memory 3402, and the communications interface 3404 are connected by using the bus system 3403.

The processor 3401 may be a central processing unit (Central Processing Unit, CPU), a general purpose processor, a coprocessor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a transistor logic device, a hardware component, or any combination thereof. Alternatively, the processor 3401 may also be a combination of processors implementing a computing function, for example, a combination of one or more microprocessors or a combination of the DSP and a microprocessor.

The bus system 3403 may be a peripheral component interconnect (Peripheral Component Interconnect, PCI for short) bus or an extended industry standard architecture (Extended Industry Standard Architecture, EISA for short) bus or the like. The bus system 3403 may be classified into an address bus, a data bus, a control bus, and the like. For ease of indication, the bus is indicated by using only one bold line in FIG. 34. However, it does not indicate that there is only one bus or only one type of bus.

The communications interface 3404 is configured to implement communication with another network element (for example, an LPA).

The processor 3401 invokes program code stored in the memory 3402, to perform any one or more steps performed by the LPA in the foregoing method embodiments. For example, the processor 3401 invokes the program code stored in the memory 3402, to perform the steps performed by the LPA in FIG. 6 to FIG. 8A, FIG. 8B, and FIG. 8C, and FIG. 10A and FIG. 10B to FIG. 26.

Based on a same inventive concept, a problem-resolving principle of the LPA provided in this embodiment of the present invention is similar to that of the method embodiments of the present invention. Therefore, for implementation of the LPA, refer to the implementation of the methods. For brevity of description, details are not described herein again.

It should be further noted that in the foregoing embodiments, the descriptions of the embodiments have respective focuses. For a part that is not described in detail in an embodiment, refer to related descriptions in other embodiments. In addition, persons skilled in the art should also appreciate that all the embodiments described in the specification are embodiments as an example, and the related actions and modules are not necessarily mandatory to the present invention.

It should be further noted that in the foregoing embodiments, relationship terms such as "first", "second", "third", and "fourth" (for example, first information and second information) are only used to distinguish one piece of information from another, and do not necessarily require or imply that a sequence exists between these pieces of information. An element preceded by "includes . . . " or "contains . . . " does not, without more constraints, preclude the presence of additional identical elements in the process, method, article, or device that includes the element.

Steps in the method in the embodiments of the present invention may be adjusted, combined, or deleted according to an actual requirement.

The module in the embodiments of the present invention may be implemented by a universal integrated circuit, such as a CPU (Central Processing Unit, central processing unit) or an ASIC (Application-Specific Integrated Circuit, application-specific integrated circuit).

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of this application.

The invention claimed is:
1. A method comprising:
receiving, by a subscription manager-data preparation (SM-DP+) server from a local profile assistant (LPA), first embedded universal integrated circuit card (eUICC) information comprising a verification certificate issuer (CI) public key identifier list of an eUICC;

sending, by the SM-DP+ server to the LPA, first information comprising a first CI public key identifier, wherein the first CI public key identifier is stored on the SM-DP+ server, does not match any CI public key identifier in the verification CI public key identifier list, and is for mutual authentication between the SM-DP+ server and the eUICC;

sending, by the LPA to the eUICC, the first CI public key identifier;

receiving, by an operating system patch server (OPS) from the eUICC, second information comprising the first CI public key identifier; and sending, by the OPS to the eUICC, a patch package comprising a first CI public key corresponding to the first CI public key identifier to enable the eUICC to update a set of CI public keys of the eUICC.

2. The method of claim 1, wherein the first information further comprises a first certificate comprising the first CI public key identifier.

3. The method of claim 1, comprising further receiving, by the OPS from the eUICC, the second information when the LPA verifies that the first CI public key identifier does not match any CI public key identifier in the verification CI public key identifier list.

4. The method of claim 1, wherein after sending the first information, the method further comprises cancelling, by the SM-DP+ server, a mutual authentication procedure.

5. The method of claim 1, wherein the patch package further comprises an initial secure channel message comprising a remote operation type identifier, wherein a value of the remote operation type identifier indicates a binding patch package installation type, and wherein the binding patch package installation type enables the LPA to download the patch package for the eUICC and the eUICC to install the patch package.

6. The method of claim 1, wherein the patch package further comprises the first CI public key identifier, and wherein the first CI public key identifier enables the eUICC to update the set of CI public keys.

7. The method of claim 6, wherein the patch package further comprises a storage metadata message comprising the first CI public key identifier.

8. The method of claim 1, wherein the second information further comprises a first identifier of an encryption algorithm supported by the eUICC, wherein the patch package further comprises a first encryption algorithm identifier corresponding to the first CI public key and a first encryption algorithm corresponding to the first encryption algorithm identifier, and wherein the first encryption algorithm identifier does not match a second identifier of any encryption algorithm supported by the eUICC.

9. The method of claim 1, further comprising sending, by the SM DP+ server to the LPA, the first CI public key identifier.

10. The method of claim 1, wherein the first information further comprises an OPS address, and wherein the OPS address enables the eUICC to establish an association with the OPS.

11. A method implemented by a subscription manager-data preparation (SM-DP+) server, wherein the method comprises:

receiving, from a local profile assistant (LPA), first embedded universal integrated circuit card (eUICC) information comprising a verification certificate issuer (CI) public key identifier list of an eUICC; and sending, to the LPA, first information comprising a first CI public key identifier, wherein the first CI public key identifier does not match any CI public key identifier in the verification CI public key identifier list and is for mutual authentication between the SM-DP+ server and the eUICC.

12. The method of claim 11, wherein the first information further comprises a first certificate comprising the first CI public key identifier.

13. The method of claim 11, wherein after sending the first information, the method further comprises cancelling a mutual authentication procedure.

14. The method of claim 11, further comprising sending, to the LPA, the first CI public key identifier.

15. The method of claim 11, further comprising storing the first CI public key identifier on the SM-DP+ server.

16. A subscription manager-data preparation (SM-DP+) server comprising:

a memory configured to store instructions; and a processor coupled to the memory and configured to execute the instructions to cause the SM-DP+ server to:

receive, from a local profile assistant (LPA), first embedded universal integrated circuit card (eUICC) information comprising a verification certificate issuer (CI) public key identifier list of an eUICC; and send, to the LPA, first information comprising a first CI public key identifier, wherein the first CI public key identifier does not match any CI public key identifier in the verification CI public key identifier list and is for mutual authentication between the SM-DP+ server and the eUICC.

17. The SM-DP+ server of claim 16, wherein the first information further comprises a first certificate comprising the first CI public key identifier.

18. The SM-DP+ server of claim 16, wherein after sending the first information, the processor is further configured to execute the instructions to cause the SM-DP+ server to cancel a mutual authentication procedure.

19. The SM-DP+ server of claim 16, wherein the processor is further configured to execute the instructions to cause the SM-DP+ server to send, to the LPA, the first CI public key identifier.

20. The SM-DP+ server of claim 16, wherein the processor is further configured to execute the instructions to cause the SM-DP+ server to store the first CI public key identifier on the SM-DP+ server.

* * * * *